(12) United States Patent
Rendl et al.

(10) Patent No.: US 12,533,359 B2
(45) Date of Patent: Jan. 27, 2026

(54) METHOD FOR PREVENTING HAIR LOSS

(71) Applicant: Icahn School of Medicine at Mount Sinai, New York, NY (US)

(72) Inventors: Michael Rendl, New York, NY (US); Nicholas J. Heitman, New York, NY (US); Rachel Sennett, New York, NY (US)

(73) Assignee: Icahn School of Medicine at Mount Sinai, New York, NY (US)

( * ) Notice: Subject to any disclaimer, the term of this patent is extended or adjusted under 35 U.S.C. 154(b) by 868 days.

(21) Appl. No.: 17/624,792

(22) PCT Filed: Jul. 2, 2020

(86) PCT No.: PCT/US2020/040715
§ 371 (c)(1),
(2) Date: Jan. 4, 2022

(87) PCT Pub. No.: WO2021/007108
PCT Pub. Date: Jan. 14, 2021

(65) Prior Publication Data
US 2022/0249509 A1 Aug. 11, 2022

Related U.S. Application Data

(60) Provisional application No. 62/871,030, filed on Jul. 5, 2019.

(51) Int. Cl.
| | |
|---|---|
| A61K 31/551 | (2006.01) |
| A61K 31/167 | (2006.01) |
| A61K 31/277 | (2006.01) |
| A61K 31/343 | (2006.01) |
| A61K 31/366 | (2006.01) |
| A61K 31/496 | (2006.01) |
| A61K 31/506 | (2006.01) |
| A61K 31/553 | (2006.01) |
| A61K 31/5575 | (2006.01) |
| A61K 31/567 | (2006.01) |
| A61K 31/573 | (2006.01) |
| A61K 31/58 | (2006.01) |
| A61K 31/585 | (2006.01) |
| A61P 17/14 | (2006.01) |

(52) U.S. Cl.
CPC .......... *A61K 31/551* (2013.01); *A61K 31/167* (2013.01); *A61K 31/277* (2013.01); *A61K 31/343* (2013.01); *A61K 31/366* (2013.01); *A61K 31/496* (2013.01); *A61K 31/506* (2013.01); *A61K 31/553* (2013.01); *A61K 31/5575* (2013.01); *A61K 31/567* (2013.01); *A61K 31/573* (2013.01); *A61K 31/58* (2013.01); *A61K 31/585* (2013.01); *A61P 17/14* (2018.01)

(58) Field of Classification Search
None
See application file for complete search history.

(56) References Cited

U.S. PATENT DOCUMENTS

| | | | |
|---|---|---|---|
| 6,075,005 A * | 6/2000 | Lurie | A61K 8/64 514/10.2 |
| 6,110,912 A | 8/2000 | Kaufman et al. | |
| 2008/0081078 A1 | 4/2008 | De Lanerolle | |
| 2010/0098732 A1 | 4/2010 | Tippens | |
| 2012/0329780 A1 | 12/2012 | Thormann et al. | |
| 2021/0186968 A1* | 6/2021 | Tomarin | A61K 31/506 |

FOREIGN PATENT DOCUMENTS

| | | |
|---|---|---|
| WO | WO 2010/068692 A1 | 6/2010 |
| WO | WO 2011/039175 A1 | 4/2011 |

OTHER PUBLICATIONS

Zong et al. Autoimmune Hair Loss Induced by Alloantigen in C57BL/6 Mice. Cell Structure and Function. 28: 97-104, published 2003 (Year: 2003).*
Kim JH, Na J, Bak DH, Lee BC, Lee E, Choi MJ, Ryu CH, Lee S, Mun SK, Park BC, Park BC, et al: Development of finasteride polymer microspheres for systemic application in androgenic alopecia. Int J Mol Med 43: 2409-2419, 2019. (Year: 2019).*
AAT Bioquest. Myosin light chain kinase, smooth muscle inhibitors (IC50, Ki). Retrieved from the Internet on Jan. 7, 2025, https://www.aatbio.com/data-sets/myosin-light-chain-kinase-smooth-muscle-inhibitors-ic50-ki. (Year: 2025).*
Liu D, Xu Q, Meng X, Liu X, Liu J. Status of research on the development and regeneration of hair follicles. Int J Med Sci. Jan. 1, 2024;21(1):80-94. (Year: 2024).*
Invitation to Pay Additional Fees for Application No. PCT/US2020/040715, mailed Sep. 22, 2020.
International Search Report and Written Opinion for Application No. PCT/US2020/040715, mailed Nov. 24, 2020.
International Preliminary Report on Patentability for Application No. PCT/US2020/040715, mailed Jan. 20, 2022.
Ahmad et al., Alopecia universalis associated with a mutation in the human hairless gene. Science. Jan. 30, 1998;279(5351):720-4. doi: 10.1126/science.279.5351.720.

(Continued)

*Primary Examiner* — James H Alstrum-Acevedo
*Assistant Examiner* — Lauren Wells
(74) *Attorney, Agent, or Firm* — Lathrop GPM LLP; Malaika O. D. Tyson

(57) ABSTRACT

Methods and compositions useful in the prevention and treatment of hair loss. In some embodiments, compositions are applied to hair follicles to inhibit the transition of growth phases. In some embodiments, the composition is a myosin light chain kinase (MLCK) inhibitor alone, or in conjunction with other components. In some embodiments, methods are disclosed for identifying and/or selecting compositions for use in methods of preventing or treating hair loss.

5 Claims, 40 Drawing Sheets

(56) References Cited

OTHER PUBLICATIONS

Beamish et al., Molecular regulation of contractile smooth muscle cell phenotype: implications for vascular tissue engineering. Tissue Eng Part B Rev. Oct. 2010;16(5):467-91. doi: 10.1089/ten.TEB.2009.0630.

Blanpain et al., Self-renewal, multipotency, and the existence of two cell populations within an epithelial stem cell niche. Cell. Sep. 3, 2004;118(5):635-48. doi: 10.1016/j.cell.2004.08.012.

Bochaton-Piallat et al., The myofibroblast in wound healing and fibrosis: answered and unanswered questions. F1000Res. Apr. 26, 2016;5:F1000 Faculty Rev-752. doi: 10.12688/f1000research.8190.1.

Bonig et al., Hematopoietic stem cell mobilization: updated conceptual renditions. Leukemia. Jan. 2013;27(1):24-31. doi: 10.1038/leu.2012.254. Epub Sep. 6, 2012. Author Manuscript, 18 pages.

Chang et al., Cardiac myosin light chain is phosphorylated by Ca2+/calmodulin-dependent and-independent kinase activities. Proc Natl Acad Sci U S A. Jul. 5, 2016;113(27):E3824-33. doi: 10.1073/pnas.1600633113. Epub Jun. 20, 2016.

Clavel et al., Sox2 in the dermal papilla niche controls hair growth by fine-tuning BMP signaling in differentiating hair shaft progenitors. Dev Cell. Nov. 13, 2012;23(5):981-94. doi: 10.1016/j.devcel.2012.10.013.

Dominici et al., Restoration and reversible expansion of the osteoblastic hematopoietic stem cell niche after marrow radioablation. Blood. Sep. 10, 2009;114(11):2333-43. doi: 10.1182/blood-2008-10-183459. Epub May 11, 2009.

Ge et al., Stretching the limits: from homeostasis to stem cell plasticity in wound healing and cancer. Nat Rev Genet. May 2018;19(5):311-325. doi: 10.1038/nrg.2018.9. Epub Feb. 26, 2018. Author Manuscript, 43 pages.

Greco et al., A two-step mechanism for stem cell activation during hair regeneration. Cell Stem Cell. Feb. 6, 2009;4(2):155-69. doi: 10.1016/j.stem.2008.12.009. Erratum in: Cell Stem Cell. May 8, 2009;4(5):464.

Hsu et al., Transit-amplifying cells orchestrate stem cell activity and tissue regeneration. Cell. May 8, 2014;157(4):935-49. doi: 10.1016/j.cell.2014.02.057. Author Manuscript, 27 pages.

Hsu et al., Dynamics between stem cells, niche, and progeny in the hair follicle. Cell. Jan. 7, 2011;144(1):92-105. doi: 10.1016/j.cell.2010.11.049.

Jahoda et al., Smooth muscle alpha-actin is a marker for hair follicle dermis in vivo and in vitro. J Cell Sci. Jul. 1991;99 ( Pt 3):627-36. doi: 10.1242/jcs.99.3.627.

Lapidot et al., How do stem cells find their way home? Blood. Sep. 15, 2005;106(6):1901-10. doi: 10.1182/blood-2005-04-1417. Epub May 12, 2005.

Laurenti et al., From haematopoietic stem cells to complex differentiation landscapes. Nature. Jan. 24, 2018;553(7689):418-426. doi: 10.1038/nature25022. Author Manuscript, 23 pages.

Legue et al., Hair follicle renewal: organization of stem cells in the matrix and the role of stereotyped lineages and behaviors. Development. Sep. 2005;132(18):4143-54. doi: 10.1242/dev.01975. Epub Aug. 17, 2005.

Lindner et al., Analysis of apoptosis during hair follicle regression (catagen). Am J Pathol. Dec. 1997;151(6):1601-17.

Luck et al., Effects of a myosin light chain kinase inhibitor on the optics and accommodation of the avian crystalline lens. Mol Vis. 2011;17:2759-64. Epub Oct. 22, 2011.

Mesa et al., Niche-induced cell death and epithelial phagocytosis regulate hair follicle stem cell pool. Nature. Jun. 4, 2015;522(7554):94-7. doi: 10.1038/nature14306. Epub Apr. 6, 2015. Author Manuscript, 24 pages.

Muller-Rover et al., A comprehensive guide for the accurate classification of murine hair follicles in distinct hair cycle stages. J Invest Dermatol. Jul. 2001;117(1):3-15. doi: 10.1046/j.0022-202x.2001.01377.x.

Nakanishi et al., MS-444, a new inhibitor of myosin light chain kinase from Micromonospora sp. KY7123. J Antibiot (Tokyo). Sep. 1995;48(9):948-51. doi: 10.7164/antibiotics.48.948.

Nakanishi et al., K-252a, a novel microbial product, inhibits smooth muscle myosin light chain kinase. J Biol Chem. May 5, 1988;263(13):6215-9.

Oshima et al., Morphogenesis and renewal of hair follicles from adult multipotent stem cells. Cell. Jan. 26, 2001;104(2):233-45. doi: 10.1016/s0092-8674(01)00208-2.

Oshimori et al., Paracrine TGF-ß signaling counterbalances BMP-mediated repression in hair follicle stem cell activation. Cell Stem Cell. Jan. 6, 2012;10(1):63-75. doi: 10.1016/j.stem.2011.11.005.

Rendl et al., Molecular dissection of mesenchymal-epithelial interactions in the hair follicle. PLoS Biol. Nov. 2005;3(11):e331. doi: 10.1371/journal.pbio.0030331. Epub Sep. 20, 2005.

Rezza et al., Signaling Networks among Stem Cell Precursors, Transit-Amplifying Progenitors, and their Niche in Developing Hair Follicles. Cell Rep. Mar. 29, 2016;14(12):3001-18. doi: 10.1016/j.celrep.2016.02.078. Epub Mar. 19, 2016.

Rompolas et al., Live imaging of stem cell and progeny behaviour in physiological hair-follicle regeneration. Nature. Jul. 26, 2012;487(7408):496-9. doi: 10.1038/nature11218. Author Manuscript, 13 pages.

Rompolas et al., Spatial organization within a niche as a determinant of stem-cell fate. Nature. Oct. 24, 2013;502(7472):513-8. doi: 10.1038/nature12602. Epub Oct. 6, 2013. Author Manuscript, 14 pages.

Saitoh et al., Selective inhibition of catalytic activity of smooth muscle myosin light chain kinase. J Biol Chem. Jun. 5, 1987;262(16):7796-801.

Shi et al., Myosin light chain kinase-independent inhibition by ML-9 of murine TRPC6 channels expressed in HEK293 cells. Br J Pharmacol. Sep. 2007;152(1):122-31. doi: 10.1038/sj.bjp.0707368. Epub Jul. 2, 2007.

Stenn et al., Controls of hair follicle cycling. Physiol Rev. Jan. 2001;81(1):449-494. doi: 10.1152/physrev.2001.81.1.449.

Tumbar et al., Defining the epithelial stem cell niche in skin. Science. Jan. 16, 2004;303(5656):359-63. doi: 10.1126/science.1092436. Epub Dec. 11, 2003. Author Manuscript, 11 pages.

Xiong et al., Myosin Light Chain Kinase: A Potential Target for Treatment of Inflammatory Diseases. Front Pharmacol. May 23, 2017;8:292. doi: 10.3389/fphar.2017.00292.

Zolotarevsky et al., A membrane-permeant peptide that inhibits MLC kinase restores barrier function in in vitro models of intestinal disease. Gastroenterology. Jul. 2002;123(1):163-72. doi: 10.1053/gast.2002.34235. Erratum in: Gastroenterology Oct. 2002;123(4):1412.

\* cited by examiner

Post-processing of triple-color fluorescence *intravital* 2-photon imaging with single wavelength excitation:
*Acan^idT;Tbx18^H2BGFP*;K14-H2BCer

| Fluorophore | Channel | | | Signal strength |
| --- | --- | --- | --- | --- |
| | Blue | Green | Red | |
| K14-H2BCer | Strong | Strong | Weak | |
| Tbx18^H2BGFP | None | Strong | None | |
| Acan^idT | None | None | Strong | |

FIG. 11B

METHOD FOR PREVENTING HAIR LOSS

CROSS REFERENCE TO RELATED APPLICATIONS

This application is a national stage filing under 35 U.S.C. § 371 of International PCT Application Number PCT/US2020/040715, filed Jul. 2, 2020, which claims the benefit and priority under 35 U.S.C. § 119(e) to U.S. Provisional Patent Application Ser. No. 62/871,030, filed Jul. 5, 2019, each of which is incorporated herein by reference.

STATEMENT REGARDING FEDERALLY SPONSORED RESEARCH

This invention was made with government support under grant numbers AR070639 and AR071047 awarded by the National Institutes of Health. The government has certain rights in the invention.

FIELD OF THE INVENTION

The present specification relates to a hair loss treatment. More in particular, the present specification relates to methods, kits, and compositions for treating hair loss by regulating the hair cycle (e.g., by inhibiting the progression of the catagen phase of the hair cycle).

BACKGROUND OF INVENTION

A defining biological characteristic of mammals is hair, i.e., the threadlike outgrowths of the outer layer of the skin that provide an animal with its coat or pelage. Humans are among the most hairless of all mammals but society continues to attach a stigma to hair loss when it comes to the human scalp. As a result, men and women who suffer from hair loss often experience self-consciousness relating to the condition.

Hair growth is cyclical, whereby hairs are continually shed and renewed by the operation of a hair growth cycle consisting of, growth (anagen), regression (catagen), and rest (telogen), followed by a shedding of the hair shaft and a renewed growth phase. In humans, the average life of different varieties of hair varies from about four months for downy hairs to three to five years for long scalp hairs. During each anagen phase, follicles produce an entire hair shaft from tip to root. In catagen and telogen, follicles reset and prepare their stem cells so that they can receive the signal to start the next growth phase and make a new hair shaft, while the previous hair shaft is shed. The hair cycle is a complex biological process that involves intricate regulation of stem cell quiescence and activation, as well as cell proliferation, cell-fate choice, differentiation and apoptosis in a regenerative adult epithelial tissue. Each human follicle follows this cycle independently of others, so the total amount of hair remains constant so long as the follicles remain functional and/or active. Humans are born with a full complement of hair follicles, which can change in size and growth characteristics as in early baldness or can ultimately degenerate and disappear as in the late stages of baldness (e.g., male-pattern baldness or alopecia).

For androgenetic alopecia, a large number of compounds have been developed as candidate treatments. Examples include 2,4-diamino-6-piperidinopyrimidine-3-oxide (also known as "minoxidil") and finasteride. A medicament containing minoxidil as an active ingredient is commercially available under the trademark ROGAINE® (Pharmacia & Upjohn Company). A medicament containing finasteride as an active ingredient is commercially available under the trademark PROPECIA® (Merck & Co., Inc.). PROPECIA® is a pill for oral administration. Both treatments require continuous application of the compositions to the skin for a long period of time and the success rates are limited. Moreover, the use of finasteride has been associated with reduced libido, teratogenic effects and other side effects in certain individuals.

In addition, attempts have been made to extract compositions from natural plants, including medicinal herbs, to be used for the treatment of alopecia. Various extracts of crude drugs, generally known as hair growth compositions, have been used as hair growth stimulants or promoters. Even though some of these hair growth compositions may show some effects in some individuals, the treatments can be associated with adverse effects, such as skin irritation and unpleasant odors.

Surgical approaches are also available for treating hair loss, such as hair transplantation. This method typically comprises transplanting the natural hair in the scalp from regions where there is active hair growth to regions which are bald. Hair transplantation often times is costly, time consuming, painful and only shows limited success in certain individuals.

Given the significant limitations, lack of effectiveness, and disadvantages of existing treatment options for baldness, there is a need for the development of more effective methods, kits, and compositions to treat hair loss.

SUMMARY

Society continues to attach a stigma to hair loss when it comes to the human scalp, as a result, men and women who suffer from hair loss often experience self-consciousness relating to the condition. These individuals may desire to retain as much of their hair as possible, prevent, and/or treat hair loss in an effort to avoid these consequences. Accordingly, provided herein are methods and compositions useful in preventing and/or treating hair-loss.

In a first aspect, the disclosure relates to a method of treating hair loss by inhibiting the contraction of dermal sheath cells of a hair follicle. In some embodiments, the contraction of dermal sheath cells can be inhibited or blocked by the administering of a therapeutically effective amount of an agent which inhibits the myosin light chain kinase (MLCK) pathway, e.g., by inhibiting the myosin light chain kinase with a myosin light chain kinase inhibitor (e.g., wortmannin, KT5926, K-252a, MS-444, ML-9, or ML-7, or combinations thereof).

In a second aspect, for hair follicles which are in anagen phase, the disclosure relates to a method of treating hair loss by inhibiting the activation of catagen phase. In some embodiments, the inhibiting of activation of catagen phase can be achieved by the administering of a therapeutically effective amount of an agent which inhibits the myosin light chain kinase (MLCK) pathway, e.g., by inhibiting the myosin light chain kinase with a myosin light chain kinase inhibitor (e.g., wortmannin, KT5926, K-252a, MS-444, ML-9, or ML-7, or combinations thereof).

In a third aspect, for hair follicles which are in catagen phase, the disclosure relates to a method of treating hair loss by inhibiting the further progression of catagen phase (i.e., arresting catagen phase). In some embodiments, the inhibiting of catagen progression can be achieved by the administering of a therapeutically effective amount of an agent which inhibits the myosin light chain kinase (MLCK) pathway, e.g., by inhibiting the myosin light chain kinase with a myosin light chain kinase inhibitor (e.g., wortmannin, KT5926, K-252a, MS-444, ML-9, or ML-7, or combinations thereof).

In a fourth aspect, the disclosure relates to a method of treating hair loss comprising administering a therapeutically effective amount of a pharmacological agent that inhibits the myosin light chain kinase (MLCK) pathway in a dermal sheath cell of a hair follicle, thereby treating hair loss. In some embodiments, the pharmacological agent is a compound, a peptide, or an antibody which inhibits myosin light chain kinase. In some embodiments, the myosin light chain kinase (MLCK) pathway can be inhibited with a myosin light chain kinase (MLCK) inhibitor (e.g., wortmannin, KT5926, K-252a, MS-444, ML-9, or ML-7, or combinations thereof).

In some embodiments, the compound, peptide, or antibody has a binding inhibitory IC50 value of 1 µM or less, or 900 µM or less, or 800 µM, or 700 µM, or 600 µM or less, or 500 µM or less, or 400 µM or less, or 300 µM or less, or 200 µM or less, or 100 µM or less, or 50 µM or less, or 40 µM or less, or 30 µM or less, or 20 µM or less, or 10 µM or less, or 5 µM or less, or 1 µM or less. In other embodiments, the compound, peptide, or antibody has a binding inhibitory IC50 value of 500 nM or less, or 400 nM or less, or 300 nM or less, or 200 nM or less, or 100 nM or less, or 50 nM or less, or 40 nM or less, or 30 nM or less, or 20 nM or less, or 10 nM or less, or 5 nM or less, or 1 nM or less. In still other embodiments, the compound, peptide, or antibody has a binding inhibitory IC50 value of 500 µM or less, or 400 µM or less, or 300 µM or less, or 200 µM or less, or 100 µM or less, or 50 µM or less, or 40 µM or less, or 30 µM or less, or 20 µM or less, or 10 µM or less, or 5 µM or less, or 1 µM or less.

In some embodiments, the pharmacological agent is inhibitor of myosin light chain kinase (i.e., an MLCK inhibitor), such as, but not limited to, wortmannin, KT5926, K-252a, MS-444, ML-9, or ML-7, or combinations thereof. Many examples of such compounds are known in the art and are readily available from commercial sources, e.g., from MILLIPORE SIGMA. In addition, examples of MLCK inhibitors may be found in Xiong et al., "Myosin light chain kinase: a potential target for treatment of inflammatory disease," *Front Pharmacol*, 2017, 8:292, which is incorporated herein by reference (e.g., see Table 2).

In some embodiments, the pharmacological agent is wortmannin, having the following structure,

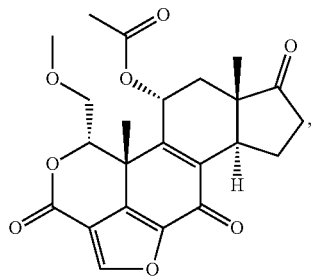 [SMILES: COC[C@H]1OC(=O)c2coc3c2[C@@]1(C)C1=C(C3=O)[C@@H]2CCC(=O)[C@@]2(C)C[C@H]1OC(C)=O]

or a functional derivative thereof.

In some embodiments, the pharmacological agent is KT5926 ((8R*,9S*,11S*)-(−)-9-hydroxy-9-methoxycarbonyl-8-methyl-14-n-propoxy-2,3,9,10-tetrahydro-8,11-epoxy, 1H,8H, 11H-2,7b,11a-triazadibenzo[a,g]cycloocta[cde]trinden-1-one). See e.g., Nakanishi et al., "KT5926, a potent and selective inhibitor of myosin light chain kinase," *Mol Pharmacol*, 1990, 37(4): 482-8, which is incorporated herein by reference.

In some embodiments, the pharmacological agent is K-252a ((8R*,9S*,11S*)-(−)-9-hydroxy-9-methoxycarbonyl-8-methyl-2,3,9,10-tetrahydro-8,11-epoxy-1H,8H,11H-2,7b,11a-triazadibenzo[a,g]cycloocta[cde]trinden-1-one) having the chemical structure of:

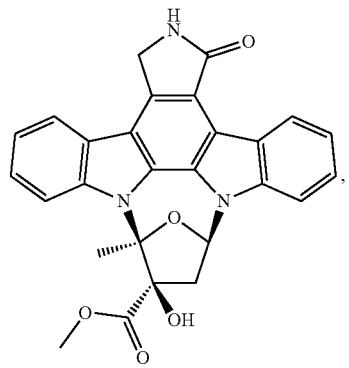 [SMILES: COC(=O)[C@@]1(O)C[C@H]2O[C@]1(C)n1c3ccccc3c3c4c(c5c6ccccc6n2c5c31)C(=O)NC4]

or a functional derivative thereof. See e.g., Nakanishi et al., "K-252a, a novel microbial product, inhibits smooth muscle myosin light chain kinase," *J. Biol. Chem*, 1988, 263(13): 6215-9, the contents of which are incorporated by reference.

In some embodiments, the pharmacological agent is MS-444 having the chemical structure of:

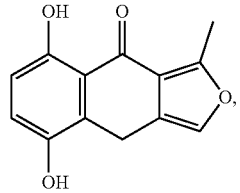 [SMILES: Cc1occ2c1C(=O)c1c(O)ccc(O)c1C2]

or a functional derivative thereof. See e.g., Nakanishi, et al. "MS-444, a new inhibitor of myosin light chain kinase from Micromonosporasp. KY7123," *The Journal Of Antibiotics*, 1995, 48(9):948-951, which is incorporated herein by reference.

In some embodiments, the pharmacological agent is ML-9 ([1-(5-chloronaphthalene-1-sulfonyl)-1H-hexahydro-1,4-diazepine]) having the chemical structure of:

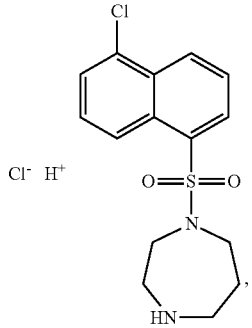

or a functional derivative thereof. See e.g., Ito et al., "ML-9, a myosin light chain kinase inhibitor, reduces intracellular Ca2+ concentration in guinea pig trachealis," *Euro J Pharmacol,* 2004, 486: 325-33; also see Takahashi et al., "Myosin light chain kinase-independent inhibition by ML-9 of murine TRPC6 channels expressed in HEK293 cells," Br J Pharmacol. 2007 September; 152(1):122-31, both of which are incorporated herein by reference.

In some embodiments, the pharmacological agent is ML-7 (hexahydro-1-[(5-iodo-1-naphthalenyl)sulfonyl]-1H-1,4-diazepine hydrochloride) having the chemical structure:

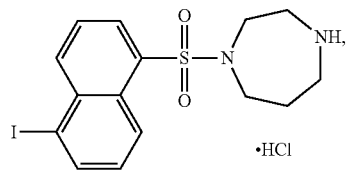 [SMILES: O=S(=O)(c1cccc2c(I)cccc12)N1CCCNCC1 ; Cl]

or a functional derivative thereof. See e.g., Xiong et al., "Myosin light chain kinase: a potential target for treatment of inflammatory disease," *Front Pharmacol,* 2017, 8:292; also see Saitoh et al., "Selective inhibition of catalytic activity of smooth muscle myosin light chain kinase," *J Biol Chem,* 1987, 262(16): 7796-801, both of which are incorporated herein by reference.

In some embodiments, the method of treating hair loss comprising administering a therapeutically effective amount of a pharmacological agent that inhibits the myosin light chain kinase (MLCK) pathway in a dermal sheath cell of a hair follicle, thereby treating hair loss, further comprises administering an agent for facilitating hair growth.

In some embodiments, the agent for facilitating hair growth is one or more of finasteride, cyproterone acetate, alfatradiol, minoxidil, bimatoprost, bicalcutamide, spironolactone, flutamide, lantoanoprost, dutasteride, or ketoconazole, each of which are well known agents in the art for treating hair loss (e.g., see *Hair Loss: What to do if it happens to you,* Jordi B., 2010, iUniverse Books, Chapter 8: Pharmaceuticals: What's out there and how they work, which is incorporated herein by reference). In some embodiments, the agent for facilitating hair growth is finasteride. In other embodiments, the agent for facilitating hair growth is cyproterone acetate. In some embodiments, the agent for facilitating hair growth is alfatradiol. In yet other embodiments, the agent for facilitating hair growth is minoxidil. In still other embodiments, the agent for facilitating hair growth is bimatoprost. In some embodiments, the agent for facilitating hair growth is bicalcutamide. In other embodiments, the agent for facilitating hair growth is lantoanoprost. In still other embodiments, the agent for facilitating hair growth is spironolactone. In yet other embodiments, the agent for facilitating hair growth is flutamide. In still other embodiments, the agent for facilitating hair growth is dutasteride. In some embodiments, the agent for facilitating hair growth is ketoconazole.

In some embodiments, the pharmacological agent is administered topically.

In other embodiments, the methods may further comprise administering a penetration enhancer prior to or concomitantly with the administration of the pharmacological agent.

In some embodiments, the inhibition of the MLCK pathway results in cessation of dermal sheath cell contractions, thereby halting the hair cycle in the catagen phase, which prevents further progression of the hair cycle to telogen phase.

In another aspect, the disclosure relates to a method of identifying an agent capable of treating hair loss, comprising, administering a test agent to a cell culture of dermal sheath cells, detecting the production of one or more biomarkers indicative of the inhibition of dermal sheath contraction, validating a test agent in a hair follicle model to confirm that the test agent inhibits dermal sheath contraction, thereby identifying an agent capable of treating hair loss.

BRIEF DESCRIPTION OF THE DRAWINGS

The following drawings form part of the present specification and are included to further demonstrate certain aspects of the present disclosure, which can be better understood by reference to one or more of these drawings in combination with the detailed description of specific embodiments presented herein.

FIG. 1A is a schematic of catagen regression during the hair cycle. The hair shaft, inner root sheath (IRS) and matrix progenitors are eliminated by terminal differentiation and extrusion from the skin. The majority of outer root sheath (ORS) progenitors (the second layer of the follicle as counted from the outermost layer to the center of the follicle) are eliminated by apoptosis. It is unknown how the dermal papilla (DP) niche relocates to the surviving stem cell reservoir (shown as a small portion positioned at the bottom of each figure indicated by an arrow). FIG. 1B shows the immunofluorescence for the proteoglycan, ACAN, secreted by ITGA8+ dermal sheath (DS) cells (ITGA8 is shown as the outermost layer from the outside moving inward (moving right to left in the small dotted box of the left panel); ACAN is shown as the second outermost layer from the outside moving inward (moving right to left in the small dotted box of the left panel); DAPI is shown as the internal layer). The image on the right is a magnified view of the dotted box region of the image on the left. FIG. 1C is a schematic of cytotoxic ablation of DS during catagen. FIG. 1D shows the immunofluorescence for aSMA in control ($R26^{LSL-DTA}$) and DS-ablated ($Acan^{CreER}$; $R26^{LSL-DTA}$) back skin. Remnants of fragmented aSMA staining in DS-ablated follicle at the beginning of catagen are shown at P15. FIGS. 1E-1F show a whole mount immunofluorescence for ORS marker K14 in P20 back skins (viewed from dermis side, anterior=left). Control follicles are in telogen (FIG. 1E). Note elongated stalled follicles after DS ablation (FIG. 1F). FIG. 1G shows an inset (10 µm) of the full scan. The hair shaft and DP remain at bulb tip. FIG. 1H shows the quantification of percent stalled follicles with length greater than 150 µm at P20 (n=698 in control and 895 in DS-ablated follicles in 5 mice). P=0.003, unpaired two-tailed t-test. FIG. 1I shows the quantification of follicle lengths (n=11, P13 control; n=14 P13 ablated; n=80, P20 control; n=27, P20 stalled follicles; 11 mice). **P<10-4, unpaired two-tailed t-test. FIG. 1J shows that stalled follicles have no DS (αSMA−), but retain intact DP (LEF1+). K14+ ORS progenitor and K6+ companion (Cp) layers are present and lack apoptosis (activated CASP3) or proliferation (Ki67) markers. Differentiating cuticle (Ch), cortex (Co), medulla (Me) of hair shaft and the inner root sheath (IRS) are undetectable. Scale bars represent 50 µm in FIGS. 1B, 1E, and 1F. Scale bars represent 10 µm in FIGS. 1D and 1J.

FIGS. 2A-2B show flow cell sorting of DS and DP from $Sox2^{GFP}$; Lef1-RFP P5 back skin and immunofluorescence for PDGFRA. Dermal fibroblasts (DF) were sorted for comparison. FIG. 2C shows qRT-PCR verification of sorted populations by known marker genes performed on biological duplicates. FIG. 2D is a Venn diagram of gene signatures. FIG. 2E shows the gene ontology (biological process) analysis of DS signature. FIG. 2F shows a gene set enrichment analysis (GSEA) for genes involved in smooth muscle contraction and regulation are highly enriched in DS. FIG. 2G is a schematic of $Ca^{2+}$-dependent smooth muscle contraction pathway. The heatmap is of smooth muscle contraction gene expression. $Ca^{2+}$ contraction pathway and pan-smooth muscle genes (asterisks) are highly enriched in DS. FIG. 2H shows 3D immunofluorescence for αSMA fibers arranged in a concentric ring-like network wrapping around the follicle. FIG. 2I shows the immunofluorescence of smooth muscle contraction components in DS. FIG. 2J shows the immunofluorescence of smooth muscle proteins in DS of human scalp follicles. Data bars are mean±s.d. Scale bars represent 50 µm.

FIG. 3A shows high K+ membrane depolarization activates $Ca^{2+}$ influx in isolated DS cells (Fluo8 indicator). n=6. Data bars are mean±95% C.I. P=0.002, paired two-tailed t-test. FIG. 3B shows that depolarization triggers DS contraction and surface area reduction in cells grown on matrigel. n=35. Data bar is mean±95% C.I. *P<0.0001, paired two-tailed t-test. FIG. 3C is a schematic of live imaging microdissected follicles pre-incubated with or without MLCK inhibitor ML7 and after high K+ depolarization. FIGS. 3D-3E show still images from brightfield movie at start left-most panels) and end (middle panels; composite of start and stop is shown in the right-most panels) of high K+ incubation. Overlays highlight reduction of follicle width, blocked by ML7. FIG. 3F shows the quantification of follicle widths during live imaging. n=7 follicles for ML7 and no inhibitor pre-incubation. Data points are mean±s.d. P<0.01, unpaired two-tailed t-test. FIGS. 3G-3J show the topical inhibition of MLCK by ML7 blocks hair follicle regression in vivo. FIG. 3H is a schematic of ML7 or vehicle application during catagen. P20 back skins show normal regression of follicles into telogen in control, but stalled follicles in contraction-inhibited ML7-treated regions. FIG. 3I shows the quantification of % stalled follicles. n=279 follicles from control and n=288 follicles from treated regions in 3 mice. Data bars are mean±s.d. P=0.008, unpaired two-tailed t-test. FIG. 3J shows the immunofluorescence for LEF1, proliferation marker Ki67 and αSMA demonstrated full regression of follicles into telogen in DMSO treated control skin region. K14 marks bulge and germ stem cells, and LEF1 marks the relocated, adjacent DP. Absence of Ki67 in the stem cells confirms telogen quiescent state. αSMA+DS is absent in the telogen follicle. Stalled follicles have intact DS (αSMA) and DP (LEF1) that are no longer engulfed. Epithelial cells of stalled follicles are not proliferative (Ki67–). The scale bars represent 50 µm in FIG. 3H, and 10 µm in FIG. 3J.

FIG. 4A shows the triple-fluorescent reporter follicles for intravital 3D time-lapse imaging of catagen regression in live mice (5 hours). $Acan^{tdT}$ and $Tbx18^{H2BGFP}$ marks DS cytoplasm and nuclei, respectively. K14-H2BCer highlights all epithelial nuclei ($Acan^{tdT}$ can be seen generally as the outer DS (the first layer moving outward to inner), with $Tbx18^{H2BGFP}$ shown as the small round markings therein); K14-H2BCer can be seen in the ORS/Epithelial Strand as the second layer counting from the outermost layer moving inward). The DP was recognized by surrounding epithelial and DS cells and low level $Tbx18^{H2BGFP}$ expression. FIG. 4P is a model for DP niche relocation during regression by DS contraction forcing upward movement of the hair shaft, which pulls the DP upward via the epithelial strand. Data bars are mean±s.d. Scale bars represent 10 µm.

FIG. 5A is a schematic of the hair follicle bulb and its epithelial and mesenchymal lineages during anagen growth. In the mesenchymal compartment, the dermal sheath (DS) forms the outermost casing of the follicle and the central dermal papilla (DP) at the base is engulfed by epithelial matrix (Mx) progenitors. The outer root sheath (ORS), the outermost layer of epithelium contains slow cycling multipotent progenitors. Mx progenitors abutting the DP consist of rapidly dividing transit amplifying cells (TAC) that produce progeny that differentiate into cells of the outgoing shaft and its channel. Distinct markers highlight epithelial lineages: K14 for ORS; K6 for companion layer (Cp) and shaft medulla (Me); AE15 for Henle's layer (He), Huxley's layer (Hu), and cuticle (Ci) of the inner root sheath (IRS) and shaft medulla (Me); AE13 for shaft cuticle (Ch) and cortex (Co). FIG. 5B is a schematic of the hair cycle with focus on catagen regression. During catagen onset, matrix progenitors cease proliferation and deplete through terminal differentiation. Throughout mid- and late-catagen, ORS progenitors undergo large-scale pruning by apoptosis. During regression, the shaft and DP niche are translocated upward through an unknown mechanism. Throughout the entirety of catagen, the DS encapsulates the follicle. In late catagen, the DS extends below the DP forming an empty sleeve. At the conclusion of catagen, the DP niche resides adjacent to the stem cell reservoir, an essential position vital for the relay of short-range activating niche signals to the stem cells for induction of hair regeneration and the start of a new cycle.

FIG. 7A is a schematic showing the fluorescence reporter of dermal sheath genetic targeting with Acan$^{CreER}$; R26$^{LSL-tdTomato}$ (Acan$^{tdT}$). FIG. 7B shows the fluorescence microscopy for tdT expression in back skin after induction with tamoxifen from P10-12 and analysis at P15. FIG. 7C shows the quantification of follicles with DS labelling. Data bars are means of each bin; n=65 follicles from 3 mice. Line is normal distribution fit of data. Scale bars represent 50 µm.

FIG. 8A shows outer root sheath progenitors during anagen are K14+. The DS is marked by αSMA. Matrix progenitors express LEF1 and are Ki67+ indicative of proliferative status. LEF1 is also moderately expressed in DP. Differentiated epithelial lineage markers are detectable in inner root sheath (IRS), AE15; shaft cortex (Co) and cuticle (Ch), AE13; shaft medulla (Me), AE15 and K6; and companion layer (Cp), K6. Cell death by apoptosis is undetectable (active caspase 3, CASP3*). FIG. 8B shows progenitor pruning by apoptosis is detectable by CASP3*. FIG. 8C shows proliferation, differentiation, and apoptosis markers are absent in telogen follicles. Only K6 marks the inner bulge cells of telogen follicles. αSMA+DS is absent during telogen. K14 is retained in bulge and germ stem cells. Scale bars represent 50 µm.

FIG. 10A shows the hierarchical clustering of DS, DP, DF, ORS, matrix (Mx), and melanocytes (Mc) using all differentially expressed genes identified by ANOVA (FDR<0.05). Biological duplicates of sorted populations cluster together. DS, DP, and DF and ORS and Mx cluster together indicative of lineage relatedness. FIG. 10B shows the principal component analysis using all differentially expressed genes. DS, DP, and DF cluster together apart from ORS, Mx, and Mc, and DS and DP cluster closer than DF. Mc cluster separate from other populations. FIG. 10C shows a signature gene analysis reveals 483 DS signature genes. FIG. 10D shows expression levels of smooth muscle genes from RNA sequencing represented as fragments per kilobase per million mapped reads (FPKM). FIG. 10E shows the qRT-PCR verification of smooth muscle gene expression in DS. Data are mean±s.d.

FIGS. 11A-11C show the post-processing of triple-color 2-photon imaging. FIG. 11A shows intravital imaging setup of live mice. FIG. 11B shows a table of fluorescence signal strength of fluorophores in each channel using a single 900 nm excitation wavelength. FIG. 11C shows the steps of fluorophore signal isolation. (1) Isolate second harmonic generation (SHG) signal in raw blue channel data by subtracting green channel from blue channel. (2) Isolate H2BCer-only signal by subtracting isolated SHG from raw blue channel. (3) Isolate H2BGFP and tdT signals by subtracting H2BCer-only signal from raw green and red channels, respectively. (4) Merge isolated tdT, H2BGFP and H2BCer signals and pseudocolor H2BCer to light blue for visibility. Scale bar represents 50 µm.

FIG. 12A shows the schematic of transgenesis strategy. The coding sequence for H2B-mCerulean3 fusion protein was inserted into plasmid vector containing K14 promoter, b-globin intron, and polyA (pA). FIG. 12B shows that cerulean fluorescence is restricted to epithelial cells in skin epidermis and hair follicles. FIG. 12C shows the distinct fluorescence of Cerulean (nuclei of epithelial cells) and GFP (nuclei of DS and other mesenchymal cells) in Tbx18$^{H2BGFP}$; K14-H2BCer anagen back skin. Far-red NucRed 647 highlighted all nuclei. Scale bars represent 50 µm.

FIG. 13A shows intravital 3D time-lapse imaging of catagen regression in live mice. Triple-fluorescent Acan$^{tdT}$; Tbx18$^{H2BGFP}$; K14-H2BCer reporter follicles were live-imaged for 5 hours. Time courses of two optical slices capturing shaft (z-slice 8) and DP (z-slice 10) movements (slices are separated by 6 µm). Steady upward movements of shaft and DP are outlined by the sloped dashed lines, in each set of 5 panels (leftmost 5 panels and rightmost 5 panels) respectively. FIG. 13B shows cell tracking for quantifying cell movements during regression. DS and ORS show minimal movement in the long axis. Bases of arrows are at starting position and tips of arrows are at ending position of 5-hour cell tracking. FIG. 13C shows the tracking of DS cell centripetal constriction movement at club-epithelial strand bottleneck and of hair shaft upward movement. Arrows are starting and ending positions of 5-hour tracking. Scale bars represent 10 µm.

DETAILED DESCRIPTION

Figure 1A:
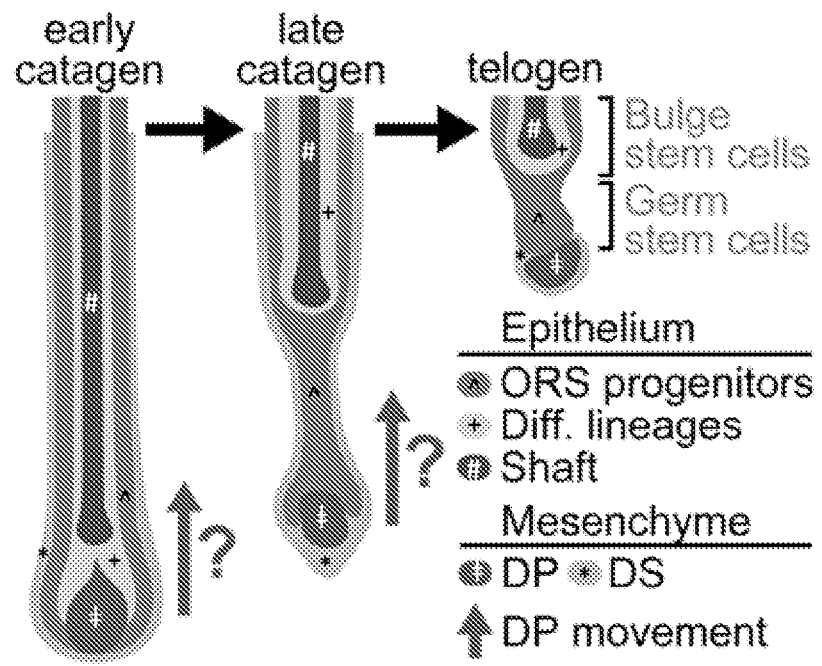
FIGS. 1A-1J show that the dermal sheath is required for hair follicle regression.

The present disclosure relates, in part, to the surprising discovery that the dermal sheath cells of human hair follicles bear the specific function of driving the upward relocation of the dermal papilla niche cells at the bottom of the hair follicle to a position that is adjacent to stem cells in the upper region of the hair follicle during catagen phase. The inventors have discovered and demonstrated it is believed for the first time that this upward movement of the niche cells during catagen phase is propelled by the smooth muscle cell-like properties of the dermal sheath cells. As proposed herein, the hair cycle may be held or "frozen" in catagen phase by inhibiting or otherwise blocking the smooth muscle cell-like contractions of the dermal sheath cells. In some embodiments, this is achieved by inhibiting the myosin light chain kinase (MLCK) pathway, which disrupts the smooth muscle cell function of the dermal sheath cells, thereby freezing the hair growth cycle in catagen phase. This state results in the minimization of further hair loss, which occurs normally at the end of the subsequent telogen phase. Thus, in various aspects, the present disclosure provides methods, compounds, and compositions for inhibiting the smooth muscle cell function of the dermal sheath cells as a means to halt the cell cycle in catagen phase.

Thus, in one aspect, the disclosure relates to a method of treating hair loss by inhibiting the smooth muscle cell function of the dermal sheath cells of the hair follicles. Such inhibition may be achieved in certain embodiments through the administration of one or more agents that inhibit smooth muscle cell function, e.g., an inhibitor of the myosin light chain kinase (MLCK) pathway.

A. Definitions

A, an, the

As used herein and in the claims, the singular forms "a," "an," and "the" include the singular and the plural reference unless the context clearly indicates otherwise. Thus, for example, a reference to "an agent" includes a single agent and a plurality of such agents.

Human Hair Growth Cycle

As used herein, reference to the "human hair growth cycle" refers to the naturally occurring life cycle of a strand of hair grown from a hair follicle. Human hair begins growing in utero. In the later stages of a pregnancy around week 22, a fetus will have developed all or nearly all of the hair follicles it will have throughout its lifetime. At this point, the average human will have around 5 million hair follicles on the body with approximately one hundred thousand of those follicles located on the scalp. Humans do not normally develop new hair follicles after birth, thus, at birth this number is larger than at any other point during the course of a human subject's life. Hair loss can be defined under any medically accepted criteria, but generally means any decrease in the number of live follicles, the health of the follicles, the rate at which the follicles progress through the hair growth cycle, the thinning of the hair shafts produced by the follicles, or any combination thereof, which may lead to less or thinning hair on the subject in a target area, or the appearance thereof.

Human hair has two distinct structures: (1) the follicle itself, which resides in the skin, and (2); and the shaft, which is what is visible above the scalp. The hair follicle bulb is a cylinder-like epithelial segment of the epidermis that extends down into the dermis. The follicle contains several concentric layers which all have separate functions to form the differentiated hair shaft and surrounding inner root sheath (IRS). At the base of the follicle is the dermal papilla (DP), which contains capillaries, or tiny blood vessels that nourish the cells. The DP's main function is to send signals as a specialized "niche" to the surrounding hair follicle progenitors to divide every 23 to 72 hours. Dividing cells then move upwards and differentiate and die to form the outgrowing hair shaft and IRS. The outermost cell layer is the outer root sheath (ORS), that directly connects the progenitors at the base with the epidermis. In the upper portion of the ORS reside the hair follicle stem cells in a reservoir called the bulge.

A mesenchymal layer surrounds the epithelial part of the hair follicle, called the dermal sheath (DS). The DS follows the hair follicle and ends below the opening of a sebaceous gland (i.e., oil gland), and sometimes an apocrine gland (i.e., scent gland) A muscle called an erector pili muscle attaches below the gland to a fibrous layer around the DS. When this muscle contracts, it causes the hair to stand up which also causes the sebaceous gland to secrete oil. The sebaceous gland is vital because it produces sebum, which conditions the hair and skin. After puberty our body produces more sebum but as we age we begin to make less sebum. Women have far less sebum production than men do as they age.

The hair itself, referred to as the shaft, is made of a hard protein called keratin and is comprised of three layers. Keratin is actually dead, so the visible hair strands are not living structures. The three layers of the shaft from inner to outer are: (1) medulla; (2) cortex; and (3) cuticle. The cortex makes up the majority of the hair shaft. The cuticle is a tightly formed structure made of shingle-like overlapping scales. It is both the cortex and the medulla that holds the hair's pigment, giving it its color. Hair on the scalp grows about 0.3 to 0.4 millimeters per day or about 6 inches per year. Unlike other mammals, human hair growth and shedding is random and not seasonal or cyclical. At any given time, a random number of hairs will be in one of three stages of growth and shedding: anagen, catagen, and telogen.

Anagen is the active phase of the hair growth cycle, when the cells in the root of the hair are dividing rapidly. A new hair is formed and pushes the old, mature club hair from the previous hair growth cycle (a hair that has stopped growing or is no longer in the anagen phase) up the follicle and eventually out. Scalp hair stays in this active anagen phase of growth for two to six years. Some people have difficulty growing their hair beyond a certain length because they have a short active phase of growth. On the other hand, people with very long hair have long active phases of growth. There is a correlation between the length of the active phase of hair growth and the length of a hair, for example, the hair on the arms, legs, eyelashes, and eyebrows have very short active growth phases of about 30 to 45 days, which is why they are so much shorter than scalp hair. The next phase, catagen, is a transitional stage and about 3% of all hairs are in this phase at any given time. Catagen typically lasts for about two to three weeks, during which, growth stops and the ORS shrinks and attaches to the root of the hair. This process forms what is known as a club hair. During this phase, the DP niche physically relocates from the lower region of the hair follicle up the shaft to a position that is adjacent to the bulge of stem cells near the upper part of the hair follicle. Telogen is the final phase in the process, it is known as the resting phase and usually accounts for 6% to 8% of all hairs. This phase lasts for about 100 days for hairs on the scalp and longer for hairs on the eyebrow, eyelash, arm, and leg. During this phase, the hair follicle is completely at rest and the club hair is completely formed. Pulling out a hair in this phase will reveal a solid, hard, dry, white material at the root. About 25 to 100 telogen hairs are shed normally each day.

Different mechanisms in the niche affect the stages and transition from one stage of hair growth to the next, however, contraction of the follicle, by muscle, is required to move the club hair out of the follicle and allow the next hair shaft to begin growing and migrating out the follicle. When physiological changes occur, and one phase of the hair growth cycle is exited and another is entered, the hair shaft is pushed up the follicle. The mechanism of action required to propel the shaft upward was previously poorly characterized, however, herein it is shown that the action is at least in part due to contractions of the surrounding tissue of the follicle. Many of the biomarkers found in smooth muscle have been identified and illustrate a possible mechanism of control over the phases of the hair growth cycle. In particular, it is shown herein, that by inhibiting the myosin light-chain kinase pathway, the hair growth cycle can be modulated to prevent and/or delay the follicle from entering catagen from anagen or if in catagen already, prevent it from leaving catagen and entering telogen.

Myosin Light Chain Kinase (MLCK) Pathway

Reference to the "myosin light chain kinase (MLCK) pathway" or equivalently, the "calcium/calmodulin/myosin light chain kinase pathway" refers to the signaling pathway that activates smooth muscle cell contraction in dermal sheath cells via calcium influx-activated calmodulin and calcium binding to MLCK that phosphorylates myosin light chains for myosin/actin-mediated contraction. The blocking or inhibiting of same impedes follicle contraction, regression and niche relocation by inhibiting the smooth muscle cell-like contractions of dermal sheath cells.

Subject

As used herein, a "subject" refers to a human exhibiting hair loss, e.g., male pattern baldness (alopecia), or who is genetically predisposed to hair loss, e.g., male pattern baldness.

Therapeutically Effective Amount

As used herein, "therapeutically effective amount" refers to the amount of a pharmacological agent which is sufficient to block or otherwise slow hair loss in a subject. In various embodiments, the therapeutically effective amount may include the amount of a pharmacological agent which is sufficient to inhibit the myosin light chain kinase (MLCK) pathway in the dermal sheath cells, thereby treating hair loss. In other embodiments, the therapeutically effective amount may include the amount of a pharmacological agent which is sufficient to arrest the natural hair cycle in the catagen phase. In still other embodiments, the therapeutically effective amount may include that amount of an agent which is sufficient to inhibit the smooth muscle cell-like contractile activity of dermal sheath cells of a hair follicle. Each of these therapeutically effective amounts may be considered as equivalents one to the other.

Treatment

As used herein, reference to "treatment" refers to the arrest or otherwise slowing of hair loss. In some embodiments, such treatment can be achieved by arresting the natural hair cycle in the catagen phase with one or more therapeutically effective agents. In other embodiments, such treatment can be achieved by inhibiting the smooth muscle cell-like contractile activity of the dermal sheath cells of a hair follicle. In still other embodiments, such treatment can be achieved by the inhibition of the myosin light chain kinase (MLCK) pathway in the dermal sheath cells. Each of these means can be considered equivalent or at least overlapping in scope because they each are achieved by the inhibition of smooth muscle cell function of the dermal sheath cells, e.g., by administering a therapeutically effective amount of an inhibitor of the myosin light chain kinase (MLCK) pathway.

Pharmacological Agent

As used herein, reference to a "pharmacological agent" can include a small molecule compound, a therapeutic peptide, a therapeutic polypeptide (e.g., an antibody), which exhibits a therapeutic effect, e.g., the inhibition of the myosin light chain kinase pathway, the arrest of the natural hair cycle in the catagen phase, or the inhibition of the smooth muscle cell-like contractile activity of dermal sheath cells in the hair follicles. In some embodiments, the compounds, peptides, and/or polypeptides can include functional derivatives of known compounds. The term "functional derivative" refers to a structurally or chemically modified variant of a known agent which has the same or substantially the same activity as the known agent.

B. Pharmacological Agents (e.g., MLCK Inhibitors)

The disclosure provides pharmacological agents (e.g., MLCK inhibitors) which can include small molecule compounds, therapeutic peptides, or therapeutic polypeptides (e.g., an antibody) (or combinations thereof) which exhibit a therapeutic effect, e.g., the inhibition of the myosin light chain kinase pathway, the arrest of the natural hair cycle in the catagen phase, or the inhibition of the smooth muscle cell-like contractile activity of dermal sheath cells in the hair follicles. Further, the disclosure provides methods of treating hair loss by administering a therapeutically effective amount of such pharmacological agents. Such therapeutic effects can include the inhibition of the myosin light chain kinase (MLCK) pathway, the arrest of the natural hair cycle in the catagen phase, or the inhibition of the smooth muscle cell-like contractile activity of dermal sheath cells in the hair follicles.

The MLCK pathway involves the interaction of multiple proteins to ultimately cause an increase in phosphorylation of the myosin light chain, and the contraction of smooth muscle cells. Without being bound by theory, the present inventors have discovered and/or shown the existence of the MLCK pathway in the dermal sheath cells of the hair follicles and their association with a smooth muscle cell-like contractility activity which is responsible for the movement of the dermal papilla (DP) cells from the lower portion of the hair follicle upwards to a position adjacent the stem cell bulb in the upper portion of the hair follicle during the catagen phase. The present methods may involve inhibiting the normal function of any suitable protein target involved in the MLCK pathway which results in inhibition of the MLCK pathway and the smooth muscle cell contractions of the dermal sheath cells. Such proteins include, but are not limited to, calmodulin, MLCK, pp60 SRC, and myosin light chain phosphatase (MYLP).

In certain embodiments, the herein methods may involve administering a pharmaceutical agent that inhibits the myosin light chain kinase (MLCK) pathway and consequently, the inhibition of the smooth muscle cell-like contractions of dermal sheath cells of the hair follicles.

In certain aspects, the pharmaceutical agents may specifically inhibit a myosin light-chain kinase (MLCK). MLCK refers to a set of serine/threonine-specific protein kinases which play an important role the mechanism of contractions in smooth muscle. MLCK is calcium cation dependent, an influx of calcium cations ($Ca^{2+}$) into the muscle binds to calmodulin. After binding to calmodulin, pp60 SRC (a protein kinase) phosphorylates MYLK, activating it and resulting in an increase in phosphorylation of the myosin light chain. Phosphorylation of MLCK enables the myosin crossbridge of phosphorylated myosin light chain with myosin heavy chain to bind to the actin filament and allow contractions to begin. Myosin light chain phosphorylation is balanced with dephosphorylation by myosin light chain phosphatase (MYLP). MLCK pathway-mediated smooth muscle contraction of DS cells is in at least part causative of the progression of the hair shaft migration out of the follicle and allow the follicle to progress from one phase to the next. Inhibiting MLCK, inhibits the contractions of the smooth muscle of the hair follicle. Since follicle niche physiology can at least in part affect the rate at which the follicle progresses through the hair growth cycle, this inhibition will decrease the likelihood the follicle will leave catagen and enter telogen. As a result, it is likely to retain the mature club hair. In some embodiments, a pharmacological agent is applied to inhibit MLCK in the dermal sheath to prevent or treat (e.g., inhibit) hair loss. In some embodiments the pharmacological agent is a compound, a peptide, or an antibody which inhibits myosin light chain kinase.

Various pharmacological agents are known in the art which inhibit MLCK activity. In some embodiments, the pharmacological agent is inhibitor of myosin light chain kinase (i.e., an MLCK inhibitor), such as, but not limited to, wortmannin, KT5926, K-252a, MS-444, ML-9, or ML-7, or combinations thereof, including all functional equivalents, analogs, and pharmaceutically effective derivatives of these inhibitors, which include any pharmaceutically acceptable salt, ester, or salt of such ester, of a compound of this disclosure, or any other compound which, upon administration to a recipient, is capable of providing (directly or indirectly) an MLCK inhibitory effect. These compounds are known in the art and are readily available from commercial sources, e.g., from MILLIPORE SIGMA. Additional MLCK inhibitors can include, for example, staurosporine (e.g., U.S. Pat. No. 6,110,912), calphostin C, H-7, H-8, H-89, HA-1 00, HA-1 077, K252b, piceatannol, peptide 18, Sm-I peptide, peptide 342-352. In addition, examples of MLCK inhibitors may be found in Xiong et al., "Myosin light chain kinase: a potential target for treatment of inflammatory disease," *Front Pharmacol*, 2017, 8:292 (e.g., see Table 2 of Xiong et al.); Luck, S., and Choh, V. (2011), "Effects of a myosin light chain kinase inhibitor on the optics and accommodation of the avian crystalline lens," Mol Vis. 17, 2759-2764; Chang, et al. (2016), "Cardiac myosin light chain is phosphorylated by Ca2+/calmodulin-dependent and -independent kinase activities," Proc. Natl. Acad. Sci. U.S.A. 113, E3824-E3833; and Saitoh, et al. (1987), "Selective inhibition of catalytic activity of smooth muscle myosin light chain kinase," J. Biol. Chem. 262, 7796-7801, each of which is incorporated herein by reference in their entireties. In addition, further examples of MLCK inhibitors that may be used in the accordance with the instant disclosure include any of those compounds or polypeptides disclosed in US 2008/0081078 ("Prevention of Cell Proliferation by Inhibiting Myosin Light Chain Kinase").

In some embodiments, the pharmacological agent is wortmannin, having the following structure,

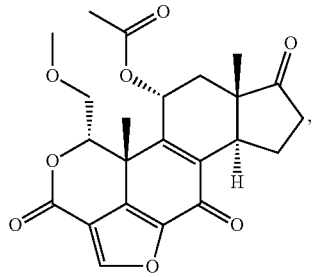 [SMILES: COC[C@H]1OC(=O)c2coc3c2[C@@]1(C)C1=C(C3=O)[C@@H]2CCC(=O)[C@@]2(C)C[C@H]1OC(C)=O]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

In some embodiments, the pharmacological agent is KT5926 ((8R*,9S*,11S*)-(−)-9-hydroxy-9-methoxycarbonyl-8-methyl-14-n-propoxy-2,3,9,10-tetrahydro-8,11-epoxy, 1H,8H, 11H-2,7b,11a-triazadibenzo[a,g]cycloocta[cde]trinden-1-one), and having the following structure:

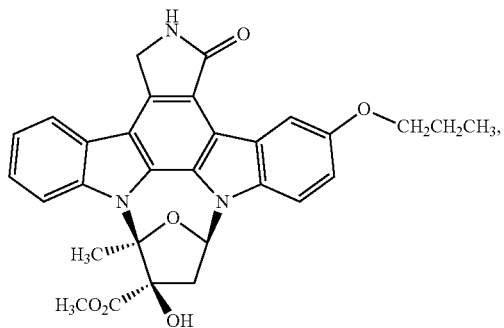

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect. See e.g., Nakanishi et al., "KT5926, a potent and selective inhibitor of myosin light chain kinase," *Mol Pharmacol*, 1990, 37(4): 482-8, which is incorporated herein by reference.

In some embodiments, the pharmacological agent is K-252a ((8R*,9S*,11S*)-(−)-9-hydroxy-9-methoxycarbonyl-8-methyl-2,3,9,10-tetrahydro-8,11-epoxy-1H,8H,11H-2,7b,11a-triazadibenzo[a,g]cycloocta[cde]trinden-1-one) having the chemical structure of:

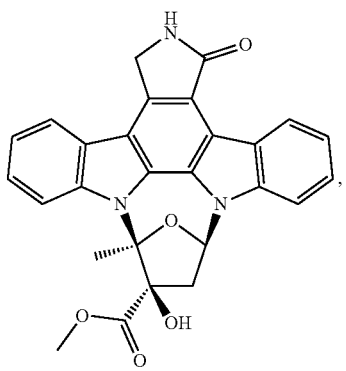 [SMILES: COC(=O)[C@@]1(O)C[C@H]2O[C@]1(C)n1c3ccccc3c3c4c(c5c6ccccc6n2c5c31)C(=O)NC4]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect. See e.g., Nakanishi et al., "K-252a, a novel microbial product, inhibits smooth muscle myosin light chain kinase," *J. Biol. Chem*, 1988, 263(13): 6215-9, the contents of which are incorporated by reference.

In other embodiments, the pharmacological agent is staurosporine, having the chemical structure:

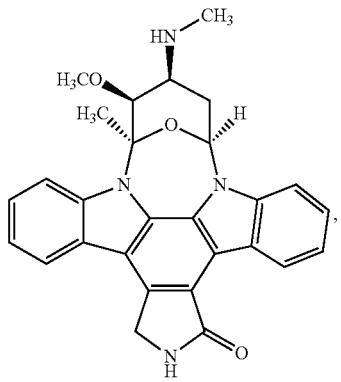 [SMILES: CN[C@H]1C[C@@H]2O[C@](C)([C@H]1OC)n1c3ccccc3c3c4c(c5c6ccccc6n2c5c31)C(=O)NC4]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

In various embodiments, the pharmacological agent is K-252b, having the chemical structure:

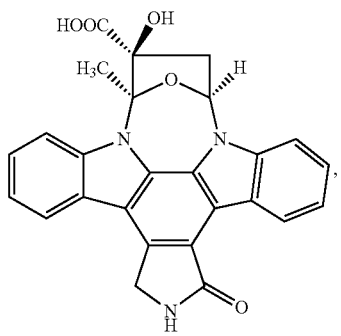 [SMILES: C[C@@]12O[C@@H](C[C@@]1(O)C(=O)O)n1c3ccccc3c3c4c(c5c6ccccc6n2c5c31)CNC4=O]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

In some embodiments, the pharmacological agent is MS-444 having the chemical structure of:

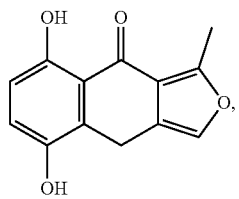 [SMILES: Cc1occ2c1C(=O)c1c(O)ccc(O)c1C2]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect. See e.g., Nakanishi, et al. "MS-444, a new inhibitor of myosin light chain kinase from *Micromonosporasp.* KY7123," *The Journal Of Antibiotics,* 1995, 48(9):948-951, which is incorporated herein by reference.

In some embodiments, the pharmacological agent is ML-9 ([1-(5-chloronaphthalene-1-sulfonyl)-1H-hexahydro-1,4-diazepine]) having the chemical structure of:

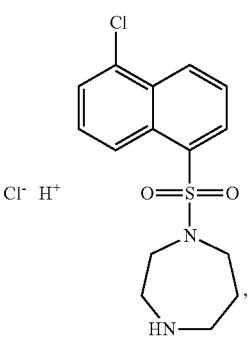

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect. See e.g., Ito et al., "ML-9, a myosin light chain kinase inhibitor, reduces intracellular Ca2+ concentration in guinea pig trachealis," *Euro J Pharmacol,* 2004, 486: 325-33; also see Takahashi et al., "Myosin light chain kinase-independent inhibition by ML-9 of murine TRPC6 channels expressed in HEK293 cells," Br J Pharmacol. 2007 September; 152(1): 122-31, both of which are incorporated herein by reference.

In some embodiments, the pharmacological agent is ML-7 (hexahydro-1-[(5-iodo-1-naphthalenyl)sulfonyl]-1H-1,4-diazepine hydrochloride) having the chemical structure:

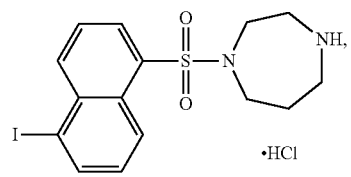 [SMILES: O=S(=O)(c1cccc2c(I)cccc12)N1CCCNCC1 ; Cl]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect. See e.g., Xiong et al., "Myosin light chain kinase: a potential target for treatment of inflammatory disease," *Front Pharmacol,* 2017, 8:292; also see Saitoh et al., "Selective inhibition of catalytic activity of smooth muscle myosin light chain kinase," *J Biol Chem,* 1987, 262(16): 7796-801, both of which are incorporated herein by reference.

Other MLCK inhibitors may include:

A-3, having the chemical name, N-(2-aminoehtyl)-5-chloronaphtalene-1-hydrochloride sulphonamide, HCL), and having the following structure:

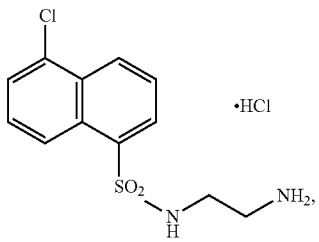 [SMILES: NCCNS(=O)(=O)c1cccc2c(Cl)cccc12 ; Cl]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

Calphostin C, having the following structure:

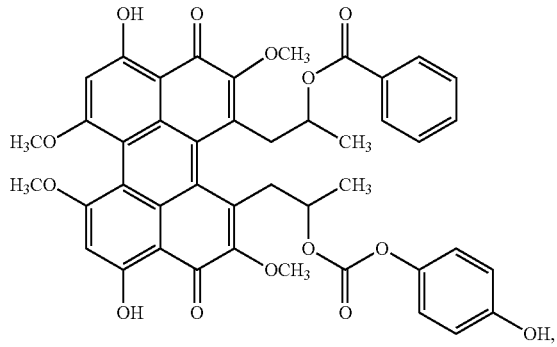 [SMILES: COc1c(CC(C)OC(=O)Oc2ccc(O)cc2)c2c3c(CC(C)OC(=O)c4ccccc4)c(OC)c(=O)c4c(O)cc(OC)c(c5c(OC)cc(O)c(c1=O)c52)c43]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

H-7, having the chemical name, N-[2-methylamino) ethyl]-5-dihydrochloride isoquinolinesulfonamide.2HCl, and having the following structure:

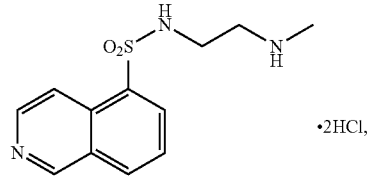 [SMILES: CNCCNS(=O)(=O)c1cccc2cnccc12]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

H-8, having the chemical name, N-[2-methylamino) ethyl]-5-dihydrochloride isoquinolinesulfonamide.2HCl, and having the following structure:

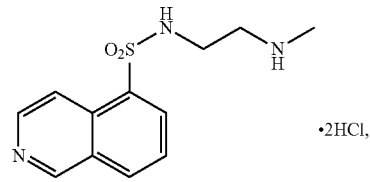 [SMILES: CNCCNS(=O)(=O)c1cccc2cnccc12]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

H-89, having the chemical name, N-[2-p-bromoinnamylamino)ethyl]-5]dihydrochloride isoquinolinesulfonamide.2HCl, and having the following structure:

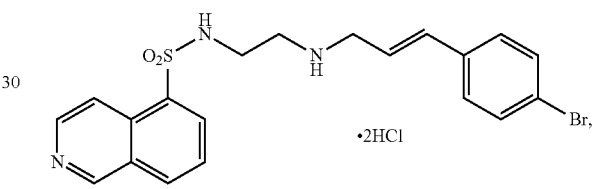

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

HA-100, having the chemical name, 1-(5-isoquinolinylsulfonyl)piperazine.2HCl, and having the following structure:

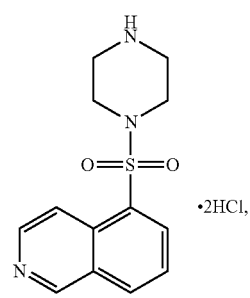 [SMILES: O=S(=O)(c1cccc2cnccc12)N1CCNCC1]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

HA-1077, having the chemical name, 1-(5-dihydrochloride isoquinolinylsulfonyl)homopiperazine.2HCl, and having the following structure:

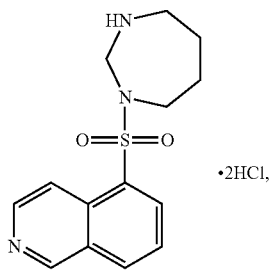

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

ML-9, having the chemical name, 1-(5-chloronapthalene-1-sulfonyl)-1H-hexahydro-1,4-diazepine.HCl, and having the following structure:

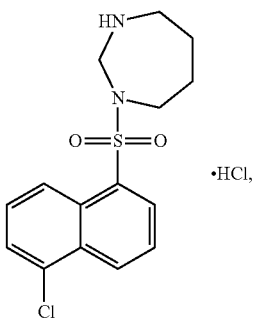 [SMILES: O=S(=O)(c1cccc2c(Cl)cccc12)N1CCCCNC1]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

Piceatannol, having the chemical name trans-3-3'-4,5'-tetrahyroxystilbene, and having the following structure:

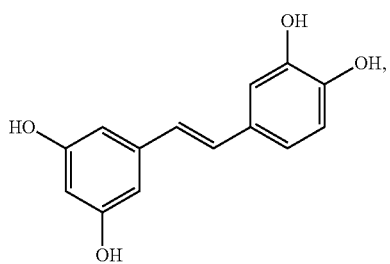 [SMILES: Oc1cc(O)cc(/C=C/c2ccc(O)c(O)c2)c1]

including all functional equivalents, analogs, and pharmaceutically effective derivatives of this inhibitor, which include any pharmaceutically acceptable salt, ester, or salt of such ester, of the compound, or any other compound which, upon administration to a recipient, is capable of providing (directly or indirectly) an MLCK inhibitory effect.

In addition, MLCK inhibitors can include any known peptide MLCK inhibitor, including the following two commercially available polypeptides:

MLCK Inhibitor Peptide 18 having an amino acid sequence of H-RKKYKYRRK-NH$_2$ (SEQ ID NO: 1) (see Zolotarevsky, Y., et al. 2002. Gastroenterology 123, 163, and Lukas, T. J., et al. 1999. J. Med. Chem. 42, 910, each of which is incorporated herein by reference); and Inhibitor Polypeptides SM-1 (MLCK Inhibitor H-AKKL-SKDRMKKYMARRKWQKTG-NH$_2$ Peptide 480-501) (SEQ ID NO: 2).

In yet another embodiment, MLCK inhibitors may include an anti-MLCK antibody. The term "antibody" refers to a monoclonal or a polyclonal antibody, immunologically effective fragments thereof (e.g., Fab, Fab', or F(ab')$_2$), or a single chain version of the antibodies, usually designated as Fv regions. Methods of producing polyclonal and monoclonal antibodies, including binding fragments and single chain versions are well known in the art.

C. Pharmaceutical Compositions

In some embodiments, it may be advantageous to have the pharmacological agent administered in a composition. For example, the subject might have need of multiple treatments of which the route of administration, dosing, or frequency of administration is similar to that of the pharmacological agent. In some embodiments, there may be treatments the subject needs or desires which affect the same tissues or area of the subject's body. In some embodiments, treatments, agents, or other components may be administered to bolster, modulate, or otherwise affect the activity of the pharmacological agent. For example, agents may be added to accelerate or repress the activity of the pharmacological agent, thus making it more or less quickly acting. In other circumstances, it may be desired to add agents which make the pharmacological agent more or less potent, thus affecting dosing. Further, in some embodiments, agents may be added to address, treat, or prevent side effects associated with the pharmacological agent. Accordingly, in some embodiments, the composition may have a variety of pharmaceutically acceptable carriers, excipients, or supplementary pharmacological agents as part of the composition or as part of the method of administration along with the pharmacological agent. For example, a pharmacological agent preferably suspended in a physiologically compatible carrier (i.e., in a composition).

The compositions of the disclosure may comprise a pharmacological agent alone, or in combination with one or more other active or inactive components (e.g., a second active pharmacological agent for MLCK inhibition or other agent for a separate function). In some embodiments, a composition comprises 1, 2, 3, 4, 5, 6, or more different pharmacological agents, each having at least one effect on the subject related the prevention or treatment of hair loss. Suitable carriers may be readily selected by one of skill in the art in view of the indication for which the pharmacological agent directed. For example, one suitable carrier includes saline, which may be formulated with a variety of buffering solutions (e.g., phosphate buffered saline). Other exemplary carriers include sterile saline, lactose, sucrose, calcium phosphate, gelatin, dextran, agar, pectin, peanut oil, sesame oil, and water. The selection of the carrier is not a limitation of the present disclosure.

Optionally, the compositions of the disclosure may contain, in addition to the pharmacological agent(s) and carrier(s), other conventional pharmaceutical ingredients, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, and parachlorophenol. Suitable chemical stabilizers include gelatin and albumin.

Formulation of pharmaceutically-acceptable excipients and carrier solutions is well-known to those of skill in the art, as is the development of suitable dosing and treatment regimens for using the particular compositions described herein in a variety of treatment regimens. Typically, these formulations may contain at least about 0.1% of the active compound or more, although the percentage of the active ingredient(s) may, of course, be varied. For example, and without limiting, depending on the route of administration, formulations may be as low between about 1 or 2% or more, for example, or may be greater than 70% or more (e.g., 80%, 85%, 90%, 95%, 96%, 97%, 98%, 99%, 99.5% or more) of the weight or volume of the total formulation. Naturally, the amount of active compound in each composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

For administration of an aqueous solution, for example, the solution may be suitably buffered, if necessary, and the liquid diluent first rendered isotonic with sufficient saline or glucose. In this connection, a sterile aqueous medium that can be employed will be known to those of skill in the art. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

The pharmacological agents may be formulated such that they are suitable for topical or injectable use include sterile aqueous solutions or dispersions and sterile powders for the extemporaneous preparation of sterile injectable solutions or dispersions. Dispersions may also be prepared in glycerol, liquid polyethylene glycols, and mixtures thereof and in oils. Under ordinary conditions of storage and use, these preparations contain a preservative to prevent the growth of microorganisms. In many cases the form is sterile and fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Absorption properties (e.g., increased, decreased, accelerated, prolonged) of the pharmacological agent can be modulated by the use in the compositions known in the art, for example agents for the delaying absorption, for example, aluminum monostearate and gelatin.

The pharmacological agents disclosed herein may also be formulated in a neutral or salt form. Pharmaceutically-acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The use of such media and agents for pharmaceutical active substances is well known in the art. Supplementary active ingredients can also be incorporated into the compositions. The phrase "pharmaceutically-acceptable" refers to molecular entities and compositions that do not produce an allergic or similar untoward reaction when administered to a subject. Delivery vehicles such as liposomes, nanocapsules, micro-particles, microspheres, lipid particles, vesicles, and the like, may be used for the introduction of the compositions of the present disclosure into suitable subject cells or tissue.

The therapeutic agents described herein can be administered alone, or in combination with one or more other suitable hair loss drugs, at any effective dose, using any effective or suitable dosing regimen, and in any suitable dosing form, and administered by any suitable dosing route.

Hair loss agents are known in the art and in some cases marketed as hair growth enhancers. They operate by a variety of mechanisms of action which are poorly defined and/or not fully understood. For example, some operate to inhibit various hormones believed to shrink hair follicles, thereby maintaining the maximum hair shaft, while others purport to enhance hair growth by facilitating the opening of potassium channels in the cell membranes in and around the hair follicles, thereby theoretically increasing the amount of oxygen, blood, and nutrients reaching the hair follicle, thus promoting hair growth. In some embodiments, such hair loss agents can include one or more of finasteride, cyproterone acetate, alfatradiol, minoxidil, bimatoprost, bicalcutamide, spironolactone, flutamide, lantoanoprost, dutasteride, or ketoconazole, each of which are well known agents in the art for treating hair loss (e.g., see *Hair Loss: What to do if it happens to you*, Jordi B., 2010, iUniverse Books, Chapter 8: Pharmaceuticals: What's out there and how they work, which is incorporated herein by reference). In some embodiments, the agent for facilitating hair growth is one or more of finasteride, cyproterone acetate, alfatradiol, minoxidil, bimatoprost, bicalcutamide, spironolactone, each of which are well known agents in the art for treating hair loss, In some embodiments, the agent for facilitating hair growth is finasteride. In other embodiments, the agent for facilitating hair growth is cyproterone acetate. In some embodiments, the agent for facilitating hair growth is alfatradiol. In yet other embodiments, the agent for facilitating hair growth is minoxidil. In still other embodiments, the agent for facilitating hair growth is bimatoprost. In some embodiments, the agent for facilitating hair growth is bicalcutamide. In other embodiments, the agent for facilitating hair growth is lantoanoprost. In still other embodiments, the agent for facilitating hair growth is spironolactone. In yet other embodiments, the agent for facilitating hair growth is flutamide. In still other embodiments, the agent for facilitating hair growth is dutasteride. In some embodiments, the agent for facilitating hair growth is ketoconazole.

In some embodiments, the pharmacological agents described herein, and/or the hair loss agents may be administered with a penetration enhancer. Penetration enhancers are drugs, agents, compounds, or other substances, used to facilitation transport of another drug, compound, or substance (e.g., pharmacological agents) across a barrier (e.g., the skin, dermis, and/or epidermis). They are well known, characterized, and described in the art. The penetration enhancer can be formulated as a component of the pharmacological agent, as a component of a composition comprising the pharmacological agent and the penetration enhancer, as a component of a kit comprising the pharmacological agent and the penetration enhancer, or administered as part of a method comprising the use of the pharmacological agent and the penetration enhancer. In such instances where the penetration enhancer is not a component of the pharmacological agent or part of a composition comprising the pharmacological agent and the penetration enhancer, the penetration enhancer may be administered prior to, contemporaneously (i.e., simultaneously or nearly simultaneously) with, or subsequently to, administration of the pharmacological agent. In some embodiments, the penetration enhancer is formulated as a component of the pharmacological agent, as a component of a composition comprising the pharmacological agent and the penetration enhancer, as a component of a kit comprising the pharmacological agent and the penetration enhancer, or administered as part of a method comprising the use of the pharmacological agent and the penetration enhancer. In some embodiments, the penetration enhancer is administered prior to the pharmacological agent. In some embodiments, the penetration enhancer is administered contemporaneously (i.e., simultaneously or nearly simultaneously) to the pharmacological agent. In some embodiments, the penetration enhancer is administered subsequent to the pharmacological agent.

Penetration enhancers (e.g., sorption promoters or accelerants) are known in the art and will be readily apparent to one skilled in the art. Exemplary penetration enhancers are, sulphoxides (such as dimethyl sulphoxide, DMSO), Azones (e.g., laurocapram), pyrrolidones (e.g., 2-pyrrolidone, 2P), alcohols and alkanols (e.g., ethanol, or decanol), glycols (e.g., propylene glycol, PG, a common excipient in topically applied dosage forms), surfactants (also common in dosage forms), terpenes, dimethyl isosorbide, isopropyl myristate, and gabapentin. In some embodiments, the penetration enhancer is selected from the following: sulphoxides (such as dimethyl sulphoxide, DMSO), Azones (e.g., laurocapram), pyrrolidones (e.g., 2-pyrrolidone, 2P), alcohols and alkanols (e.g., ethanol, or decanol), glycols (e.g., propylene glycol, PG, a common excipient in topically applied dosage forms), surfactants (also common in dosage forms), terpenes, dimethyl isosorbide, isopropyl myristate, gabapentin, or a combination thereof. In some embodiments, the penetration enhancer is dimethyl sulphoxide. In some embodiments, the penetration enhancer is DMSO). In some embodiments, the penetration enhancer is laurocapram. In some embodiments, the penetration enhancer is 2-pyrrolidone. In some embodiments, the penetration enhancer is 2P. In some embodiments, the penetration enhancer is an alcohol. In some embodiments, the penetration enhancer is ethanol. In some embodiments, the penetration enhancer is an alkanol. In some embodiments, the penetration enhancer is decanol. In some embodiments, the penetration enhancer is propylene glycol. In some embodiments, the penetration enhancer is a surfactant. In some embodiments, the penetration enhancer is a terpene. In some embodiments, the penetration enhancer is dimethyl isosorbide. In some embodiments, the penetration enhancer is isopropyl myristate. In some embodiments, the penetration enhancer is gabapentin.

D. Methods of Use

Without being bound by theory, the present disclosure relates to the surprising discovery that dermal sheath cells of hair follicles bear the specific function of driving the upward relocation of the dermal progenitor niche cells at the bottom of the hair follicle to a position that is adjacent to stem cells in the upper region of the hair follicle during the progression of catagen phase. The inventors have discovered and demonstrated, it is believed for the first time, that this upward movement of the niche cells during catagen phase is propelled by the smooth muscle cell-like properties of the dermal sheath cells, i.e., the contraction properties of the dermal sheath cells. Without being bound by theory, the hair cycle may be (a) arrested in anagen phase by inhibiting the activation of catagen phase or (b) arrested in catagen phase by inhibiting or otherwise blocking the progression of catagen phase into telogen phase. Without being further bound by theory, each of these aspects of the hair cell cycle depend on the smooth muscle cell contractions of the dermal sheath cells; thus, in various embodiments, each of these effects may be induced by inhibiting the smooth muscle cell-like contractions of the dermal sheath cells. In some embodiments, this is achieved by inhibiting the myosin light chain kinase (MLCK) pathway, which disrupts the smooth muscle cell function of the dermal sheath cells, thereby inhibiting the activation of the catagen phase from the anagen phase or inhibiting the progression of the catagen phase. This results in the minimization of further hair loss, which would otherwise normally occur during the telogen phase (which naturally follows catagen phase). Thus, in various aspects, the present disclosure provides methods, compounds, and compositions for inhibiting the smooth muscle cell function of the dermal sheath cells as a means to inhibit the activation of catagen phase from anagen phase, or inhibit the progression of catagen phase.

Thus, in a first aspect, the disclosure relates to a method of treating hair loss by inhibiting the contraction of dermal sheath cells of a hair follicle. In some embodiments, the contraction of dermal sheath cells can be inhibited or blocked by the administering of a therapeutically effective amount of an agent which inhibits the myosin light chain kinase (MLCK) pathway, e.g., by inhibiting the myosin light chain kinase with a myosin light chain kinase inhibitor (e.g., wortmannin, KT5926, K-252a, MS-444, ML-9, or ML-7, or combinations thereof).

In a second aspect, for hair follicles in anagen phase, the disclosure relates to a method of treating hair loss by inhibiting the activation of catagen phase. In some embodiments, the inhibiting of activation of catagen phase can be achieved by the administering of a therapeutically effective amount of an agent which inhibits the myosin light chain kinase (MLCK) pathway, e.g., by inhibiting the myosin light chain kinase with a myosin light chain kinase inhibitor (e.g., wortmannin, KT5926, K-252a, MS-444, ML-9, or ML-7, or combinations thereof).

In a third aspect, for hair follicles in catagen phase, the disclosure relates to a method of treating hair loss by inhibiting the further progression of catagen phase (i.e., arresting catagen phase). In some embodiments, the inhibiting of catagen progression can be achieved by the administering of a therapeutically effective amount of an agent which inhibits the myosin light chain kinase (MLCK) pathway, e.g., by inhibiting the myosin light chain kinase with a myosin light chain kinase inhibitor (e.g., wortmannin, KT5926, K-252a, MS-444, ML-9, or ML-7, or combinations thereof).

In a fourth aspect, the disclosure relates to a method of treating hair loss comprising administering a therapeutically effective amount of a pharmacological agent that inhibits the myosin light chain kinase (MLCK) pathway in a dermal sheath cell of a hair follicle, thereby treating hair loss. In some embodiments, the pharmacological agent is a compound, a peptide, or an antibody which inhibits myosin light chain kinase. In some embodiments, the myosin light chain kinase (MLCK) pathway can be inhibited with a myosin light chain kinase (MLCK) inhibitor (e.g., wortmannin, KT5926, K-252a, MS-444, ML-9, or ML-7, or combinations thereof).

In various embodiments, the objective of preventing further hair loss (e.g., by inhibiting the progression of catagen phase, or inhibiting the activation into catagen phase from anagen phase) involves the general concept of inhibiting the smooth muscle cell-like contraction of the dermal sheath cells. Any suitable approach for inhibiting smooth muscle cell-like contractions of the dermal sheath cells is envisioned and may involve, for example, an agent which inhibits a target protein or molecular pathway which is involved in the biologic process of smooth muscle cell-like contractions. As a non-limiting example, the methods envision administering an agent which inhibits the myosin light chain kinase (MLCK) pathway, which refers to the signaling pathway that activates smooth muscle cell contractions in dermal sheath cells. The blocking or inhibiting of same impedes follicle contraction, regression and niche relocation, as demonstrated in the Examples. The disclosure provides pharmacological agents which can include small molecule compounds, therapeutic peptides, or therapeutic polypeptides (e.g., an antibody) (or combinations thereof) which exhibit a therapeutic effect, e.g., the inhibition of the myosin light chain kinase pathway, the inhibition of catagen activation, the arrest of the natural hair cycle in the catagen phase, or the inhibition of the smooth muscle cell-like contractile activity of dermal sheath cells in the hair follicles.

Such inhibition may be achieved in certain embodiments through the administration of one or more agents that inhibit smooth muscle cell function, e.g., an inhibitor of the myosin light chain kinase (MLCK) pathway.

In yet another aspect, the disclosure relates to a method of treating hair loss by the administration of one or more agents that inhibit smooth muscle cell function in dermal sheath cells, e.g., an inhibitor of the myosin light chain kinase (MLCK) pathway in dermal sheath cells. In some embodiments, the administration of one or more agents that inhibit smooth muscle cell function in dermal sheath cells, e.g., an inhibitor of the myosin light chain kinase (MLCK) pathway in dermal sheath cells inhibits the catagen phase of the hair growth cycle from activating (i.e., initiating).

In still another aspect, the disclosure relates to a method of treating hair loss by the administration of an inhibitor of the myosin light chain kinase (MLCK) pathway in dermal sheath cells. In some embodiments, the administration of an inhibitor of the myosin light chain kinase (MLCK) pathway in dermal sheath cells inhibits the catagen phase of the hair growth cycle from activating (i.e., initiating).

The above methods of use are not intended to be limiting. The present disclosure relates to the observation that dermal sheath cells of hair follicles bear the specific function of driving the upward relocation of the dermal progenitor niche cells at the bottom of the hair follicle to a position that is adjacent to stem cells in the upper region of the hair follicle during the progression of catagen phase and that this biological process is driven by the smooth muscle cell-like contractions of the dermal sheath cells. Thus, the methods contemplated herein may include any reasonable approach that results in the inhibition of the contraction properties of the dermal sheath cells, e.g., the inhibition of the MLCK pathway.

E. Methods of Administration

The pharmacological agents described herein, or compositions thereof, may be administered to a variety of subjects, generally, any subject in need of, or suspected to be in need of, prevention or a treatment for hair loss (e.g., host animal, such as a human, mouse, rat, cat, dog, sheep, rabbit, horse, cow, goat, pig, guinea pig, hamster, chicken, turkey, or a non-human primate (e.g., Macaque)). In some embodiments, the subject is a human subject.

Delivery of the pharmacological agents, or a compositions thereof, may be through any acceptable route known in the art. For example the pharmacological agent may be administered topically or through injection, for example microinjections to the scalp. Routes of administration may be combined, if desired. When administered topically, the administration may be by hand, by spray, by gel, by ointment, by lotion, as a shampoo or conditioner, and generally by any vehicle which can be applied to the target tissue surface (e.g., scalp, hair growing area) to be treated. Applicators (e.g., brush, dropper, squeeze bottle, spray bottle) may be used to facilitate that administration of the pharmacological agent to the target tissue and area. Combinations of methods may be used, for example a topical gel in combination with a spray or shampoo. In some embodiments, the pharmacological agent is administered topically. In some embodiments, the pharmacological agent is administered topically by a gel. In some embodiments, the pharmacological agent is administered topically by a shampoo. In some embodiments, the pharmacological agent is administered topically by a lotion. In some embodiments, the pharmacological agent is administered topically by a spray. In some embodiments, the pharmacological agent is administered topically by a conditioner. In some embodiments, the pharmacological agent is administered topically by an aqueous solution.

The pharmacological agents, or compositions thereof, may be administered in a variety of doses and or according to a variety of administration schedules. One of ordinary skill in the art will readily be capable and able to determine such a dosing and administration plan. In some cases, the pharmacological agent is administered once. In some embodiments, the pharmacological agent is administered more than once or in multiple doses. In some embodiments, the doses are once per calendar day, in other embodiments, the dose is once per calendar week, calendar month, calendar year, any partial portion of any period, any iteration or combination thereof, or other schedule as one of ordinary skill in the art will be able to ascertain (e.g., bi-weekly, ever 2, 3, 4, 5, 6 . . . calendar days, weeks, months, years).

The pharmacological agents can be administered in a sufficient amount to achieve the desired effect (i.e., inhibition of MLCK and/or hair loss) in the subject. A "therapeutic effect," "effective amount," or "therapeutically effective amount" of pharmacological agent is an amount sufficient to target and effect the desired tissue to the desired degree without undue adverse effects. The effective amount will depend primarily on factors such as the species, age, weight, health of the subject, and the tissue to be targeted, and may thus vary among animal and tissue. The effectiveness may be assessed through a measure of its inhibitory concentration (IC), which is a measure of the level of reduction of activity of the target by a given amount of the inhibitor. Often the IC is measured by the amount of inhibitor required to reduce the target by half, this amount is referred to as the half maximal inhibitory concentration (IC50). In some embodiments, an effective amount of a pharmacological agent is an amount sufficient to inhibit MLCK and/or inhibit or treat hair loss. In some embodiments, the IC50 is in a range of 500 nano-moles (nM) to 1 nM. In some embodiments, the IC50 is in the range of 200 nM to 50 nM. In some embodiments, the IC50 is 100 nM or less. In some embodiments, the IC50 of the MLCK inhibitor, compound, peptide, or antibody is 500 nM or less. In some embodiments, the IC50 of the MLCK inhibitor, compound, peptide, or antibody is 450 nM or less. In some embodiments, the IC50 of the MLCK inhibitor, compound, peptide, or antibody is 400 nM or less. In some embodiments, the IC50 of the MLCK inhibitor, compound, peptide, or antibody is 350 nM or less. In some embodiments, the IC50 of the MLCK inhibitor, compound, peptide, or antibody is 300 nM or less. In some embodiments, the IC50 of the MLCK inhibitor, compound, peptide, or antibody is 250 nM or less. In some embodiments, the IC50 of the MLCK inhibitor, compound, peptide, or antibody is 200 nM or less. In some embodiments, the IC50 of the MLCK inhibitor, compound, peptide, or antibody is 190 nM or less. In some embodiments, the IC50 of the MLCK inhibitor, compound, peptide, or antibody is 180 nM or less. In some embodiments, the IC50 of the MLCK inhibitor, compound, peptide, or antibody is 170 nM or less. In some embodiments, the IC50 of the MLCK inhibitor, compound, peptide, or antibody is 160 nM or less. In some embodiments, the IC50 of the MLCK inhibitor, compound, peptide, or antibody is 150 nM or less. In some embodiments, the IC50 of the MLCK inhibitor, compound, peptide, or antibody is 140 nM or less. In some embodiments, the IC50 of the MLCK inhibitor, compound, peptide, or antibody is 130 nM or less. In some embodiments, the IC50 of the MLCK inhibitor, compound, peptide, or antibody is 120 nM or less. In some embodiments, the IC50 of the MLCK inhibitor, compound, peptide, or antibody is 110 nM or less. In some embodiments, the IC50 of the MLCK inhibitor, compound, peptide, or antibody is 100 nM or less. In some embodiments, the IC50 of the MLCK inhibitor, compound, peptide, or antibody is 90 nM or less. In some embodiments, the IC50 of the MLCK inhibitor, compound, peptide, or antibody is 85 nM or less. In some embodiments, the IC50 of the MLCK inhibitor, compound, peptide, or antibody is 80 nM or less. In some embodiments, the IC50 of the MLCK inhibitor, compound, peptide, or antibody is 75 nM or less. In some embodiments, the IC50 of the MLCK inhibitor, compound, peptide, or antibody is 70 nM or less.

In some embodiments, the effective amount of the pharmacological agent is adjusted according to the level of inhibition of as measured by cessation of dermal sheath cell contractions, thereby halting the hair cycle in the catagen phase. This may be done by periodic evaluations of the hair visually, or by any means in the art. Evaluation may also be made by evaluation of the treated tissue for physiological changes to the tissue. For example, biopsies may be used to evaluate the follicles for cessation of dermal sheath cell contractions.

In another aspect, the disclosure relates to a method of identifying an agent capable of treating hair loss, comprising, administering a test agent to a cell culture of dermal sheath cells, detecting the production of one or more biomarkers indicative of the inhibition of dermal sheath contraction, validating a test agent in a hair follicle model to confirm that the test agent inhibits dermal sheath contraction, thereby identifying an agent capable of treating hair loss.

Biomarkers are measurable substances present in a target subject or tissue which the presence, or absence of, is indicative or represents a physiological state of the target subject or tissue (e.g., health, disease, infection, exposure to environmental factors, growth state). Biomarkers which indicate a cellular slowing, regression, or halting of transition in the hair follicle or dermal sheath, from one phase of growth to another, especially catagen to telogen, are target biomarkers. For example, biomarkers associated with MLCK, smooth muscle contractions, cell growth and proliferation, and phosphorylation may be helpful biomarkers. Further, biomarkers associated with the activation or inactivation of certain genes related to the transition of phases in the hair follicle, such as the presence of certain proteins, mRNA transcripts, miRNA, or other nucleic acids may also be used as biomarkers for the methods described herein.

F. Kits

The pharmacological agents described herein may, in some embodiments, be assembled into pharmaceutical, therapeutic, diagnostic, or research kits to facilitate their use in therapeutic, diagnostic, or research applications. A kit may include one or more containers housing the components of the disclosure and instructions for use. Specifically, such kits may include one or more agents described herein, along with instructions describing the intended application and the proper use of these agents. In certain embodiments agents in a kit may be in a pharmaceutical formulation and dosage suitable for a particular application and for a method of administration of the agents. Kits for research purposes may contain the components in appropriate concentrations or quantities for running various experiments.

The kit may be designed to facilitate use of the methods described herein by subjects, medical professionals, practitioners, and/or researchers and can take many forms. Each of the compositions of the kit, where applicable, may be provided in liquid form (e.g., in solution), or in solid form, (e.g., a dry powder). In certain cases, some of the compositions may be constitutable or otherwise processable (e.g., to an active form), for example, by the addition of a suitable solvent or other species (for example, water or a cell culture medium), which may or may not be provided with the kit. As used herein, "instructions" can define a component of instruction and/or promotion, and typically involve written instructions on or associated with packaging of the disclosure. Instructions also can include any oral or electronic instructions provided in any manner such that a user will clearly recognize that the instructions are to be associated with the kit, for example, audiovisual (e.g., videotape, DVD, etc.), Internet, and/or web-based communications, etc. The written instructions may be in a form prescribed by a governmental agency regulating the manufacture, use or sale of pharmaceuticals or biological products, which instructions can also reflects approval by the agency of manufacture, use or sale for animal administration.

The kit may contain any one or more of the components described herein in one or more containers. As an example, in one embodiment, the kit may include instructions for mixing one or more components of the kit and/or isolating and mixing a sample and applying to a subject. The kit may include a container housing agents described herein. The pharmacological agents may be in the form of a liquid, gel or solid (e.g., powder). The agents may be prepared sterilely, packaged in syringe and shipped refrigerated. Alternatively it may be housed in a vial or other container for storage. A second container may have other agents prepared sterilely. Alternatively the kit may include the active agents premixed and shipped in a syringe, vial, tube, or other container. The kit may have one or more or all of the components required to administer the agents to an animal, such as a syringe, topical application devices, or intravenous (iv) needle tubing and bag, particularly in the case of the kits for producing specific somatic animal models.

The kit may have a variety of forms, such as a blister pouch, a shrink wrapped pouch, a vacuum sealable pouch, a sealable thermoformed tray, or a similar pouch or tray form, with the accessories loosely packed within the pouch, one or more tubes, containers, a box, or a bag. The kit may be sterilized after the accessories are added, thereby allowing the individual accessories in the container to be otherwise unwrapped. The kits can be sterilized using any appropriate sterilization techniques, such as radiation sterilization, heat sterilization, or other sterilization methods known in the art. The kit may also include other components, depending on the specific application, for example, containers, cell media, salts, buffers, reagents, syringes, needles, a fabric, such as gauze, for applying or removing a disinfecting agent, disposable gloves, a support for the agents prior to administration etc.

Exemplary embodiments of the invention are described in more detail by the following examples. These embodiments are exemplary of the invention, which one skilled in the art will recognize is not limited to the exemplary embodiments.

EXAMPLES

In order that the invention described herein may be more fully understood, the following examples are set forth. The examples described in this application are offered to illustrate the methods, compositions, and systems provided herein and are not to be construed in any way as limiting their scope.

Example 1

Introduction

Tissue homeostasis requires the balance of growth by cell production and regression through cellular loss. In the hair cycle during follicle regression, the niche traverses the skin through an unknown mechanism to reach the stem cells and prime regeneration. Here, by cell specific ablation and intravital imaging in live mice, the follicle-lining dermal sheath is identified as the key driver of tissue regression and niche relocation via smooth muscle contractile machinery that generates centripetal constriction force. The calcium/calmodulin/myosin light chain kinase pathway is revealed as the mechanism of sheath contraction, that when blocked inhibits follicle contraction and impedes regression and niche relocation. Thus, the study identifies the dermal sheath as a smooth muscle that drives regression for reuniting niche and stem cells to regenerate tissue structure during homeostasis.

Figure 5A:
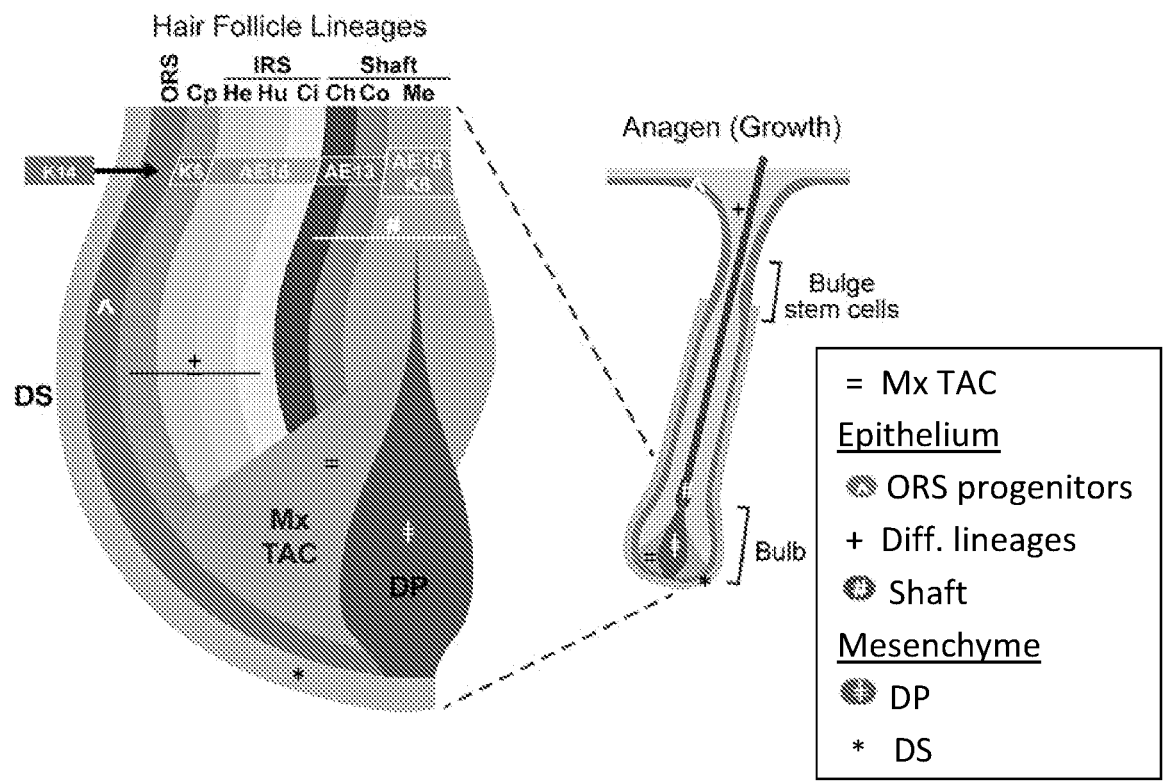
FIGS. 5A-5B show the hair follicle cycle of dynamic stem cell niche reorganization.
Figure 5B:
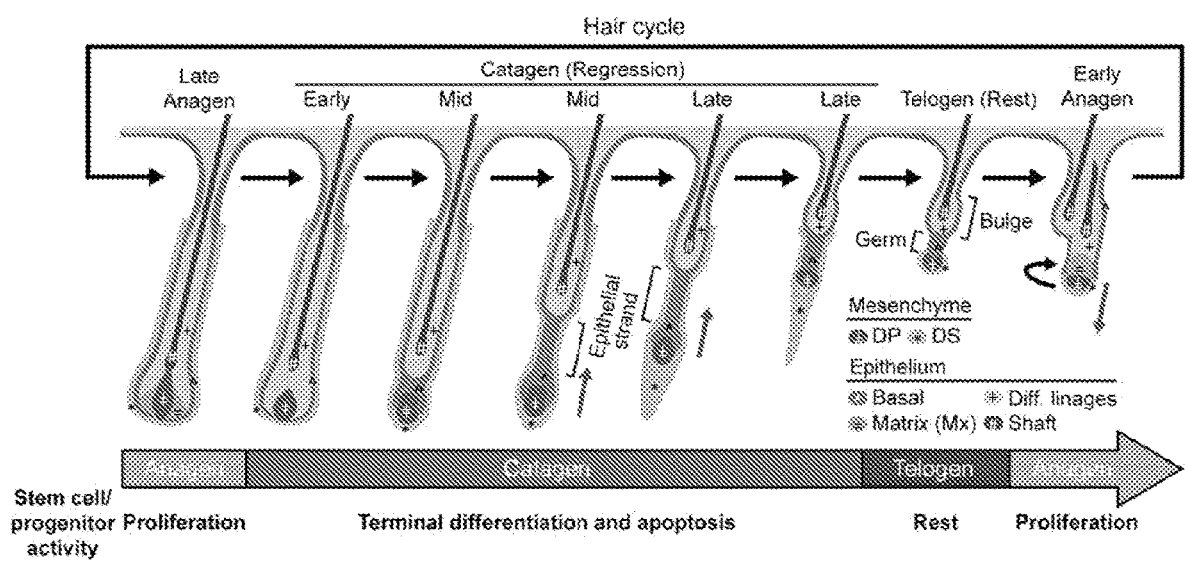

Multipotent progenitors produce new cells to replace those that have been lost by natural turnover and shedding in rapidly renewing tissues such as the bone marrow and hair follicle[1]. However, progenitors have limited renewal capacity and need replenishing from the stem cell reservoir, coordinated by specialized niche cells[2-4]. During hair growth, the specialized dermal papilla (DP) cluster secretes niche signals to orchestrate matrix progenitor proliferation, migration and differentiation at the base of follicle bulbs[5, 6] (FIG. 5A). To reboot the progenitor pool throughout life, repeated cycles[7] of follicle regression (catagen), rest (telogen) and regrowth (anagen) derive new cells from the bulge/germ stem cell reservoir located in the upper follicle[8-12] (FIG. 5B). During regression, matrix progenitors shut down proliferation and finish terminal differentiation, and outer root sheath (ORS) progenitors along the entire follicle axis undergo apoptotic pruning[13] driven by extrinsic signals[14, 15] Only the most direct stem cell progeny in the sub-bulge region of the ORS survive and retain multipotency, giving rise to a new bulge and germ stem cells[16, 17]. These cells then become reactivated by signals from the intact, surviving DP niche that needs to fully relocate from the follicle base to the stem cells to regenerate the follicle[18-20] (FIG. 5B).

Figure 6:
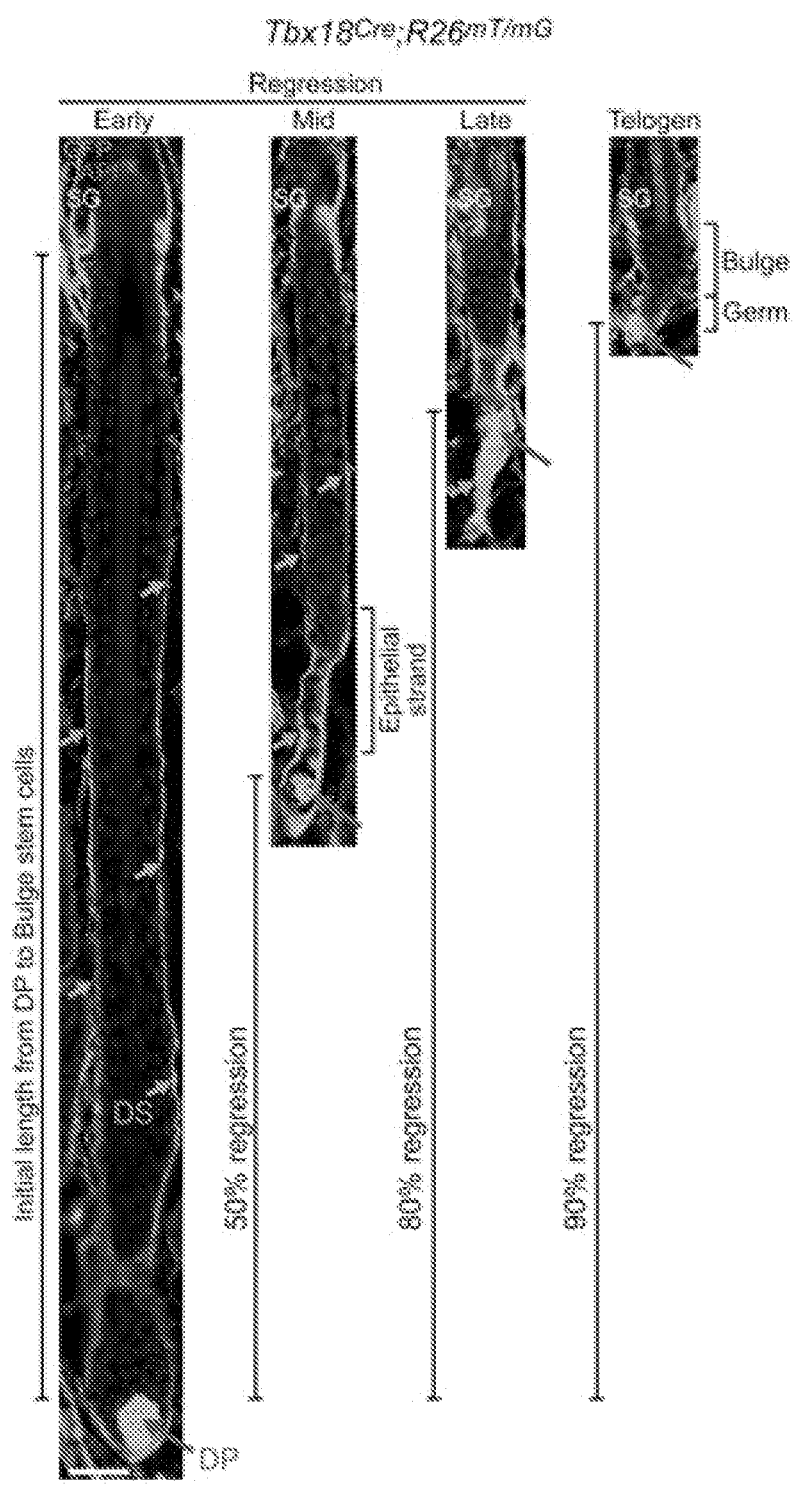
FIG. 6 shows a drastic homeostatic follicle remodeling and niche relocation to the stem cell reservoir during catagen regression. Histological section of Tbx$18^{Cre}$; R26$^{mT/mG}$ back skin follicles. Mesenchymal populations including DP (arrows pointing up and to the left) and DS (arrows pointing up and to the right) are marked by membrane GFP. During catagen regression, the DP niche relocates a distance of ~90% of the follicle length (between DP and sebaceous gland, SG). At the beginning of regression, matrix progenitors degenerate, and the DP niche (now rounded appearance) is only partially engulfed. During mid-regression, the DP is connected to the upper follicle via the regressing epithelial strand. The thin DS layer becomes notably thicker around the epithelial strand and DP. During final regression, the hair shaft reaches its final position and the DP is separated from the stem cell reservoir only by the epithelial strand. The DS forms a dense trailing empty sleeve below the DP. After the conclusion of regression (telogen=rest), the DP niche resides adjacent to the stem cell reservoir. Cell nuclei are highlighted by DAPI. Scale bar represents 50 µm.

Drastic tissue remodeling poses a considerable challenge for stem cell regulation precise and reliable niche relocation to the stem cell reservoir for preserving close communication lines. Indeed, erroneous detachment of the DP niche leads to stem cell dysfunction and complete hair loss[21, 22]. How the DP, while trailing the regressing epithelial strand, travels over 80% of the hair follicle length (FIG. 6) upward towards the stem cell reservoir is still unknown (FIG. 1A and FIG. 5B). Two hypotheses for DP movement have been proposed for many years[23]: (1) an "apoptotic force" generated by dying cells in the shrinking follicle and (2) a "contraction force" by follicle-encapsulating dermal sheath (DS) cells based on alpha smooth muscle actin (αSMA) expression identified nearly 3 decades ago[24].

Results and Discussion

Figure 1B:
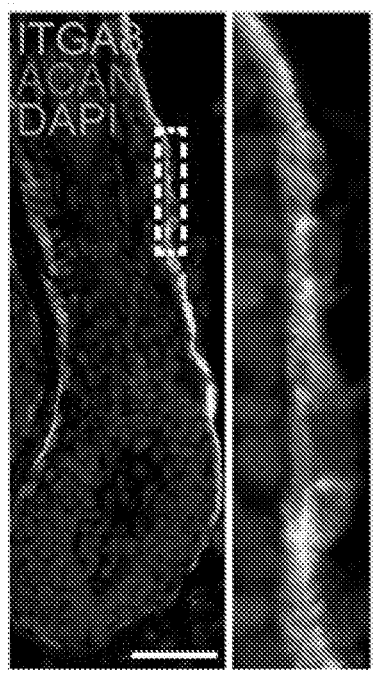
Figure 1C:
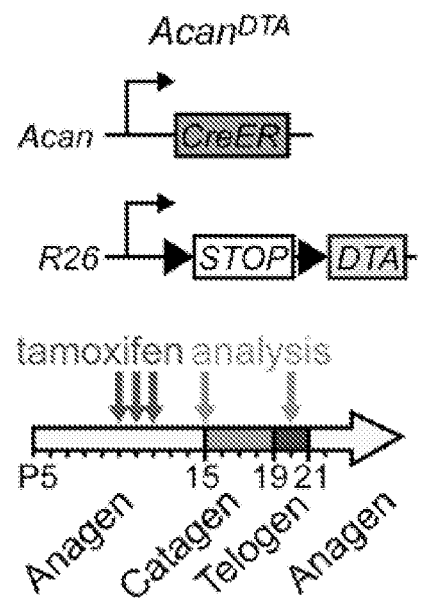
Figure 1D:
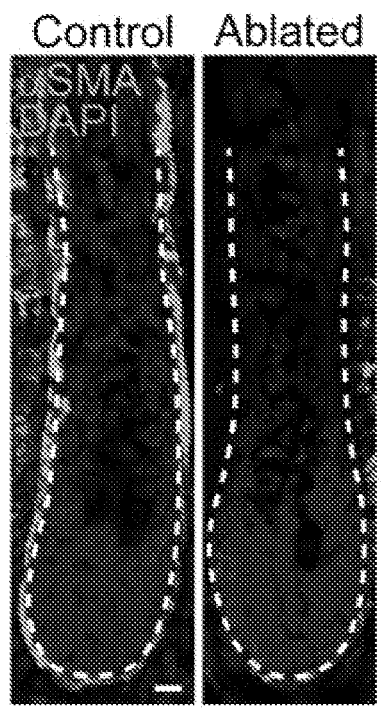
Figure 1E:
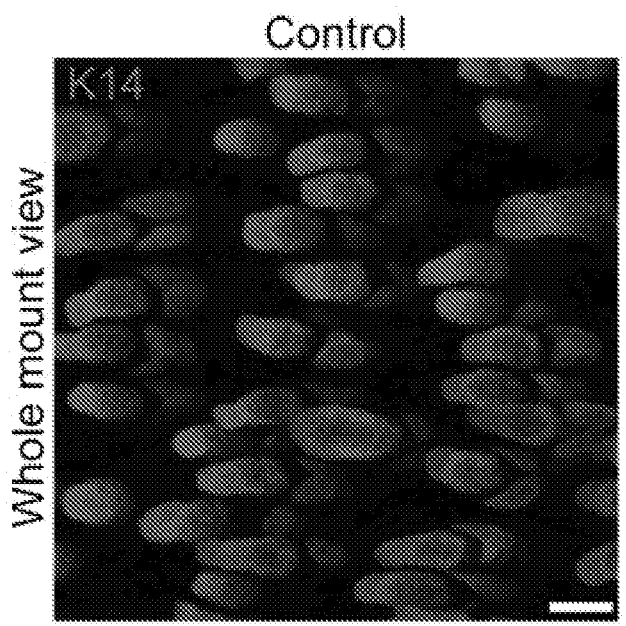
Figure 1F:
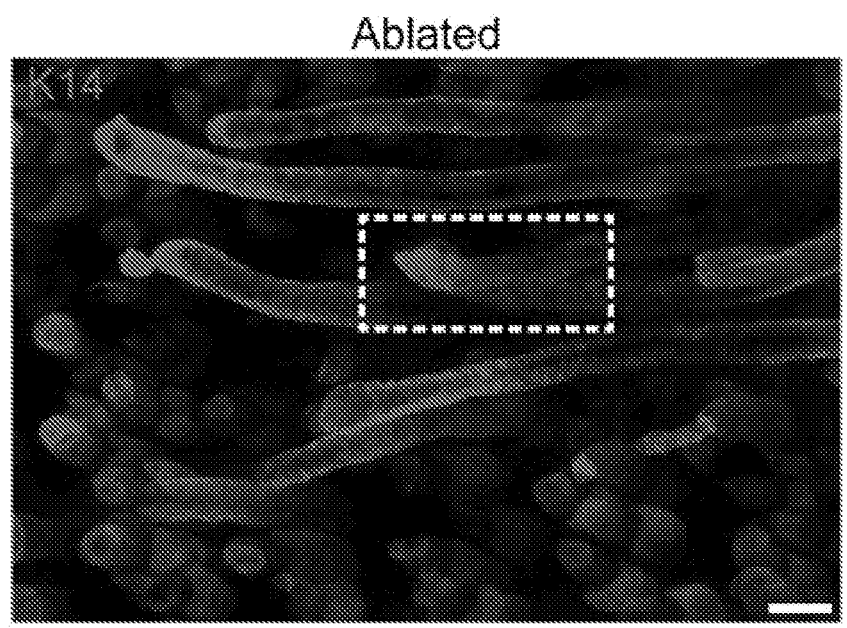
Figure 1G:
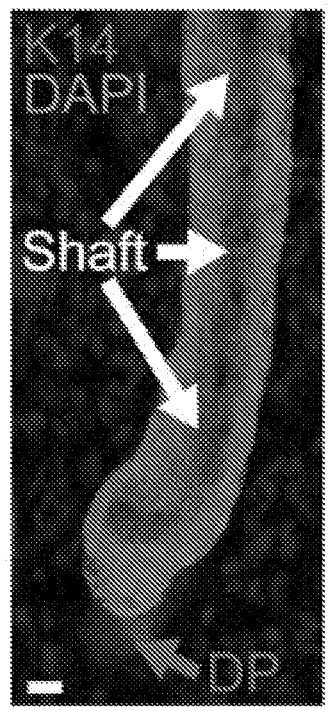
Figure 1H:
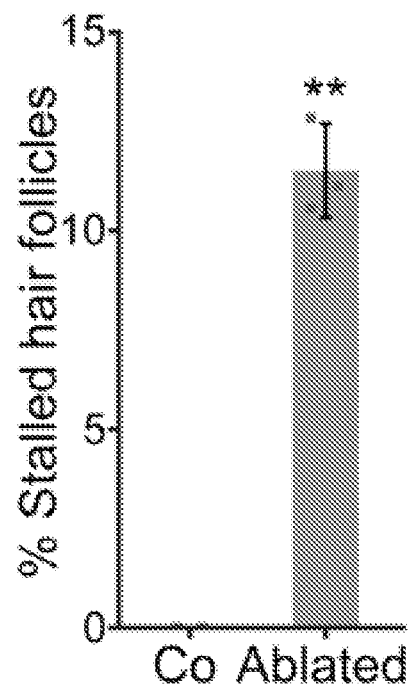
Figure 1I:
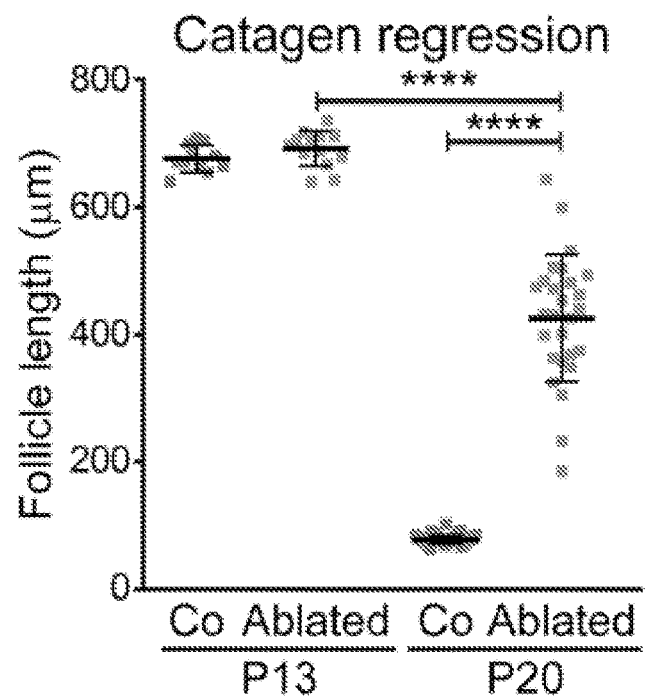
Figure 7A:
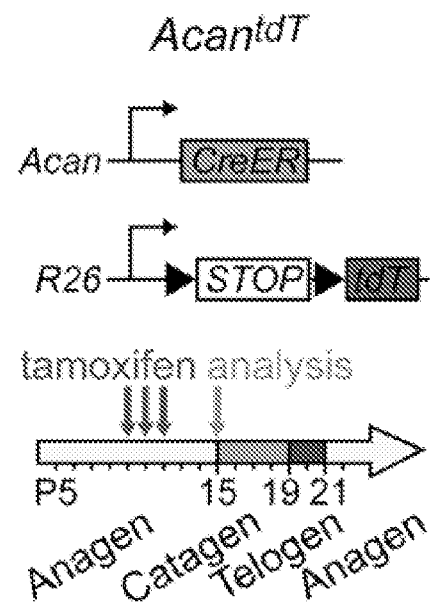
FIGS. 7A-7C show highly selective and inductive DS targeting with Acan$^{CreER}$.
Figure 7B:
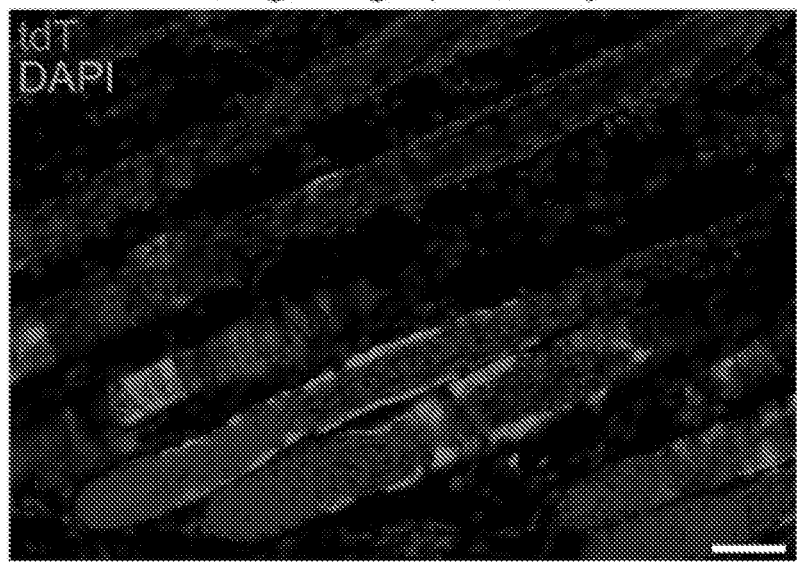
Figure 7C:
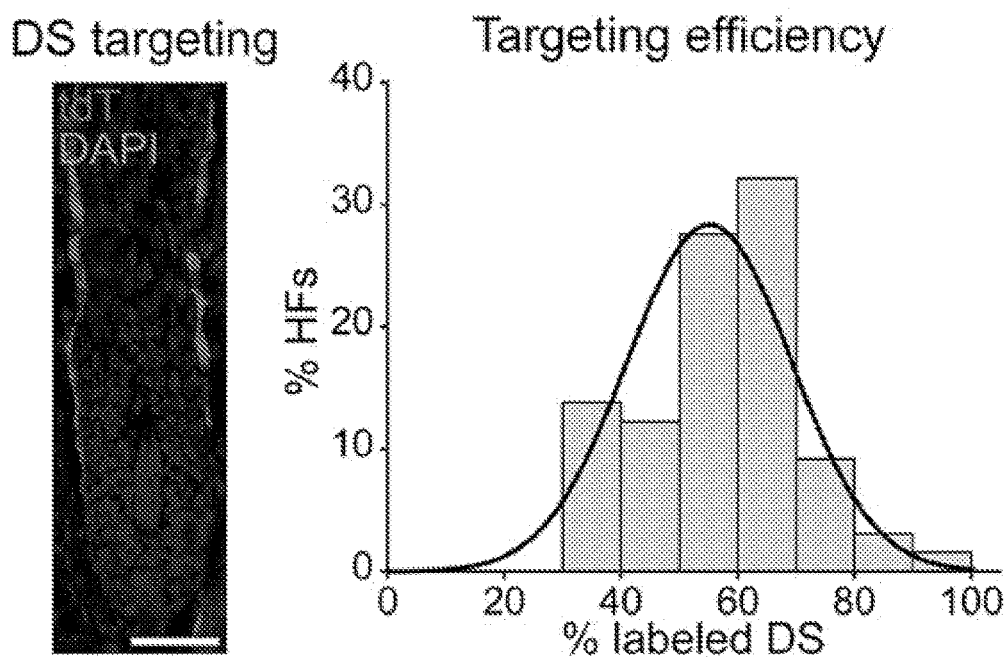

To gain insight into this longstanding question, whether and how the DS may be important for niche relocation during follicle regression was addressed. DS-specific genetic tools were first established using the promoter of the cartilage proteoglycan Aggrecan (Acan) as a driver. ACAN protein is detected in skin specifically only in the follicle basement membrane that separates the DS from epithelium[25] (FIG. 1B). Using Acan$^{CreER}$ mice crossed with the R26$^{LSL-tdTomato}$ reporter (Acan$^{tdT}$) enabled efficient inducible targeting during catagen that within skin was restricted to the DS (FIGS. 7A-7C). To test its functional role, the DS at early catagen using R26$^{LSL-DTA}$ (Acan$^{DTA}$) (FIG. 1C) was selectively ablated. After tamoxifen induction, the DS continuity was disrupted with only fragmented αSMA-stained cell remnants at the beginning of catagen (FIG. 1D). By the subsequent telogen phase, while follicles in control skin were fully regressed (FIG. 1E), follicles with efficient DS ablation remained aberrantly long (FIG. 1F) with hair shafts extending down to the follicle base and DP remaining deep in the dermis (FIGS. 1G-1H). Stalled follicle lengths ranged from partially regressed to fully stranded deep within the dermis (FIG. 1I). This indicates that the DS is required for progression of catagen regression and niche relocation to the stem cells located in the upper follicle.

Figure 1J:
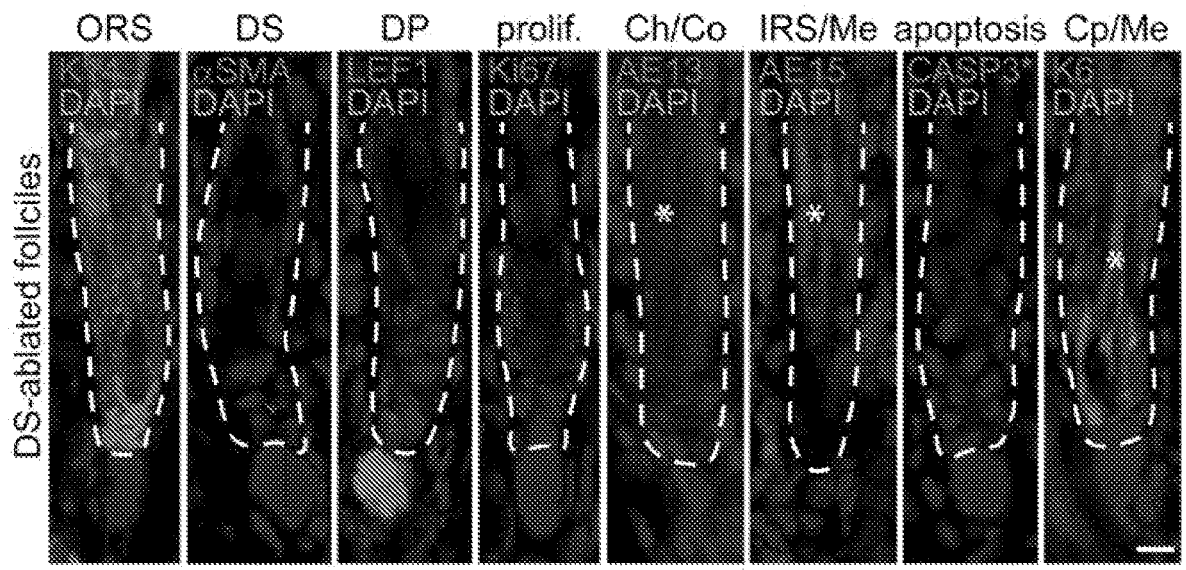
Figure 8A:
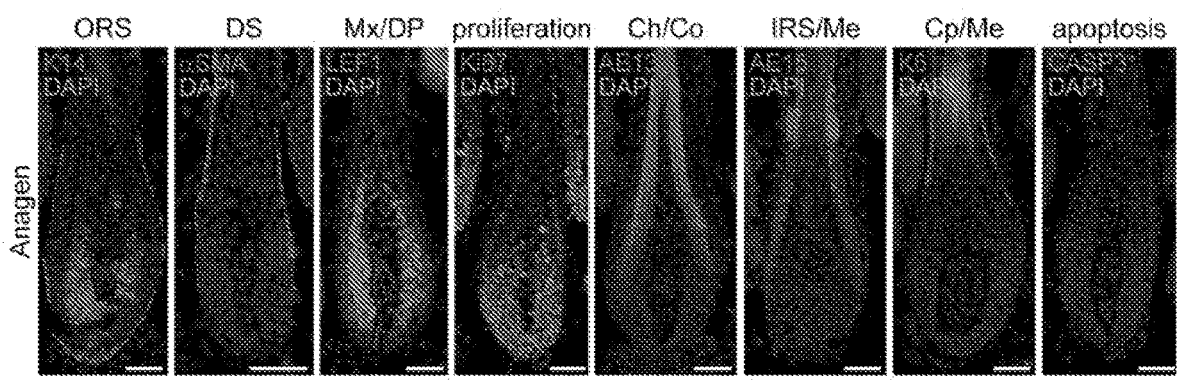
FIGS. 8A-8C show the immunofluorescence of lineage, proliferation, and apoptosis markers. Control immunofluorescence of wild-type anagen (P8), catagen (P18), and telogen (P20) hair follicles.
Figure 8B:
Figure 8C:
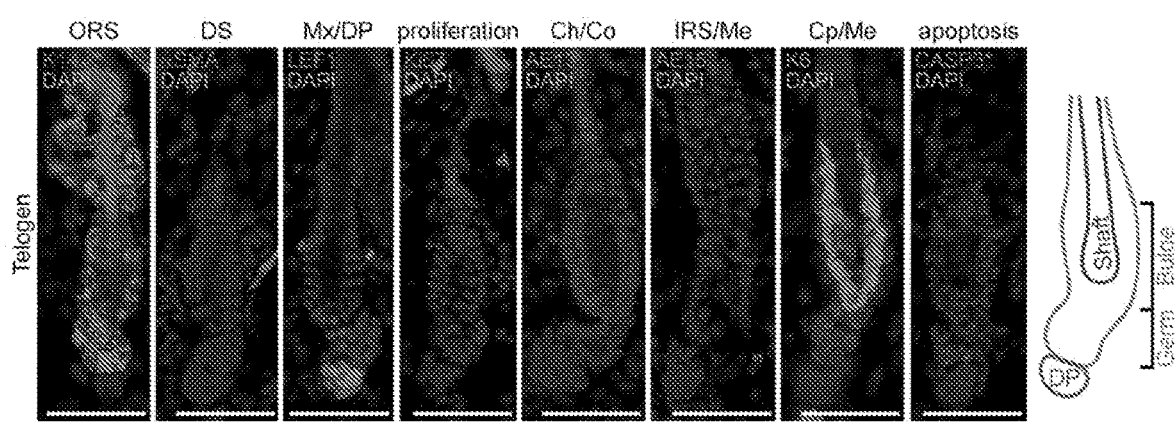

Next, the stalled follicle phenotype was analyzed more closely with lineage specific markers (FIG. 5A) to determine the degree of catagen dysfunction in hair follicles lacking DS cells. Immunofluorescence confirmed absence of the DS (αSMA loss) and widespread presence of ORS (K14) around non-regressed shafts (FIG. 1J). LEF1-staining affirmed the DP-identity of rounded cell clusters at the bulb end that were no longer engulfed by Ki67+ proliferative matrix progenitors (FIG. 1J and FIG. 8A). Likewise, hair shaft (AE13, AE15) and inner root sheath (AE15) precursors were also absent (FIG. 1J), suggesting that anagen-type differentiation (FIG. 8A) had ended and catagen within the bulb had been initiated. Staining for active Caspase 3 (FIG. 8B) was also undetectable in DS-ablated follicles suggesting that catagen did not proceed beyond the early steps (FIG. 1J). The hair shafts themselves were surrounded by a single differentiated K6+ layer (FIG. 1J), reminiscent of the companion layer in growing hair follicles (FIG. 8A) and of inner bulge cells at telogen (FIG. 8C), and by multiple layers of K14+ ORS progenitors (FIG. 1J). Together, the phenotypic analyses indicated that long, non-regressed follicles were not caused by continued matrix progenitor proliferation or erroneous differentiation but resulted from a failure of hair shaft and DP movement towards the skin surface and concomitant absence of ORS apoptosis. Thus, the DS may exert a physical force fundamental for the upward travel of shaft and niche.

Figure 2A:
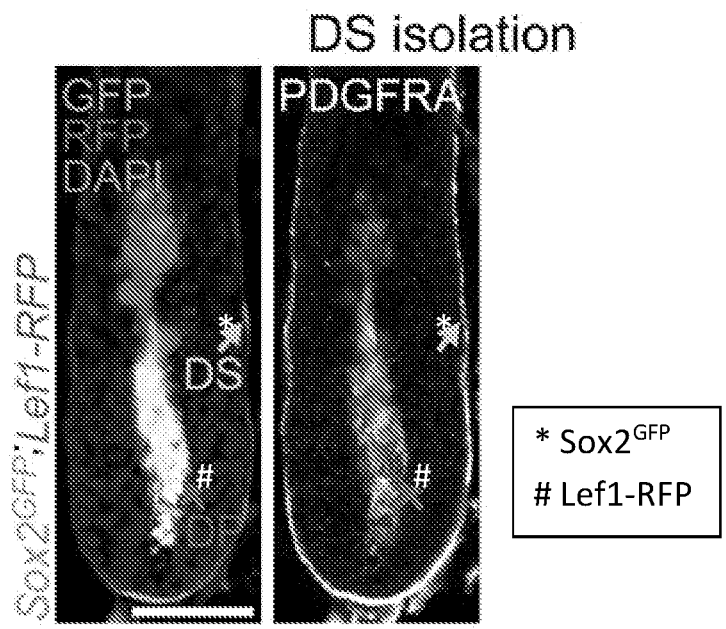
FIGS. 2A-2J show the dermal sheath expresses the molecular machinery of smooth muscle.
Figure 2B:
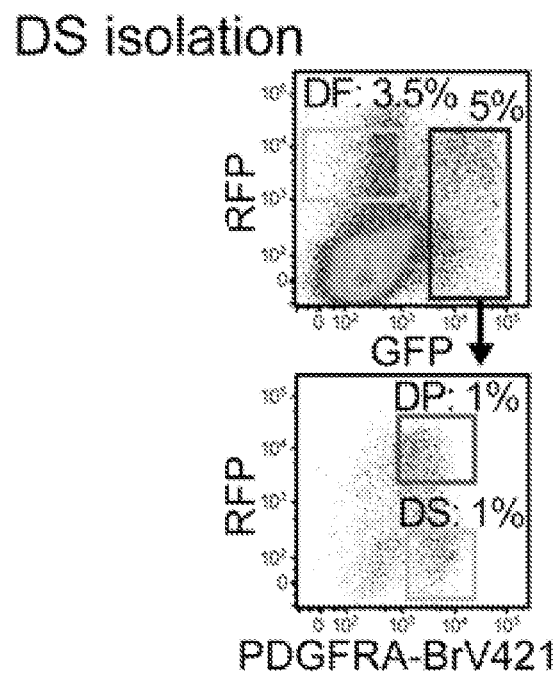
Figure 2C:
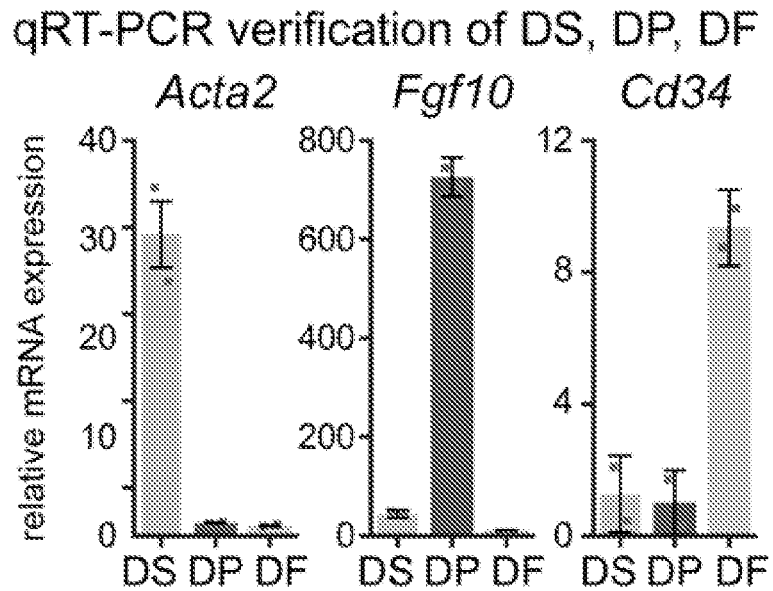
Figure 2D:
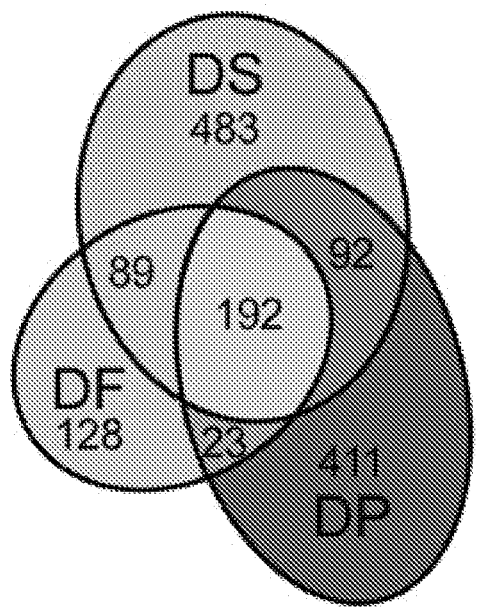
Figure 9:
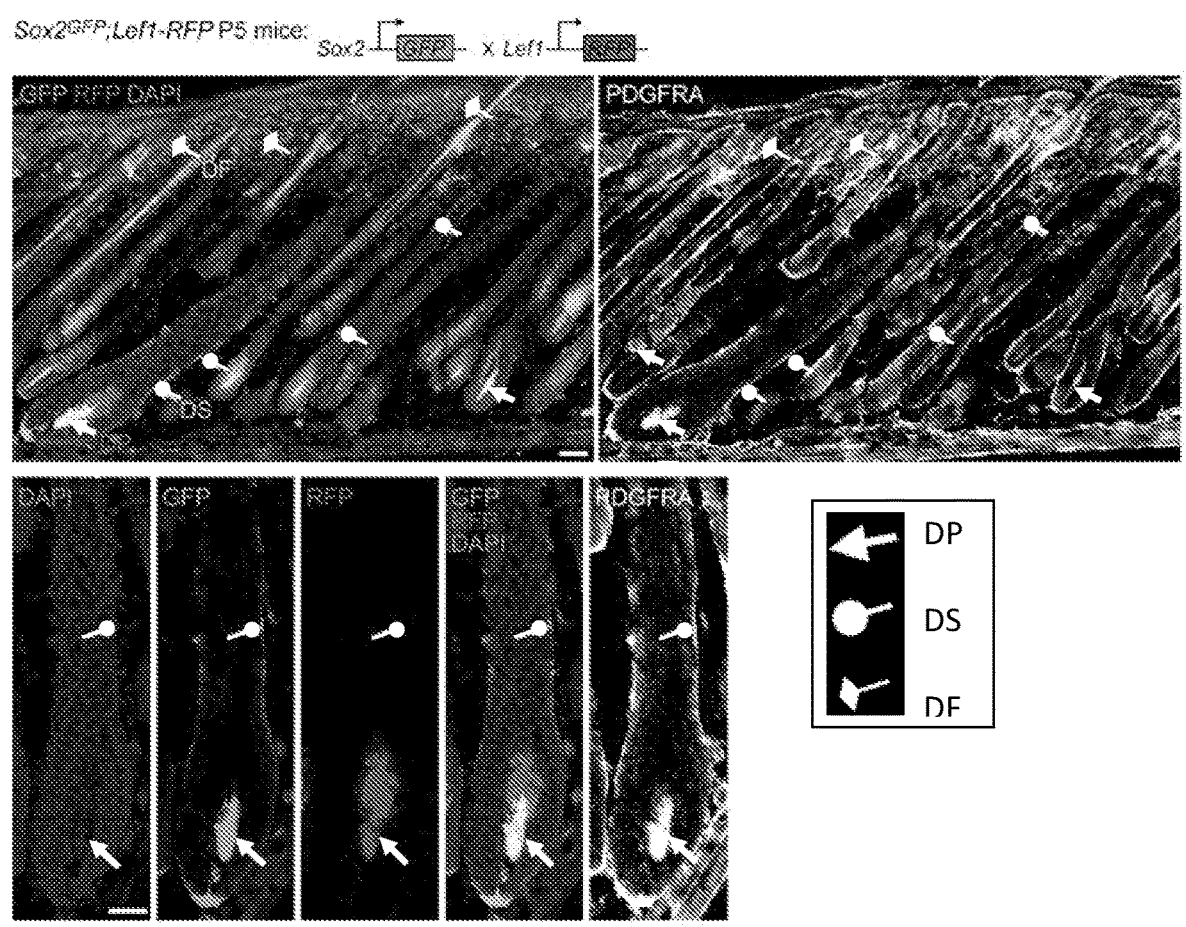
FIG. 9 shows DP, DS, and dermal fibroblast labeling for cell isolation. Sox2$^{GFP}$; Lef1RFP mice and PDGFRA immunofluorescence for cell isolations. GFP marks DP (arrows, some representative arrows are labeled DP) and DS (indicators with circular heads (circles represent the tip of the indicator), some representative indicators are labeled DS). DF (indicators with diamond heads (diamonds represent the tip of the indicator), some representative indicators are labeled DF) and DP have robust RFP fluorescence, which is absent in DS cells. DP and DS can be further distinguished from other GFP+ skin populations by PDGFRA staining. Scale bars represent 50 µm.
Figure 10A:
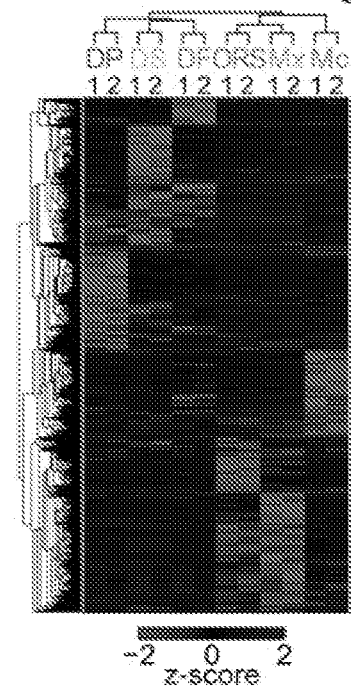
FIGS. 10A-10E show RNA sequencing analysis and smooth muscle gene enrichment in DS.
Figure 10B:
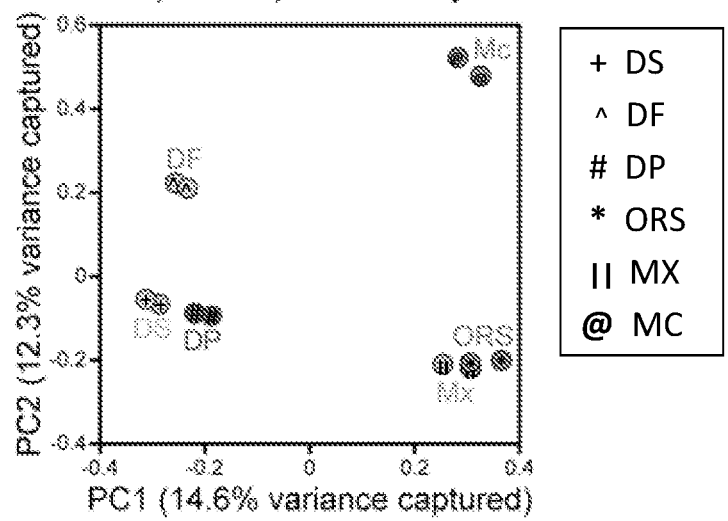
Figure 10C:
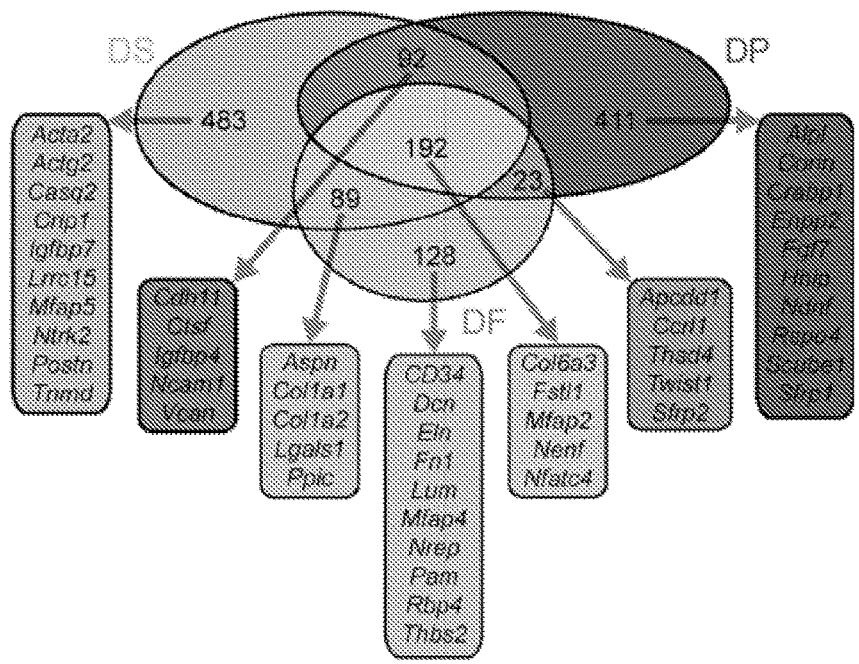

To directly explore if the DS expresses the contractile molecular machinery of smooth muscles that could execute follicle regression and niche relocation, DS cells were isolated for transcriptome analysis, in comparison to DP and dermal fibroblasts (DF). DS, DP and DF cells were flow-sorted from $Sox2^{GFP}$; Lef1-RFP reporter back skins[6, 26], also stained for mesenchymal receptor PDGFRA (FIGS. 2A-2B, and FIG. 9). DS cells expressed $Sox2^{GFP}$ and PDGFRA and could be cleanly distinguished from GFP+RFP+PDRGFA+ DP and RFP+ DF[27] (FIGS. 2A-2B). Verification of known marker expression for DS (Acta2), DP (Fgf10), and DF (CD34) demonstrated their identity and purity (FIG. 2C). Comparing the RNA sequencing-generated transcriptomes of DS, DP and DF with ORS, matrix, and melanocyte transcriptomes[27] by hierarchical clustering and principal component analysis established their close lineage relationship (FIGS. 10A-10B). ANOVA and signature gene analysis then identified unique gene expression signatures reflecting their specialized functions and revealed a DS molecular signature of 483 enriched genes (FIG. 2D and FIG. 10C; Table 1).

TABLE 1

Dermal Sheath Molecular Signature Genes

Dermal Sheath

| | | | | | |
|---|---|---|---|---|---|
| 1190005I06Rik | Casq2 | Epha3 | Klf4 | Penk | Socs2 |
| 2200002D01Rik | Cbln1 | Ephb2 | Klhl29 | Pex5l | Sprr4 |
| 2310022B05Rik | Cbr3 | Erg | Klhl30 | Pfn2 | Srpx |
| 2700060E02Rik | Ccdc109b | Erp27 | Krt20 | Phlda3 | Srpx2 |
| 3110062M04Rik | Ccdc74a | F2r | Larp6 | Pi16 | Sspn |
| 4833403I15Rik | Ccdc80 | Fam101b | Ldlrad4 | Pitpnm3 | Steap3 |
| 4833412C05Rik | Cck | Fam129a | Leprel4 | Pla2g16 | Stmn2 |
| 4931406P16Rik | Ccpg1 | Fam189a2 | Lgals3 | Pla2r1 | Stx11 |
| 6330403A02Rik | Cd47 | Fam20c | Lims2 | Plcd1 | Sumf1 |
| 9130206I24Rik | Cd55 | Fam211a | Lmcd1 | Plcl1 | Susd2 |
| 9230115E21Rik | Cdc42ep2 | Fam46b | Lrrc15 | Pld2 | Sybu |
| 9930012K11Rik | Cdc42ep3 | Fam65b | Lrrc32 | Plekha6 | Syne3 |
| A430105I19Rik | Cdc42ep5 | Fam78b | Lrrk2 | Plekhf1 | Synpo2 |
| A730085A09Rik | Cdh13 | Fbn2 | Lst1 | Plekhg2 | Synpo2l |
| Aatk | Cdkn1c | Fgf13 | Ltbp4 | Plekho2 | Syt13 |
| Ablim1 | Cdkn2b | Fgf14 | Mafb | Pls3 | Syt17 |
| Abtb2 | Cdo1 | Fgf18 | Map3k14 | Pltp | Tagln |
| Acan | Cgnl1 | Fgl2 | Map6 | Plxdc2 | Tango2 |
| Acta2 | Chst15 | Fhl2 | Mapk11 | Pmepa1 | Tapbp |
| Actg2 | Chst3 | Fhl5 | Marveld1 | Postn | Tbx15 |
| Adam15 | Cilp | Fkbp1b | Matn4 | Ppap2b | Tbx18 |
| Adam19 | Ckb | Fmod | Mcam | Ppp1r3c | Tcea3 |
| Adamts12 | Clec11a | Foxd2 | Medag | Prelp | Tcf7l1 |
| Adamts18 | Clec3b | Foxp4 | Mettl24 | Prickle1 | Tcf7l2 |
| Adamts4 | Cmklr1 | Fxyd5 | Mfap5 | Prkaa2 | Tek |
| Adamts5 | Cnn2 | Galnt10 | Mfge8 | Prkab2 | Tenm3 |
| Adamts6 | Coch | Galnt12 | Mgst3 | Prkcdbp | Tgfbr2 |
| Adamts7 | Col11a1 | Galnt9 | Mkx | Prkg1 | Thbs1 |
| Adamtsl1 | Col12a1 | Gap43 | Mme | Prr5l | Thbs4 |
| Adamtsl5 | Col27a1 | Gas2 | Mmp11 | Prx | Timp1 |
| Adc | Col3a1 | Gas7 | Mpz | Ptges31 | Tmbim1 |
| Adcy1 | Col4a1 | Gfpt2 | Mras | Ptprb | Tmem119 |
| Add3 | Col4a2 | Ghr | Mrvi1 | Ptrf | Tmem200a |
| Adk | Col6a6 | Glipr2 | Mthfr | Pygm | Tmem204 |
| Adm | Col8a1 | Glis2 | Mustn1 | Rab37 | Tmem37 |
| Adrb2 | Col8a2 | Gm10046 | Mvp | Rab3il1 | Tmsb10 |
| Afap1l2 | Colec12 | Gm14005 | Mxra8 | Radil | Tmsb4x |
| Agtr1a | Cpn2 | Gm527 | Myadm | Rasa4 | Tmtc1 |
| Ahnak | Cpxm2 | Gngt2 | Myh11 | Rasgrp2 | Tnfrsf11b |
| Ak5 | Crip1 | Gpha2 | Myl12a | Rasl11b | Tnfrsf14 |
| Akap12 | Crip2 | Gpr133 | Myl4 | Rassf2 | Tnfsf9 |
| Akr1c14 | Crispld2 | Gpr176 | Myl6 | Rbms1 | Tnmd |
| Alox5ap | Crtap | Gprc5b | Myl9 | Reep1 | Tnnc1 |
| Amhr2 | Cryaa | Gpx1 | Mylk | Reep2 | Tnnt1 |
| Amotl2 | Cryab | Gria3 | Myo1c | Rftn1 | Tnnt2 |
| Ang, Rnase4 | Crybb3 | Grip2 | Ncs1 | Rgag4 | Tpbg |
| Angptl4 | Cst3 | Grk5 | Ndrg4 | Rgcc | Tpm1 |
| Anks1 | Cst6 | Gxylt2 | Nes | Rgs6 | Tpm2 |
| Anxa2 | Ctgf | Hapln3 | Nexn | Rhoj | Trim16 |

TABLE 1-continued

| Dermal Sheath Molecular Signature Genes | | | | | |
|---|---|---|---|---|---|
| Anxa4 | Ctsk | Hcfc1r1 | Nhsl2 | Rin3 | Trim47 |
| Anxa7 | Ctxn1 | Hck | Nid1 | Rnasel | Tsc22d3 |
| Anxa8 | Cxcl12 | Hdac7 | Nid2 | Rnf150 | Tshz2 |
| Aoc3 | Cxcr7 | Hhat | Nr1d1 | Rnf19b | Tshz3 |
| Apbb1 | Cyb5r3 | Hmgn3 | Nradd | Rora | Tspan11 |
| Aqp1 | Cyp1b1 | Hpgd | Nrxn2 | Runx2 | Tspan32 |
| Arap1 | Cyp2d22 | Hrct1 | Nt5e | S100a10 | Tspo |
| Arf2 | Dapk1 | Hs6st1 | Ntn4 | S100a11 | Tuba1a |
| Arhgap20 | Ddah2 | Hspb1 | Ntrk2 | S100a4 | Tubb6 |
| Arhgap23 | Dennd4a | Hspb2 | Ntrk3 | S100a6 | Tulp1 |
| Arhgap28 | Dhrs3 | Iah1 | Nuak1 | S1pr3 | Txnip |
| Arhgdib | Dock9 | Ifi30 | Numbl | Satb2 | Tyrobp |
| Arhgef16 | Dpep1 | Ifitm1 | Nupr1 | Sbspon | Vamp5 |
| Arhgef26 | Dpysl5 | Ifitm2 | Olfml2a | Sema3c | Vav2 |
| Arhgef6 | Drp2 | Ifitm3 | Osbpl5 | Sema3d | Vcl |
| Arntl | Dse | Igfbp2 | Palm | Sept9 | Vim |
| Arvcf | Dstn | Igfbp7 | Palm3 | Serpinb1a | Vwa5a |
| Atp10a | E130310I04Rik | Il33 | Pamr1 | Serpinb6a | Wasf1 |
| Atp2b4 | Ecm1 | Il4ra | Papolb | Serpind1 | Wfdc1 |
| Axl | Ecm2 | Isg20 | Papss2 | Serpine1 | Wisp1 |
| B3galnt1 | Ecscr | Itga11 | Parp3 | Serping1 | Wnt9a |
| Bcl11b | Ednra | Itgb3 | Parva | Sertad4 | Wscd2 |
| Bgn | Eef2k | Itgb5 | Pawr | Sfxn3 | Zbtb8a |
| Bicc1 | Egflam | Itgbl1 | Pcdh9 | Sgcd | Zdhhc14 |
| Bok | Ehbp1 | Jdp2 | Pced1b | Sgms2 | Zdhhc2 |
| Btla | Ehd2 | Jph2 | Pcsk5 | Shisa5 | Zfp423 |
| C1qb | Eif4ebp1 | Kank2 | Pdgfc | Slc27a3 | Zfp524 |
| C1qtnf5, Mfrp | Emp1 | Kank4 | Pdgfrl | Slc29a1 | Zfp57 |
| C1qtnf7 | Emp3 | Kcns1 | Pdlim1 | Slc6a6 | Zim1 |
| C230081A13Rik | Endod1 | Kctd11 | Pdlim2 | Slco2a1 | |
| Capg | Epas1 | Klf10 | Peg3 | Slit2 | |
| Carhsp1 | Epb4.1l2 | Klf2 | Peg3as | Slit3 | |
| Dermal Papilla | | | | | |
| 1500015O10Rik | Chn1 | Frat2 | Ldb2 | Pnpla3 | Sod3 |
| 1700047M11Rik | Chodl | Frem1 | Lepr | Ppp1r26 | Sostdc1 |
| 1700085B03Rik | Chst8 | Frzb | Lingo2 | Ppyr1 | Sox2 |
| 1810010H24Rik | Clcn2 | Fst | Loxl3 | Prdm1 | Sparcl1 |
| 1810011O10Rik | Cldn9 | Fut10 | Lrrc73 | Prdm5 | Spef2 |
| 1810041L15Rik | Clec14a | G0s2 | Lrrn1 | Prkar1b | Spock1 |
| 2010001M06Rik | Clmn | Gcnt4 | Lrrn2 | Prkcq | Spock2 |
| 2810011L19Rik | Clstn2 | Gdf10 | Lrrn3 | Prlr | Spock3 |
| 4833422C13Rik | Cntn1 | Gdpd2 | Lrrtm3 | Prr5 | Spon1 |
| 4930426D05Rik | Col15a1 | Gem | Ltbp1 | Prrt1 | Spry1 |
| 4931406H21Rik | Col23a1 | Gfra1 | Lypd1 | Prss12 | Spry4 |
| 5033411D12Rik | Col26a1 | Ggt7 | Mad2l2 | Prtg | Sqrdl |
| 5430421F17Rik | Col9a2 | Gldn | Maff | Psd2 | Ss18 |
| 6030419C18Rik | Corin | Glis3 | Maob | Ptgfr | St6galnac5 |
| 6330403K07Rik | Cpne2 | Gm10664 | Mc2r | Ptgs1 | Stat5a |
| a | Crabp1 | Gna14 | Mc3r | Ptk7 | Stat5b |
| Aard | Crabp2 | Gnai1 | Mc5r | Ptprz1 | Steap1 |
| Abca8a | Crispld1 | Gng2 | Mdk | Pygl | Steap2 |
| Abca8b | Csrnp3 | Gpr165 | Meis1 | Rab13 | Stx1b |
| Abcg4 | Ctbp2 | Gprasp2 | Meis2 | Rab3b | Syt12 |
| Ache | Cx3cl1 | Gpx3 | Mgst1 | Rgs9 | Tagln3 |
| Acot11 | Cxcl1 | Grb14 | Mir1897, Sox2ot | Rhod | Tceal3 |
| Adam22 | Cxxc5 | Grid1 | Mmp17 | Rnf125 | Tceal5 |
| Adrbk2 | Cygb | Grin3a | Mov10 | Rorb | Tcl1 |
| Aff2 | Cyr61 | Gstt1 | MterM2 | Rspo1 | Tfap2c |
| Alpl | D430019H16Rik | H2-DMa | Myrf | Rspo2 | Tha1 |
| Alx3 | Daam2 | H2-DMb1 | Naga | Rspo3 | Thbd |
| Alx4 | Dcc | H2-Ke6 | Nav3 | Rspo4 | Thrb |
| Amot | Ddx26b | H6pd | Ncam2 | Runx1t1 | Thsd7a |
| Ampd2 | Dfna5 | Hcn1 | Ncoa1 | S100b | Tlcd1 |
| Amph | Dgkh | Heph | Ncoa3 | Samd14 | Tlcd2 |
| Aplp1 | Dio2 | Hey1 | Ncoa7 | Sapcd1 | Tle2 |
| Apoe | Dmpk | Hey2 | Ndnf | Scara5 | Tle4 |
| Ar | Dnajc12 | Hfe | Ndp | Scarb2 | Tmem100 |
| Arhgef28 | Dnali1 | Hhip | Nfam1 | Scn4b | Tmem132c |
| Arl5c | Dram1 | Hif3a | Ngfr | Scube1 | Tmem132e |
| Armcx6 | Draxin | Hmgcll1 | Nlgn3 | Scube3 | Tmem176a |
| Aspg | Dusp10 | Hoga1 | Notum | Sdk2 | Tmem176b |
| Atoh8 | Dync2li1 | Hoxa10 | Nox4 | Sec1 | Tmem2 |
| B230217C12Rik | Ebf1 | Hoxc10 | Nr3c2 | Serpine2 | Tmem35 |
| Bag2 | Ebf4 | Hoxc8 | Nrg2 | Sfmbt2 | Tnfrsf1b |
| Bai1 | Eda | Hoxc9 | Nsg1 | Sfrp1 | Tnni3 |
| Bai3 | Edn3 | Hs3st1 | Ntng1 | Sh2b2 | Tril |

TABLE 1-continued

| Dermal Sheath Molecular Signature Genes | | | | | |
|---|---|---|---|---|---|
| Bambi | Efcab4b | Hs3st3a1 | Olfm2 | Sh3bp1 | Tro |
| BC028528 | Efna2 | Hs3st3b1 | Oxnad1 | Sh3bp5 | Trpm3 |
| BC051142 | Eid2b | Hunk | Pafah2 | Shc2 | Trps1 |
| BC089491 | Emilin1 | Id1 | Pappa | Shd | Tspan4 |
| Bcl6 | En1 | Id3 | Pappa2 | Shisa4 | Ttc39c |
| Bdh2 | Enpp2 | Ier3 | Paqr8 | Shisa9 | Ttyh1 |
| Bex2 | Epha7 | Ikzf4 | Pax1 | Shox2 | Tubg2 |
| Bmp4 | Ephx2 | Il16 | Pbx1 | Slc16a2 | Unc5c |
| Bmp6 | Eva1a | Inhba | Pcbp3 | Slc1a1 | Usp25 |
| Brdt | Eya2 | Insl3, Jak3 | Pde3a | Slc22a4 | Vegfa |
| C1s | F5 | Islr | Pde4d | Slc24a6 | Vip |
| Cachd1 | Fads1 | Itga9 | Pde9a | Slc2a10 | Vipr2 |
| Cacna1c | Fam126a | Itprip | Pdlim4 | Slc35f1 | Vps37d |
| Cacna1d | Fam131a | Jam2 | Per3 | Slc43a2 | Wasf3 |
| Cacng7 | Fam196b | Jazf1 | Pfkfb3 | Slc5a7 | Wif1 |
| Camp | Fam229b | Kat6b | Pfkm | Slc7a7 | Wnt5b |
| Cand2 | Fam5c | Kcnc4 | Pgd | Slc9b2 | Zc3h12b |
| Capn6 | Fam69b | Kcnn3 | Pgf | Slitrk5 | Zfp37 |
| Cblb | Fap | Kcnq3 | Phactr2 | Smad6 | Zfp467 |
| Ccnd3 | Fbxo2 | Khdrbs2 | Piezo2 | Snai2 | Zfp503 |
| Cd1d1 | Fgf10 | Kif1a | Pik3r1 | Snap91 | Zfp608 |
| Cd302 | Fgf7 | Kifc2 | Pitpnc1 | Sned1 | Zfp809 |
| Cd83 | Fgfr1 | Klhl14 | Pkdcc | Snrk | Zic1 |
| Cdh18 | Fgfrl1 | Kng2 | Plekhg6 | Sobp | Zic4 |
| Cebpa | Fli1 | Ksr1 | Plscr4 | Socs3 | Zmiz1 |
| Cebpd | Flywch2 | Lamc3 | | | |
| Dermal Fibroblasts | | | | | |
| 3110079O15Rik | Col4a5 | Fndc5 | Ltbp2 | Pcsk6 | Ssc5d |
| 4930444P10Rik | Col7a1 | Galnt16 | Lum | Pde7b | Sulf2 |
| Abca9 | Cox6c | Galnt5 | Meox2 | Pknox2 | Svil |
| Adam12 | Cp | Gas1 | Mfap4 | Por | Syt4 |
| Adamts8 | Cpe | Gatm | Mir669g | Ppp2r2c | Tac1 |
| Adh1 | Cpz | Glt8d2 | Mmp2 | Psph | Tgfbi |
| Agtr2 | Csta | Gm16897 | Mmp27 | Pycr1 | Thbs2 |
| Ahr | Ctsh | Grem1 | Mrgprf | Rarres2 | Tlr5 |
| Ahrr | Cyp27a1 | Gria4 | Mybpc1 | Rbp4 | Tmem150c |
| Asphd2 | Dcn | Gsg11 | Nbl1 | Rgag1 | Tmem26 |
| Atp1a2 | Des | Hs3st6 | Nnat | Rgs10 | Tmtc2 |
| C1qtnf3 | Dkk2 | Hspg2 | Nnmt | Rnf112 | Tnfaip6 |
| Casp12 | Dpp4 | Htra1 | Nov | Rtp4 | Tnfrsf26 |
| Cav1 | Dpt | Ifit2 | Nrep | Sash1 | Tnxb |
| Ccbe1 | Eln | Itga4 | Nrn1 | Scg3 | Ucn2 |
| Ccdc42 | Entpd1 | Itih5 | Olfml2b | Sct | Vash1 |
| Ccl11 | Epb4.1l3 | Kcnj8 | ORF63 | Sdk1 | Vax2os |
| Cd34 | F13a1 | Lhfpl2 | Osr2 | Sema4f | Wisp2 |
| Cdh4 | Fam198b | Limch1 | P4ha2 | Serpina3h | Zfp385b |
| Cdon | Fgfr4 | Loxl1 | Pam | Serpina3n | Zfp536 |
| Clec2d | Fn1 | Lpin3 | Pcdh10 | Sfrp4 | |
| Col25a1 | Fn3k | Lrrc17 | | | |
| Dermal Sheath & Dermal Papilla | | | | | |
| 1500009L16Rik | Crybg3 | Gp1bb, Sept5 | Lrp1 | Pf4 | Sphk1 |
| 2610203C20Rik | Csdc2 | Hip1 | Magee1 | Pros1 | Spsb1 |
| 4632428N05Rik | Ctsf | Hoxc6 | Meis3 | Prr16 | Stxbp1 |
| 5730409E04Rik | Ddit4l | Igf1 | Mest | Prrx1 | Sulf1 |
| Adamts9 | Dock6 | Igfbp3 | Mir143hg | Prrx2 | Synpo |
| Ak1 | Efnb3 | Igfbp4 | Naalad2 | Ptger3 | Tcea2 |
| Arhgap44 | Ehbp1l1 | Il6st | Ncam1 | Sept4 | Tenc1 |
| Asap3 | Eif2c4 | Irak3 | Ndrg1 | Slc43a3 | Tmem200b |
| B4galnt1 | Fmnl3 | Irf1 | Nog | Slc4a3 | Tmem98 |
| Bmp3 | Fos | Itga8 | Ntng2 | Slc9a3r2 | Tns3 |
| C1ra | Fosb | Itpr1 | Olfml3 | Slitrk6 | Tppp3 |
| Cdh11 | Gadd45b | Kif13b | Pcolce | Smarcd3 | Vcan |
| Chst14 | Gm11627 | Klhdc8b | Pde4a | Snai1 | Zfhx4 |
| Col5a3 | Gnao1 | Lama2 | Pdgfra | Snrpn, Snurf | Zfp36 |
| Cox4i2 | Gng8 | Lbp | Pdlim3 | Sp7 | |
| Cpa6 | Golm1 | Lgals3bp | | | |
| Dermal Sheath & Dermal Fibroblasts | | | | | |
| 6430411K18Rik, Mir127 | Col1a2 | Fam114a1 | Lox | Ntn1 | Ramp1 |
| 9430020K01Rik | Col5a1 | Fam46a | Lsp1 | Ostc | Rian |
| Adam33 | Col5a2 | Fbln5 | Ly6a | Pde6h | Rtn4r |
| Adamts14 | Col6a1 | Fbn1 | Ly6c1 | Pdgfd | Scn1b |

TABLE 1-continued

Dermal Sheath Molecular Signature Genes

| | | | | | |
|---|---|---|---|---|---|
| Adamts2 | Col6a2 | Fibin | Maf | Phldb1 | Sec24d |
| Afap1 | Creb3l1 | Figf | Meg3, Mir1906-2, Mir770 | Phldb2 | Serpinh1 |
| Anpep | Creld1 | Fkbp11 | Metrnl | Plaur | Sgsm2 |
| Anxa5 | Csrp2 | Fkbp9 | Mex3b | Pmp22 | Stx2 |
| Aspn | Cyp4b1 | Fndc1 | Miat | Podn | Tgfbr3 |
| C1qtnf2 | Dab2 | Fxyd6 | Mir22, Mir22hg | Ppap2a | Thy1 |
| Cadm3 | Darc | Has1 | Mir369, Mir410, Mir412, Mirg | Ppic | Tnfrsf23 |
| Ccl7 | Dtx4 | Htra3 | Mmp23 | Ppp1r14a | Twist2 |
| Cgref1 | Efemp1 | Impdh1 | Myh10 | Prss57 | Vgll3 |
| Ckap4 | Eml1 | Kazald1 | Ndufa4l2 | Ptx3 | Wbscr17 |
| Col1a1 | Fam101a | Lgals1 | Ngf | Pxdc1 | |

Dermal Papilla & Dermal Fibroblasts

| | | | | | |
|---|---|---|---|---|---|
| Twist1 | Antxr2 | Ccrl1 | Fgd5 | Rai2 | Stxbp6 |
| Apcdd1 | Emid1 | Speg | Tubb4a | Rab40b | Lsamp |
| Sfrp2 | Thsd4 | Rab30 | Pitx2 | Glis1 | Pgm5 |
| Hist1h2bc | Fam105a | Gpc6 | Iglon5 | Mmp19 | |

Dermal Sheath, Dermal Papilla, & Dermal Fibroblasts

| | | | | | |
|---|---|---|---|---|---|
| 0610037L13Rik | Cenpv | Fat4 | Lepre1 | Pdgfrb | Selm |
| 2410006H16Rik | Cercam | Fbxo17 | Leprel2 | Pepd | Sepw1 |
| 3110001D03Rik | Clip3 | Fkbp10 | Loxl4 | Pfdn5 | Serf1 |
| Acads, Gm13826 | Clmp | Fkbp14 | Lynx1 | Pgrmc1 | Sgce |
| Acyp2 | Cnrip1 | Fkbp7 | Lysmd2 | Pias3 | Sh3gl1 |
| Adamts10 | Coa3 | Flnc | Maged1 | Pid1 | Shank1 |
| Adcy5 | Col16a1 | Flot1 | Maged2 | Pih1d1 | Slc39a7 |
| Aes | Col6a3 | Fndc3b | Map1a | Pkd2 | Smim11 |
| Ahdc1 | Commd5 | Fndc4 | Map1b | Plagl1 | Snx22 |
| AI462493 | Cped1 | Fstl1 | Map1lc3a | Pofut2 | St6galnac4, St6galnac6 |
| AI837181 | Cpq | Fxyd1 | Masp1 | Pold4 | Svep1 |
| Aldh7a1 | Cry2 | Gemin7 | Matn2 | Ppapdc1b | Syne1 |
| Antxr1 | Csf1 | Gm1821 | Megf6 | Ppib | Tmed1 |
| Anxa6 | Cuedc1 | Gm266 | Mfap2 | Prmt2 | Tmed3 |
| Ap5s1 | Cxx1b | Gng10 | Mgat1 | Prrt2 | Tmem107 |
| Arf5 | Cys1 | Gpr124 | Mir1188 | Psd | Tmem256 |
| Armcx4 | Ddr2 | Gpx7 | Mpnd | Ptdss2 | Tmod2 |
| Arrb1 | Dhrs7 | Gpx8 | Mrc2 | Pth1r | Tor1a |
| Atf5 | Dip2a | Grik5 | Myof | Rabac1 | Tpst1 |
| Athl1 | Dlg4 | Gsdmd | Ndn | Rarres1 | Tram2 |
| Atp9a | Dnm1 | Gtdc2 | Ndst3 | Reck | Trp53i13 |
| Atraid | Dpm3 | Gypc | Nenf | Rftn2 | Tspan17 |
| B4galt2 | Dusp1 | H2-K1 | Nfatc4 | Rhoc | Txndc5 |
| Bet1l | Ech1 | Ifi27l1 | Npdc1 | Rnf215 | Vash2 |
| Beta-s | Efemp2 | Igdcc4 | Npr2 | Robo2 | Vcam1 |
| Blvrb | Eif1b | Ikbip | Oaf | Ror2 | Wipf1 |
| C1qtnf1 | Emc10 | Itga5 | Olfml1 | Rpl13 | Yif1a |
| Cacna1g | Eng | Itm2a | Osr1 | Rpl37a | Ypel3 |
| Ccdc23 | Eno2 | Izumo4 | Ostf1 | Rps29 | Zcchc24 |
| Ccdc28b | Fam189b | Klhl22 | Pagr1a | Rtn2 | Zfp354c |
| Cd248 | Fam198a | Krtap22-2 | Pard3b | S100a13 | Zfp651 |
| Cdk14 | Fam212a | Krtcap2 | Pddc1 | Sar1a | Zfpl1 |

Figure 2E:
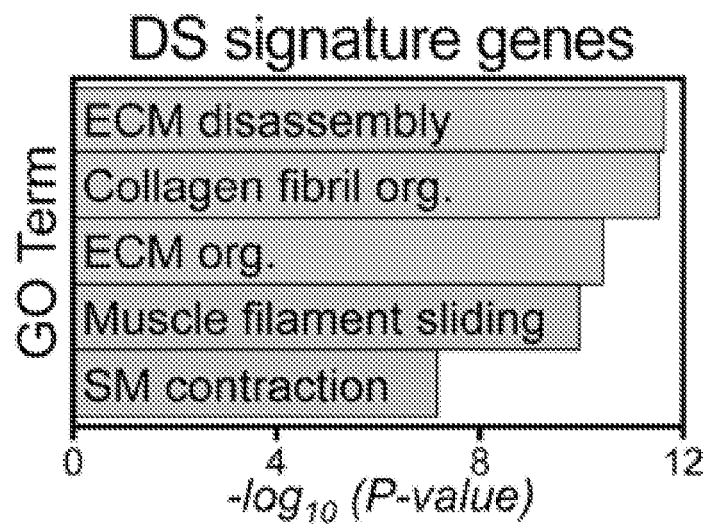
Figure 2F:
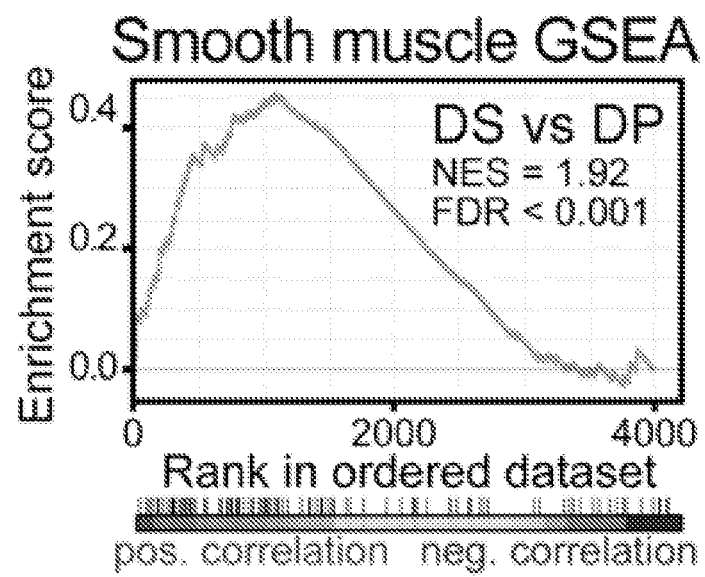

Gene ontology analysis of the DS signature expectedly yielded extracellular matrix organization categories (FIG. 2E), as the DS is closely associated with the basement membrane that separates the mesenchyme from follicle epithelium. Importantly, the DS signature was also enriched for genes involved in "muscle filament sliding" and "smooth muscle contraction" (FIG. 2E). Gene set enrichment analysis for "regulation and process of smooth muscle contraction" (Table 2) showed significant enrichment in the DS (FIG. 2F), suggesting smooth muscle identity and function.

TABLE 2

Regulation and Process of Smooth Muscle Contraction Genes

| | | | | |
|---|---|---|---|---|
| ABAT | CACNA1D | GNA12 | OXT | PRKG2 |
| ACTA2 | CACNA1F | GNA13 | OXTR | PRKX |
| ACTB | CACNA1S | GNAQ | P2RX1 | PROK2 |
| ACTG1 | CALCA | GNAS | PAK1 | PTAFR |
| ACTG2 | CALCRL | GPER | PAK2 | PTEN |
| ACTN1 | CALD1 | GUCY1A2 | PAK3 | PTGER3 |
| ACTN2 | CALM1 | GUCY1A3 | PAK4 | PTGER4 |
| ACTN3 | CALM2 | GUCY1B3 | PAK6 | PTGIR |
| ACTN4 | CALM3 | ILK | PAK7 | PTGS1 |
| ACTR2 | CALM4 | IQGAP1 | PALLD | PTGS2 |
| ACTR3 | CALM5 | ITGA1 | PARD3 | PTK7 |
| ACTR3B | CALML3 | ITGA2 | PARD3B | RAC1 |
| ADA | CALML5 | ITGB5 | PARD6A | RACGAP1 |
| ADCY1 | CALML6 | ITPR1 | PARD6B | RAF1 |
| ADCY2 | CAMK1 | ITPR2 | PARD6G | RAMP1 |

TABLE 2-continued

Regulation and Process of Smooth Muscle Contraction Genes

| | | | | |
|---|---|---|---|---|
| ADCY3 | CAMK2D | ITPR3 | PAWR | RAMP2 |
| ADCY4 | CAV1 | JMJD7-PLA2G4B | PDK1 | RAMP3 |
| ADCY5 | CDC42 | KCNB2 | PDLIM1 | RAP1A |
| ADCY6 | CDC42BPA | KCNMA1 | PLA2G10 | RGS2 |
| ADCY7 | CDC42BPB | KCNMB1 | PLA2G12A | RHOA |
| ADCY8 | CDC42BPG | KCNMB2 | PLA2G12B | RhoC |
| ADCY9 | CHRM1 | KCNMB3 | PLA2G1B | RND3 |
| ADORA1 | CHRM2 | KCNMB4 | PLA2G2A | ROCK1 |
| ADORA2A | CHRM3 | KIF23 | PLA2G2C | ROCK2 |
| ADORA2B | CHRNA3 | KNG1 | PLA2G2D | S100A4 |
| ADRA1A | CHRNB4 | LCP1 | PLA2G2E | S100P |
| ADRA1B | CIT | LIMK | PLA2G2F | SFN |
| ADRA1D | CLF1 | LIMK2 | PLA2G3 | SHROOM1 |
| ADRA2A | CNN1 | LLGL1 | PLA2G4A | SHROOM2 |
| ADRA2B | CNN2 | LLGL2 | PLA2G4B | SHROOM3 |
| ADRA2C | CNN3 | LMOD1 | PLA2G4E | SHROOM4 |
| ADRB2 | CSNK2 | LOC642076 | PLA2G5 | SMTN |
| AGTR1 | CTTN | MAP2K1 | PLA2G6 | SOD1 |
| ALKBH4 | CYP4A11 | MAP2K2 | PLCB1 | SORBS1 |
| ANLN | CYP4A22 | MAPK1 | PLCB2 | SORBS3 |
| ARAF | DAAM1 | MAPK3 | PLCB3 | SPHK1 |
| ARF1 | DAPK3 | MARK1 | PLCB4 | SRC |
| ARF6 | DAPK3 | MPRIP | PLCE1 | SRF |
| ARHGAP18 | DDR1 | MRVI1 | PLEKHG6 | STK11 |
| ARHGAP35 | DIAP1 | MYBPH | PLK1 | SVIL |
| ARHGAP5 | DIAP2 | MYH10 | PLS1 | TACR1 |
| ARHGEF1 | DIAP3 | MYH11 | PLS3 | TACR2 |
| ARHGEF11 | DLC1 | MYH14 | PPP1CA | TACR3 |
| ARHGEF12 | DMPK | MYH9 | PPP1CB | TBXA2R |
| ARHGEF17 | DNM2 | MYL12A | PPP1CC | TLN1 |
| ARHGEF18 | DOCK4 | MYL12B | PPP1R12A | TNNI3 |
| ARHGEF2 | DOCK5 | MYL6 | PPP1R12B | TPM1 |
| ARHGEF28 | DSTN | MYL6B | PPP1R14A | TPM2 |
| ARHGEF7 | ECT2 | MYL8P | PRKAA1 | TPM3 |
| ARPC1A | EDN1 | MYL9 | PRKAA2 | TPM4 |
| ARPC1B | EDN2 | MYLK | PRKACA | TRPM7 |
| ARPC2 | EDNRA | MYLK2 | PRKACB | VASP |
| ARPC3 | EMD | MYLK3 | PRKACG | VCL |
| ARPC4 | F2R | MYO9B | PRKCA | WAS |
| ARPC5 | FDAMM2 | MYOCD | PRKCB | WASF2 |
| ARPC5L | FLNA | NMU | PRKCD | WASL |
| ASPM | FLT1 | NMUR1 | PRKCE | WDR1 |
| ATE1 | FMN1 | NMUR2 | PRKCG | YWHAB |
| ATP1A2 | FMN2 | NPNT | PRKCH | YWHAE |
| AURKB | FSCN1 | NPR1 | PRKCI | YWHAG |
| AVPR1A | GHSR | NPR2 | PRKCQ | YWHAH |
| AVPR1B | GIT1 | NPY2R | PRKCZ | YWHAQ |
| BRAF | GIT2 | NUAK1 | PRKG1 | YWHAZ |
| CACNA1C | GNA11 | NUAK2 | | |

Figure 2G:
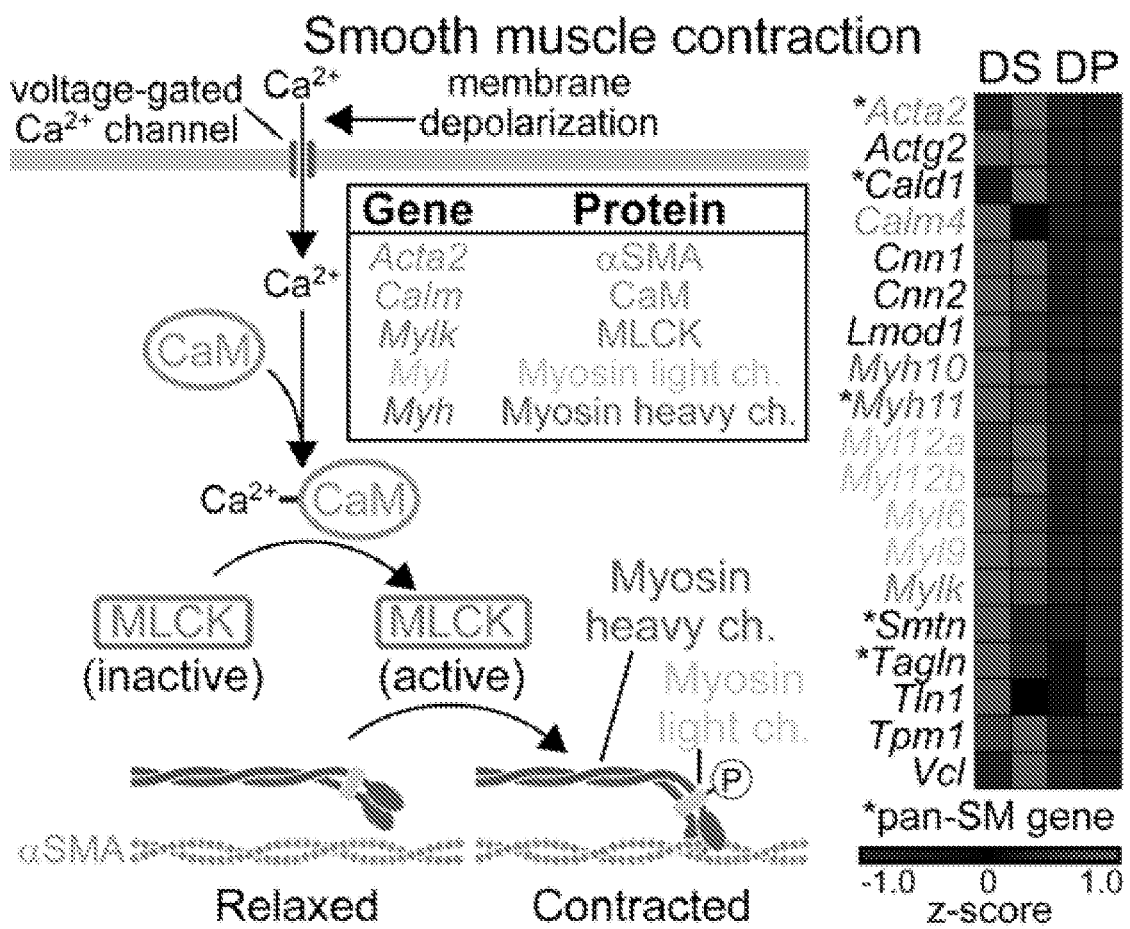
Figure 2H:
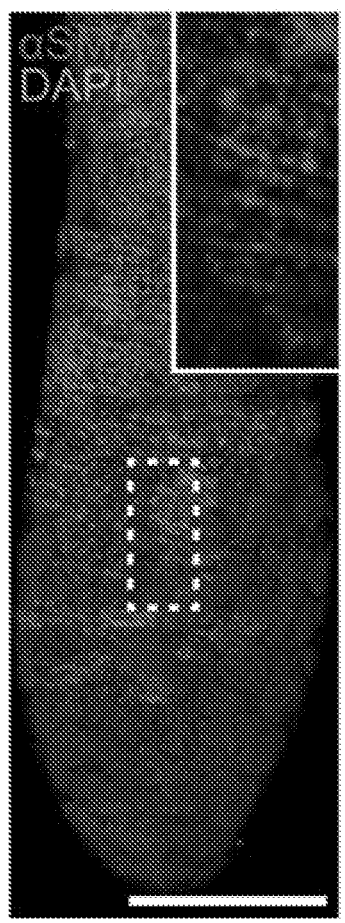
Figure 2I:
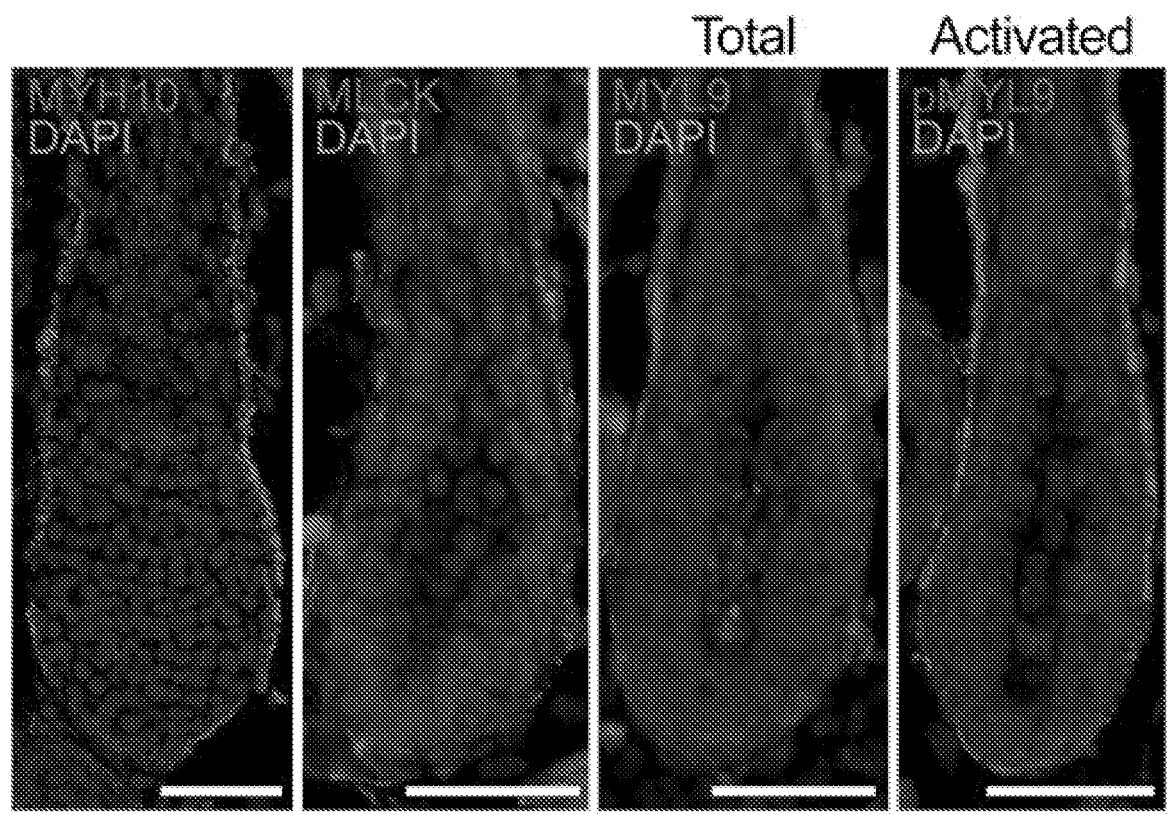
Figure 2J:
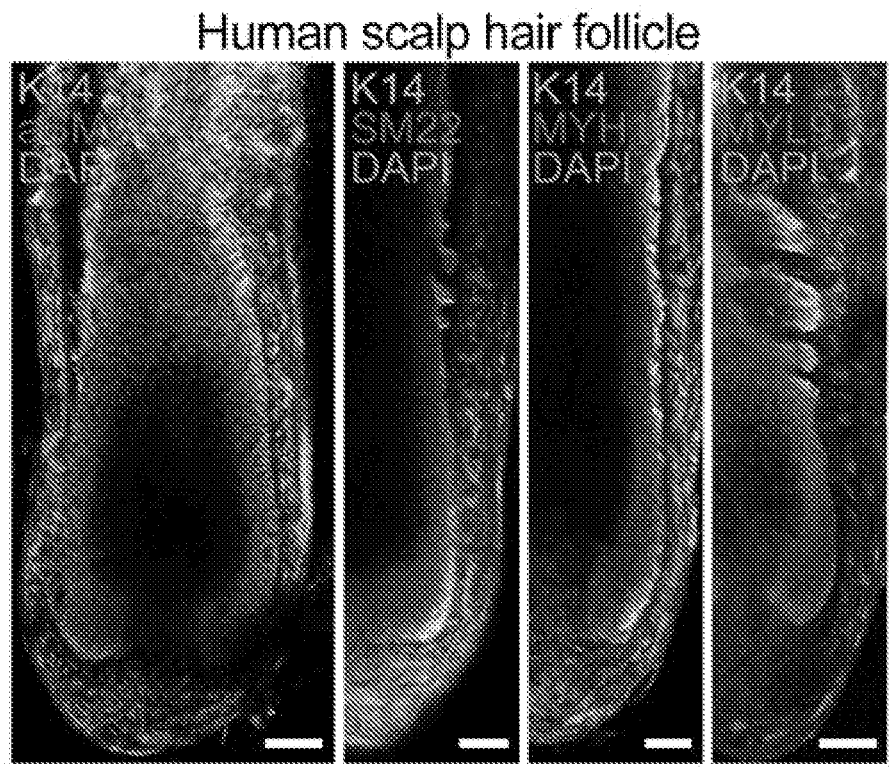
Figure 10D:
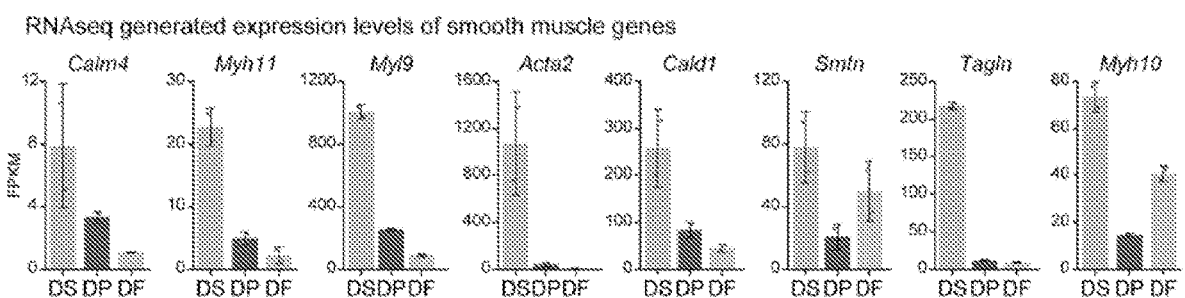
Figure 10E:
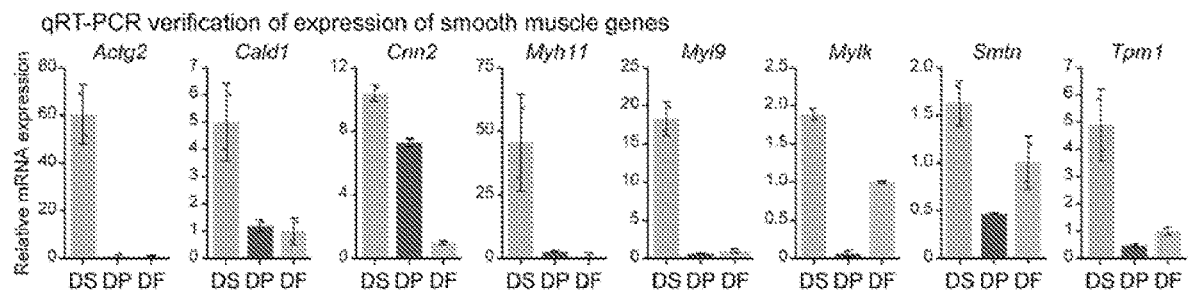

Several core components of the Ca2+-dependent smooth muscle contraction pathway were highly enriched in the DS including Cabral (Calmodulin, CaM), Mylk (Myosin light chain kinase, MLCK), Myh11 (Myosin heavy chain 11), Myl9 (Myosin light chain 9) and Acta2 (αSMA) (FIG. 2G). While smooth muscle is present in diverse organ systems (e.g. blood vessels, intestine) with varying transcriptomes to meet unique functional needs, several genes such as Cald1 (Caldesmon 1), Smtn (Smoothelin) and Tagln (Transgelin, SM22) are considered pan-smooth muscle markers[28] that were also part of the DS signature (FIG. 2G and FIGS. 10D-10E). Importantly, among those Cald1, Myh11 and Smtn are not expressed in contractile myofibroblasts[29], indicating that the DS expresses bona fide genes of smooth muscles. During smooth muscle contraction, mechanical forces are generated through actomyosin cross-bridges and ATP-powered myosin ratcheting action[30] (FIG. 2G). 3-dimensional immunofluorescence revealed that the DS forms a network of αSMA stress fibers that wrap the follicle in concentric rings indicating that the potential actomyosin forces would be directed towards the center of the longitudinal axis in centripetal fashion (FIG. 2H). Actomyosin cross-bridge formation is promoted when CaM-activated MLCK phosphorylates regulatory myosin light chains (e.g. MYL9, FIGS. 2G and 2I) that associate with myosin heavy chain molecular motors (e.g. MYH10, FIGS. 2G and 2I). Immunofluorescence for phosphorylated pMYL9 confirms the active state of myosin in the DS further supporting DS functional contractile activity (FIG. 2I). Finally, immunofluorescence of human scalp hair follicles showed conservation of smooth muscle components in the DS between mice and humans (FIG. 2J). Overall, these results demonstrate that the DS harbors the contractile apparatus and its regulatory elements, long hypothesized by the presence of αSMA[24].

Figure 3A:
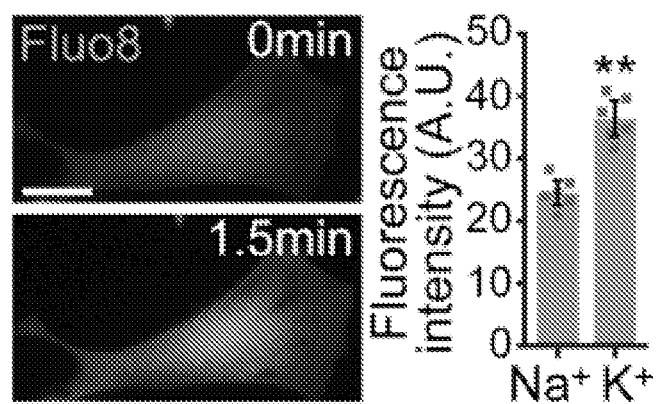
FIGS. 3A-3J show that DS-mediated hair follicle contraction is required for regression in vivo.
Figure 3B:
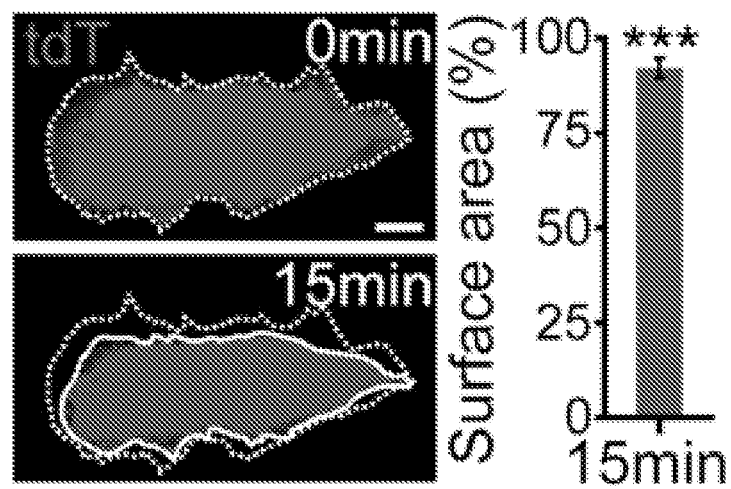
Figure 3C:
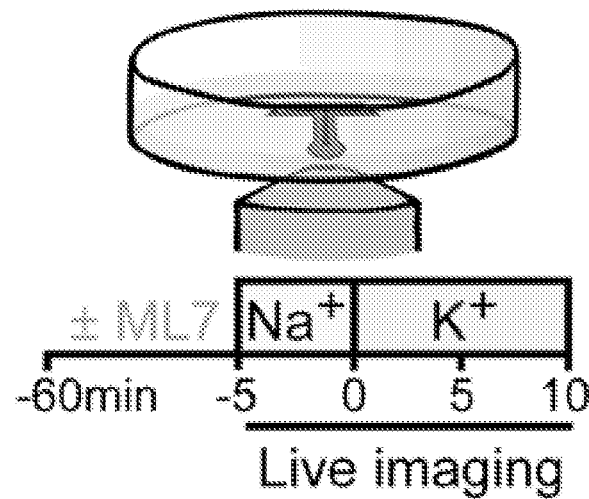
Figure 3D:
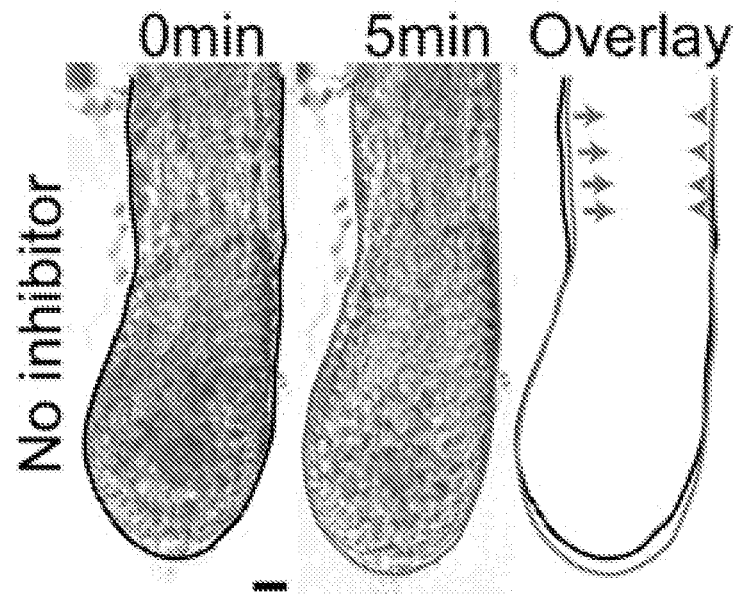
Figure 3E:
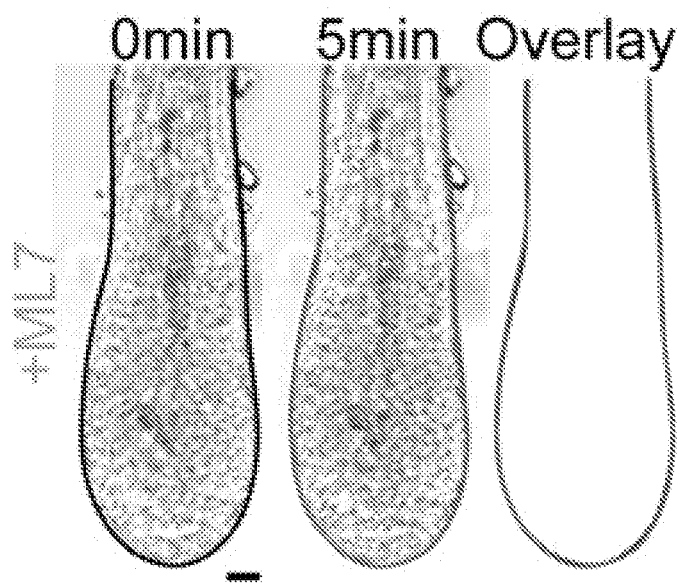
Figure 3F:
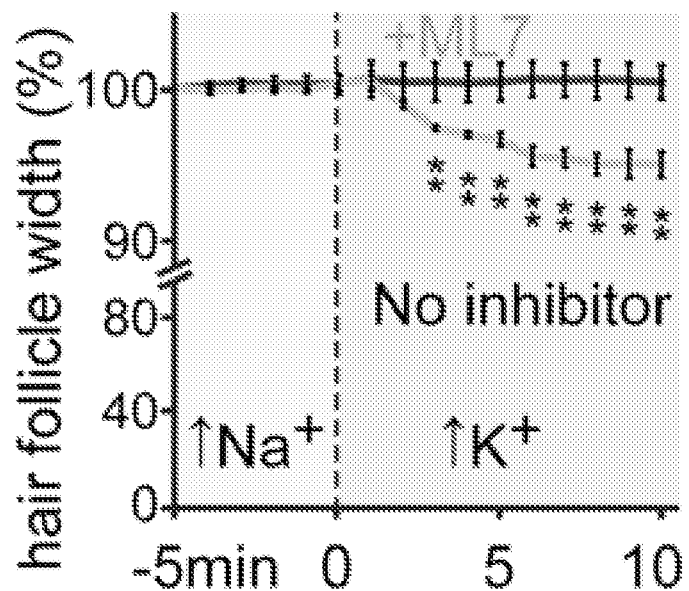

Whether DS cells can functionally contract in a smooth muscle-like fashion through Ca2+-dependent MLCK activation was then explored. Isolated, short-term cultured DS cells were membrane depolarized by an extracellular K+ spike to activate voltage-gated Ca2+ channels in the presence of Fluo8 fluorescent Ca2+ indicator. The switch from high Na+ to high K+ media led to effective Ca2+ influx within 1.5 minutes (FIG. 3A). Tracing the cell surface area of Acan$^{tdT}$-marked DS cells cultured on a soft substrate further demonstrated functional contraction in high K+ conditions during 15 minutes (FIG. 3B). Next, whether the DS can functionally contract and compress intact hair follicles isolated by microdissection (FIG. 3C) was tested. Live imaging of freshly isolated follicles showed significant reduction of follicle widths after 3 minutes in high K+, consistent with contraction of concentric αSMA/myosin rings (FIGS. 3D and 3F), which was effectively blocked by preincubation with the MLCK-specific inhibitor ML7 (FIGS. 3E-3F). These data demonstrate that the DS can functionally contract by activation of voltage-gated Ca2+ channels in the CaM to MLCK to MYL/MYH/αSMA pathway.

Figure 3G:
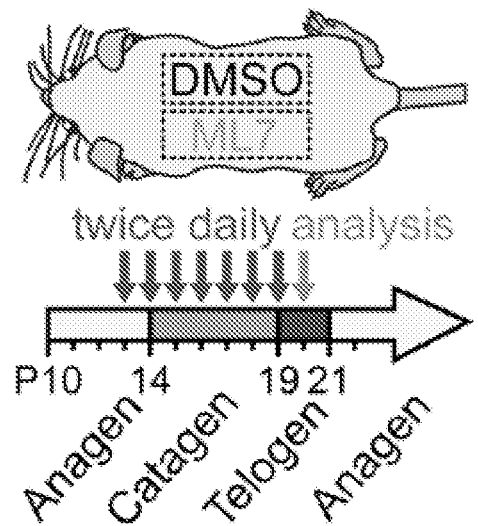
Figure 3H:
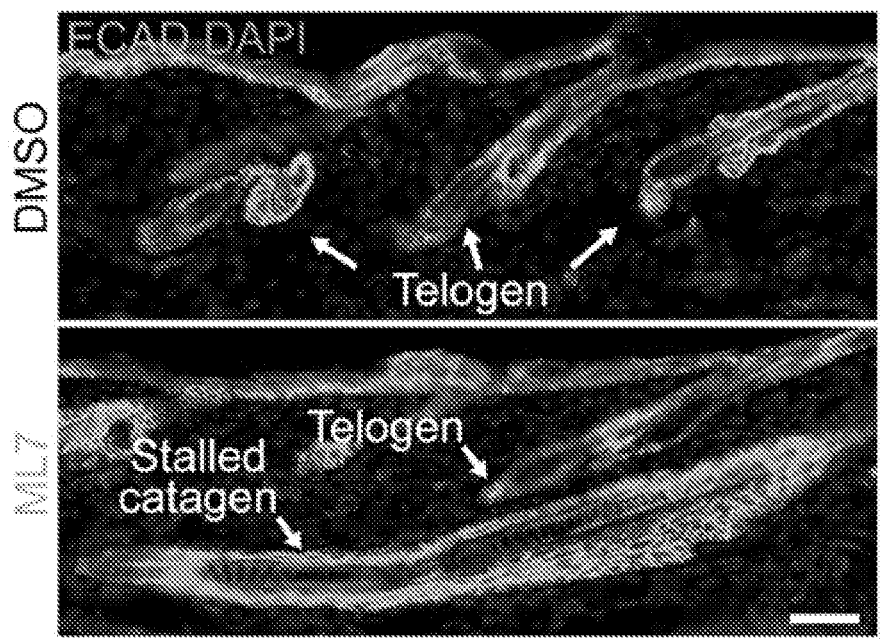
Figure 3I:
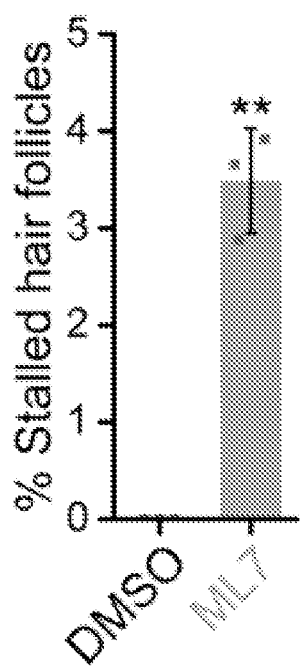
Figure 3J:
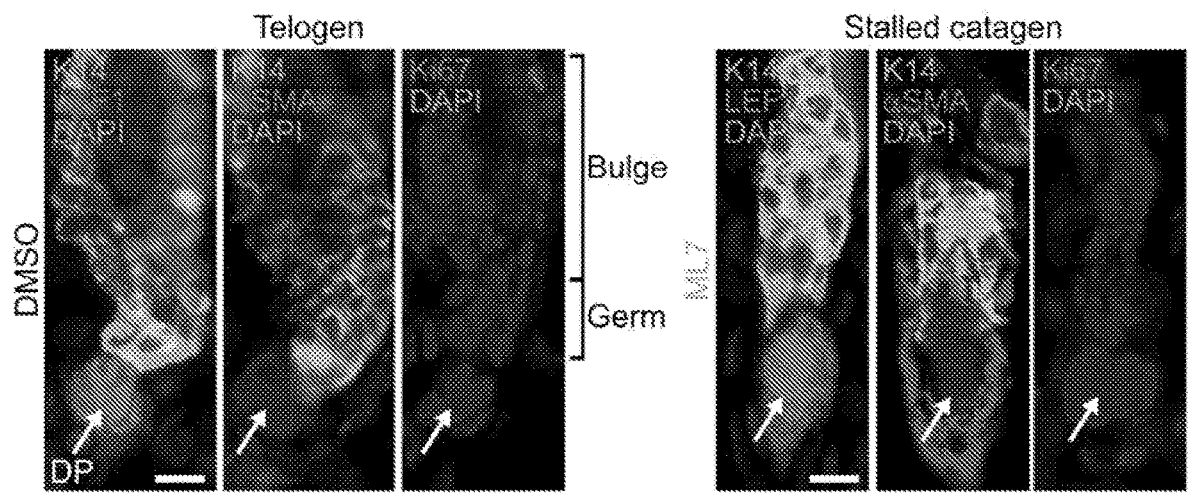

To determine whether smooth muscle-like contraction is a main function of the DS to propagate hair follicle regression in vivo, the MLCK pathway was blocked by twice-daily topical application of ML7 throughout catagen on the back skin of mice (FIG. 3G). On the contralateral vehicle control side, follicles regressed normally into telogen with the DP niche relocated next to the SC reservoir (FIG. 3H). ML7-mediated smooth muscle contraction blocking in the treated skin region, however, resulted in striking failure of regression with long stalled follicles stranded deep in the dermis (FIG. 3H-3I), reminiscent of the DS-ablated phenotype (FIG. 1E). Also here, the DP remains at the tip of stalled follicles (FIG. 3J). However, in contrast to ablated follicles, the DS as expected surrounds follicles including DP. Taken together, these data demonstrate that DS contraction is functionally required for follicle regression and DP niche relocation to the stem cells.

Figure 4A:
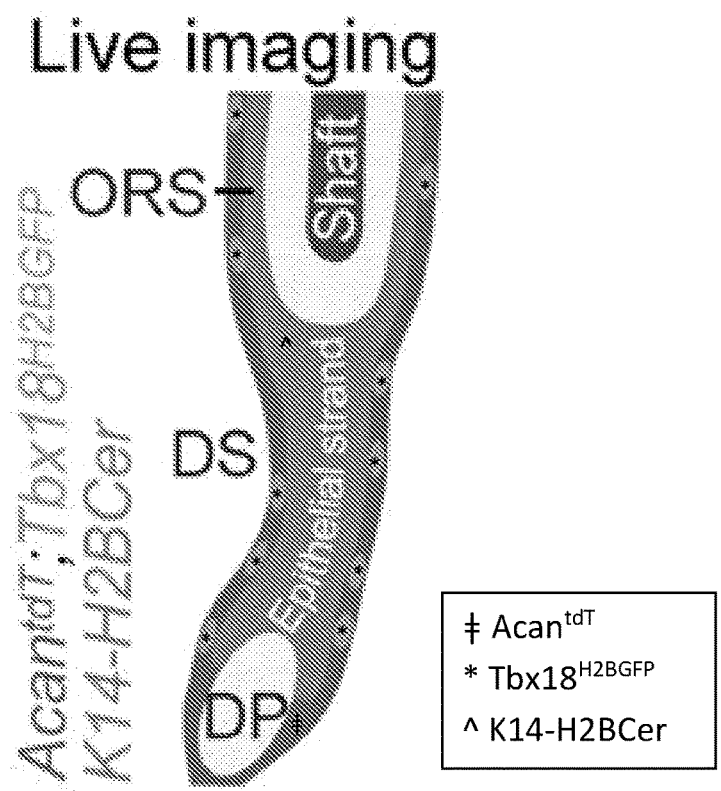
FIGS. 4A-4P show that DS cell movement pushes the hair shaft and indirectly pulls the DP.
Figure 4B:
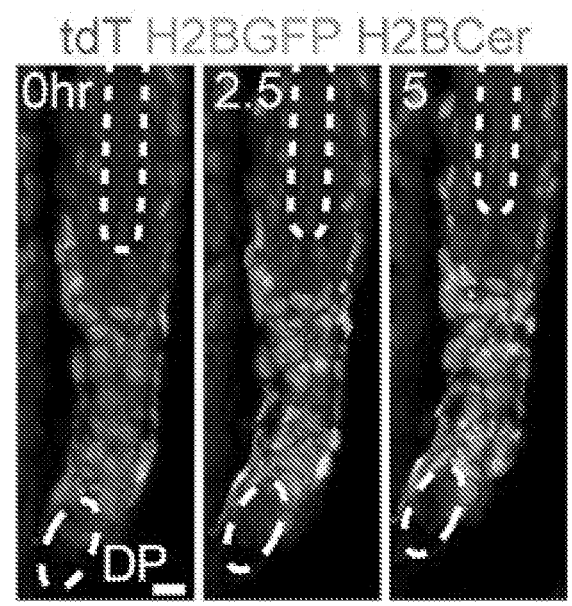
FIG. 4B shows single optical slices of a follicle during regression at 0 hours, 2.5 hours, and 5 hours of imaging.
Figure 11A:
Figure 11C:
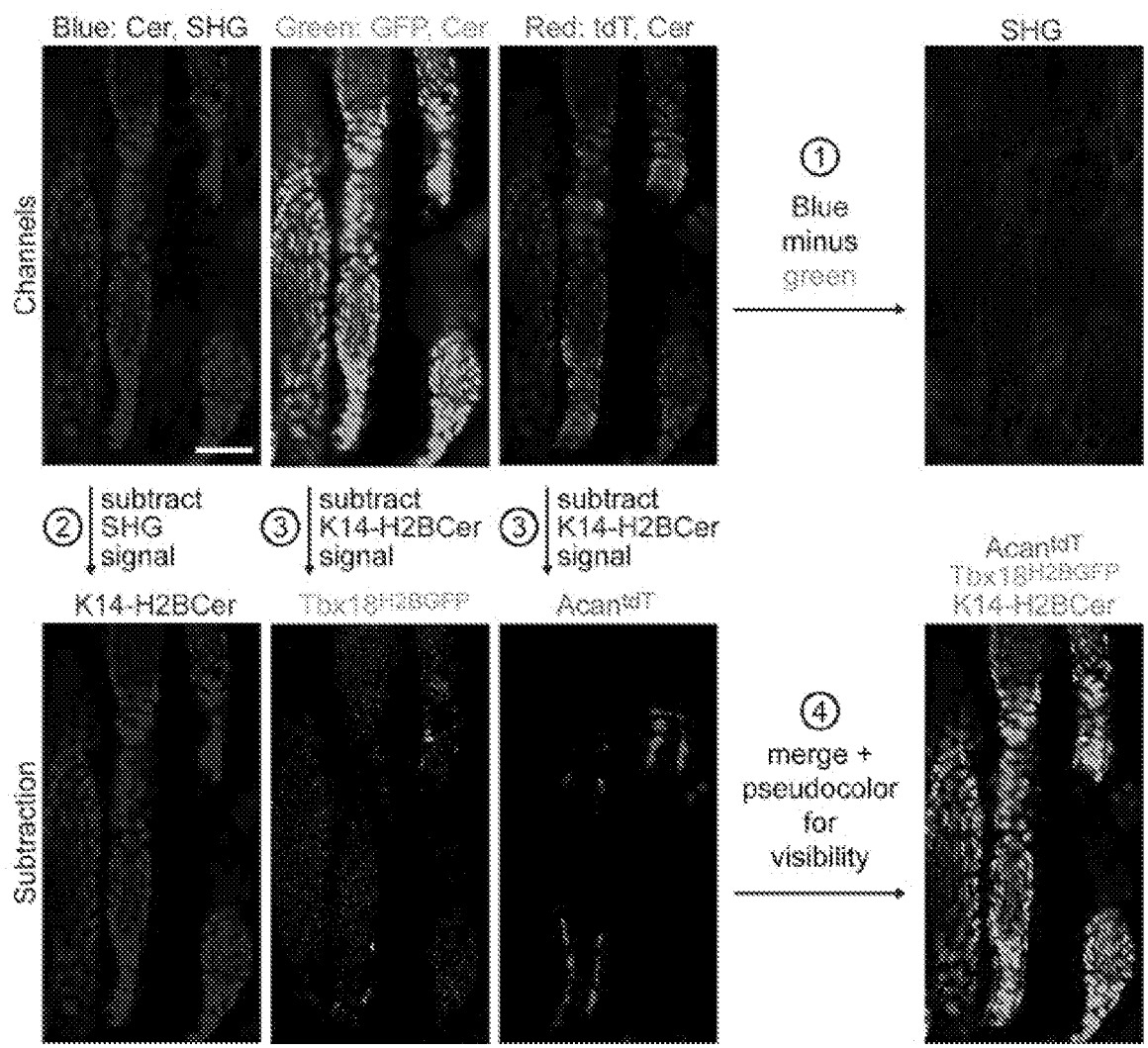
Figure 12A:
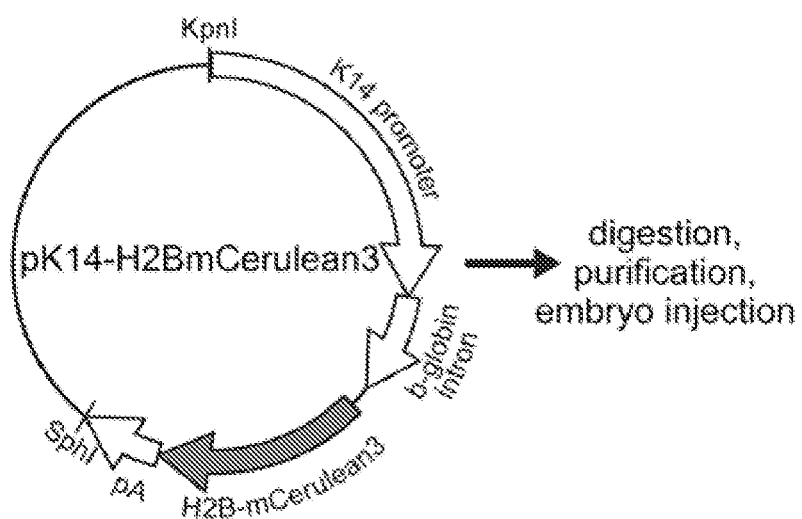
FIGS. 12A-12C show the generation of K14-H2BCer fluorescence reporter mice.
Figure 12B:
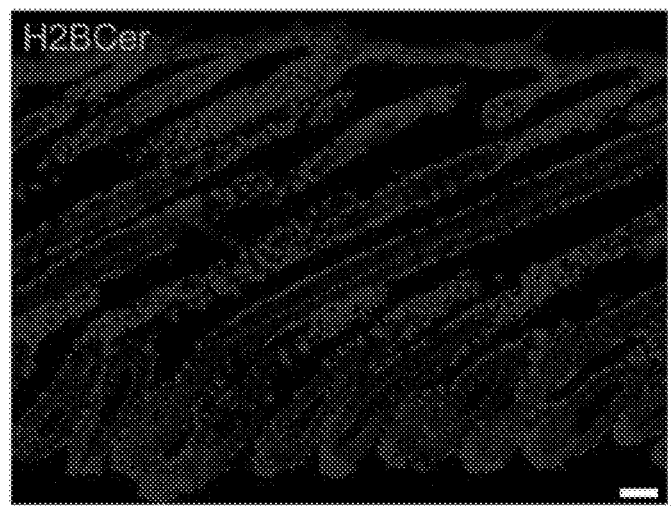

To directly investigate where the DS contracts and uncovered the force mechanism by which the DS drives niche relocation during regression, intravital 2-photon microscopy of unperturbed skin in live mice[15, 18] was utilized (FIG. 11A). Dual-color fluorescent labeling of DS cells was first established to visualize both the flat DS cell sheet while also highlighting their nuclei (FIGS. 4A-4B). Acan$^{tdT}$ labeled the DS cytoplasm in red, and Tbx18$^{H2BGFP}$ strongly marked DS nuclei in green and weakly those of the DP. To contextualize any DS cell movement, neighboring follicle progenitors also needed to be labeled independently. To this end, a K14-H2BCer transgenic line was generated that labeled the nuclei of all skin epithelial cells in bright blue (FIGS. 12A-12B). The triple-color fluorescent reporter combination (FIG. 12C) made possible the simultaneous live imaging of DS, DP niche, and follicle epithelium at a single excitation wavelength (FIGS. 11B-11C) and enabled fine-mapping over time their absolute movement and relative to each other.

Figure 4C:
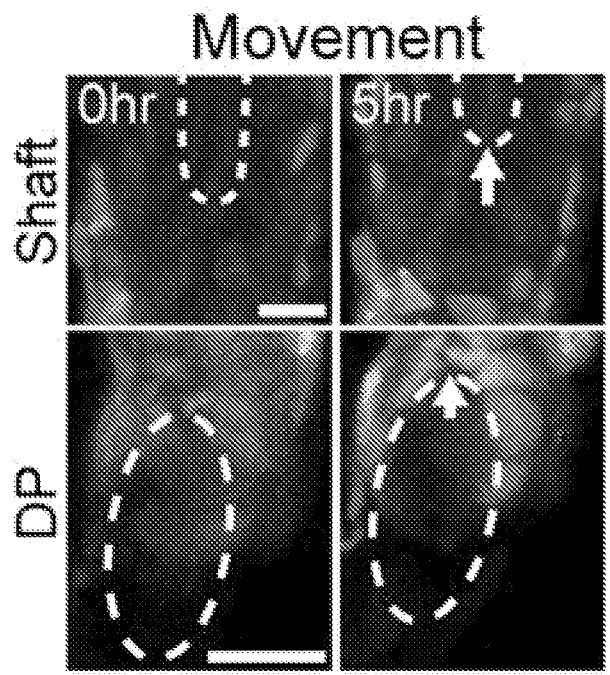
FIG. 4C shows the upward movement of hair shaft and DP during regression.
Figure 4D:
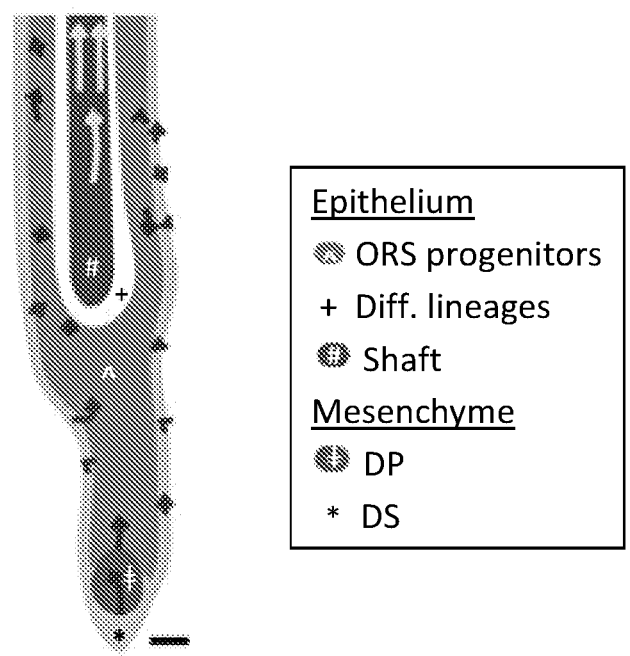
FIG. 4D shows the individual cell tracking of ORS (second layer moving outward inward from left to right or right to left), shaft (middle portion (fourth layer counting from the outermost to innermost) shown in the upper half of the image), and DS (first layer (outer layer) counting from the outermost to innermost) and tracking of upper and lower bounds of DP during 5-hour imaging.
Figure 4E:
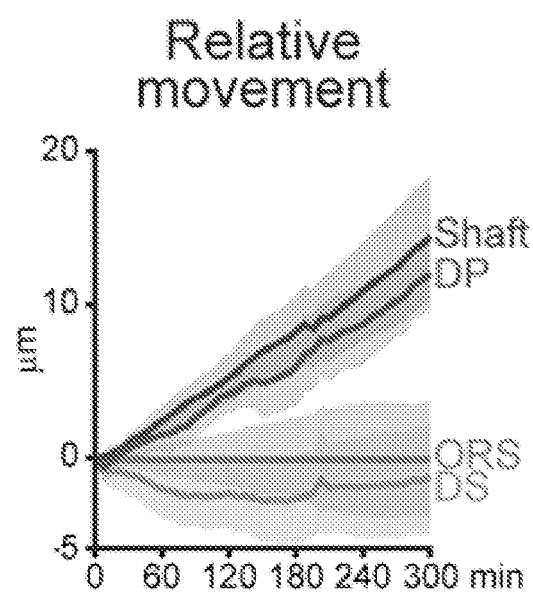
FIG. 4E shows the quantifications of live cell tracking relative to ORS movement (7.5 minute intervals). Shaft and DP move upward (distally) relative to ORS and DS. Solid lines are average; shaded areas are s.d. n=13 HS, n=8 DP, n=26 ORS, and n=17 DS measurements (7 follicles, 3 imaging sessions).
Figure 13A:
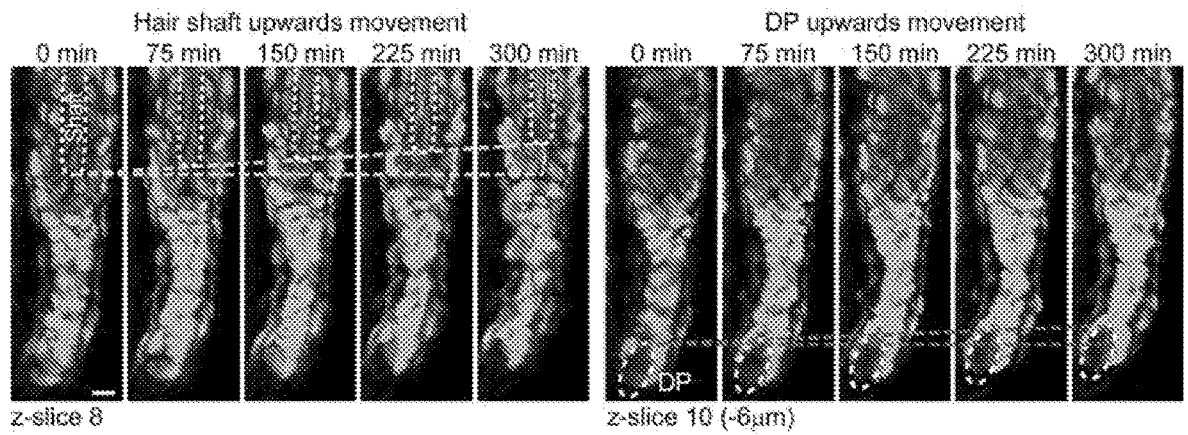
FIGS. 13A-13C show the dynamic movements of hair follicle populations during regression.
Figure 13B:
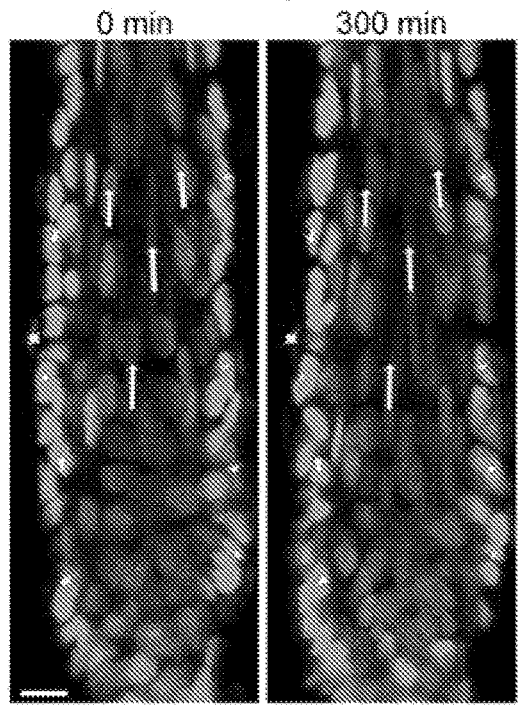

Cell tracking during a 5-hour span of catagen regression demonstrated upward movement of the hair shaft and DP, as expected (FIGS. 4B-4C and FIG. 13A). By contrast, the DS and ORS showed minimal movement in the long axis (FIGS. 4D-4F and FIG. 13B). Thus, it was concluded that the upward movement of the hair shaft occurs at the interface between the ORS progenitors and shaft, as previously observed[15]. Further, the lack of movement relative to each other also demonstrated that the DS and ORS maintain strong connections through the basement membrane that separates these cellular layers. Together, live imaging in the labeling setup and timeframe demonstrated that the movements of key components during catagen regression were captured.

Figure 4F:
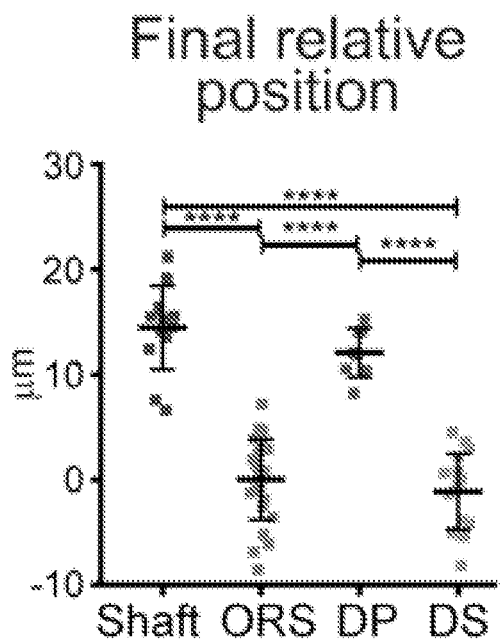
FIG. 4F shows the final relative cell movement. ****P<10-8, unpaired two-tailed t-test.
Figure 4G:
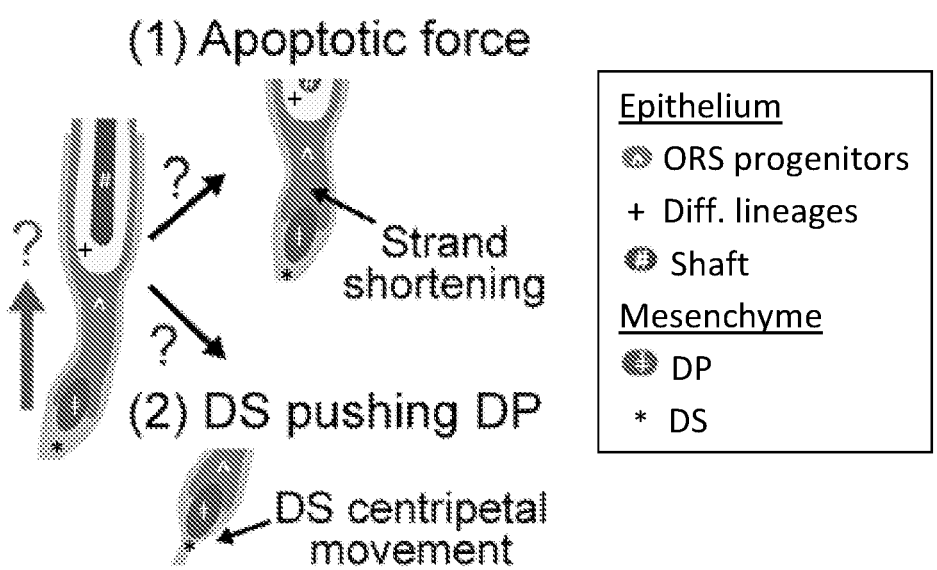
FIG. 4G is a schematic showing DP niche relocation during regression and shows two historically hypothesized mechanisms.

Then, the mechanism by which the niche becomes relocated during regression to reach its final position next to the stem cell reservoir was sought, and two long-standing hypotheses were tested. The first hypothesis states that an apoptotic force from the epithelial strand that pulls the DP[23]. The second hypothesis states that DS contracts to push the DP and/or hair shaft upwards[24] (FIG. 4G). To investigate the first hypothesis, the length of the epithelial strand during the 5-hour imaging window was measured. If the shrinking due to dying cells would generate force for pulling the DP, shortening of the strand correlating to DP movement (FIG. 4G) would be expected. However, while the epithelial strand length varies between follicles, their individual lengths remained constant throughout despite steady upward DP movement (FIGS. 2H-2I), ruling out the apoptotic force hypothesis. In support of this finding, it was also observed that shaft and DP upward movement occurred at similar rates (FIG. 4F).

Figure 4H:
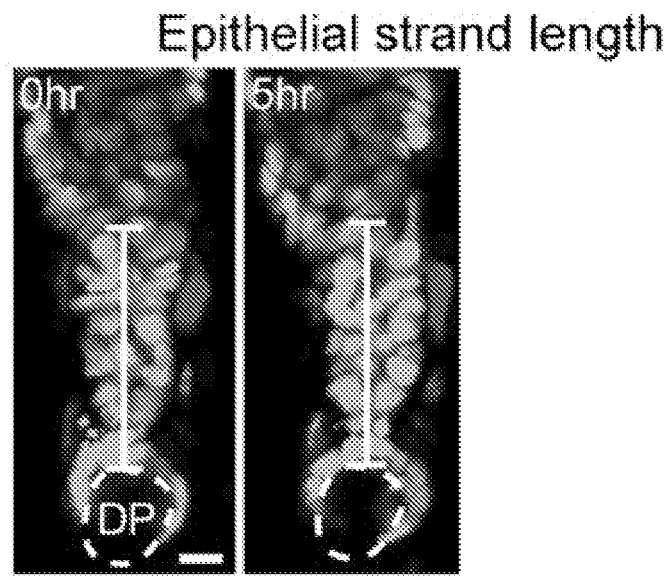
FIGS. 4H-4I show the DS cross-sectional diameter at DP bottom. n=4 follicles. P=0.994 (0 hours v. 5 hours.)
Figure 4I:
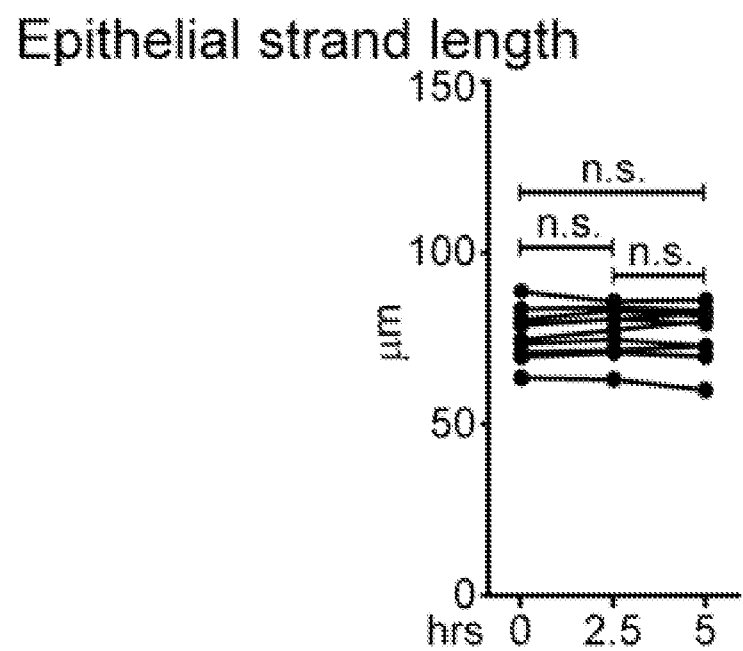
Figure 4J:
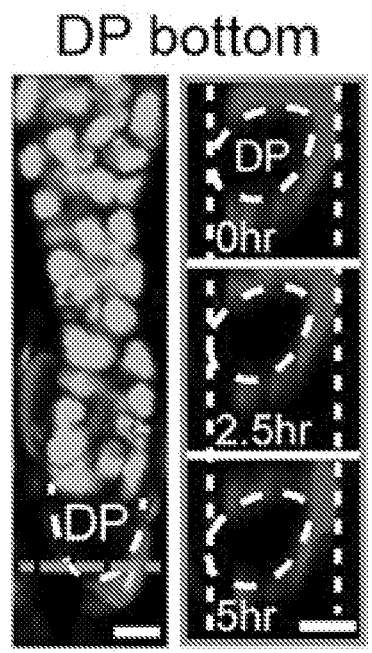
FIGS. 4J-4K show the length of epithelial strand during mid-regression. n=10 follicles. P=0.572 for 0 hours vs 5 hours.
Figure 4K:
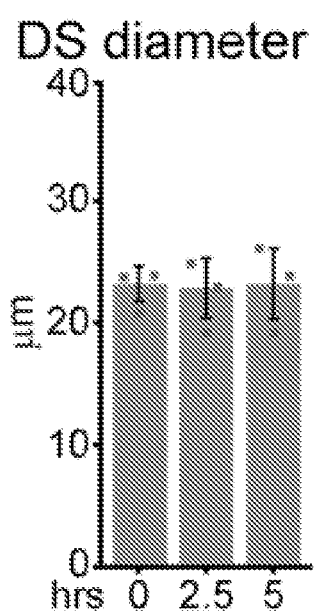
Figure 4L:
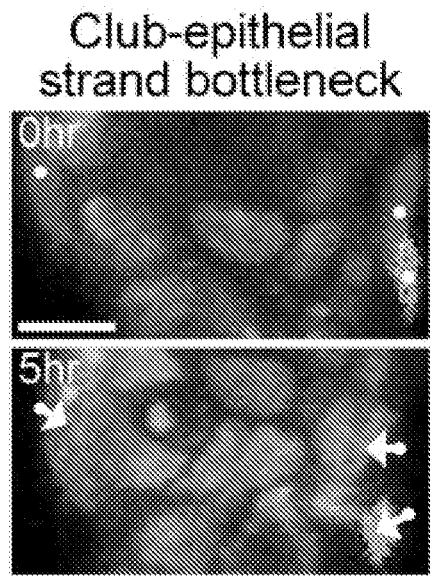
FIGS. 4L-4N show the DS cross-sectional diameter at club hair-epithelial strand bottleneck (n=3 follicles). *P=0.021, **P=0.009 and P=0.010, unpaired two-tailed t-test.
Figure 4M:
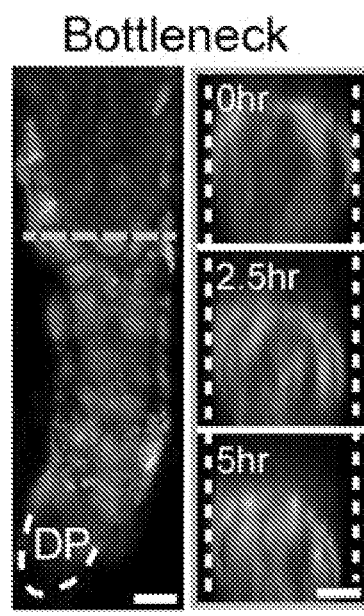
Figure 4N:
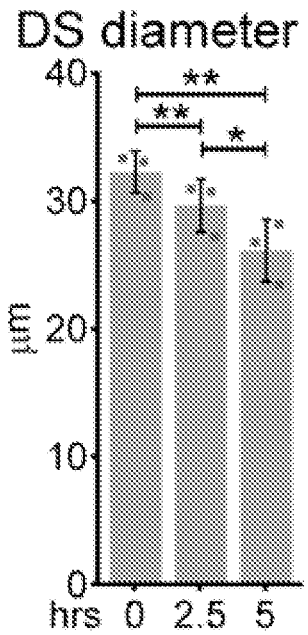
Figure 4O:
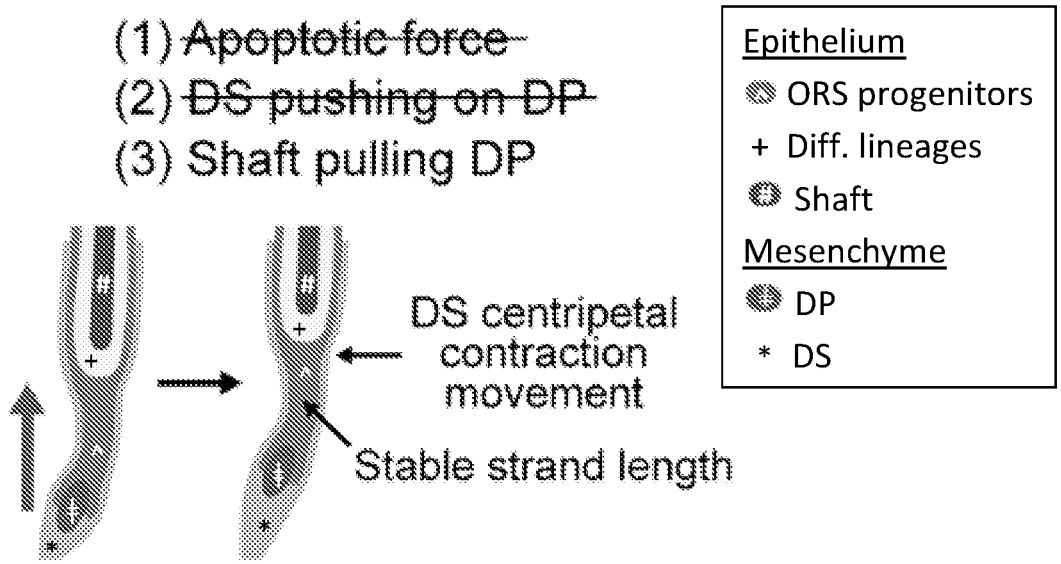
FIG. 4O is a schematic of the new proposed mechanism of DP niche relocation during regression by potential DS contraction on follicle bottleneck and pulling of DP via epithelial strand.
Figure 13C:
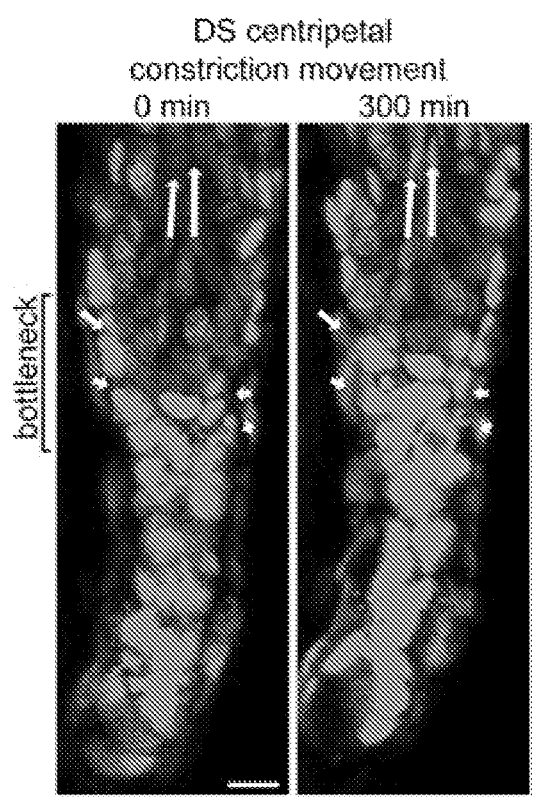

To test the hypothesis that a DS-generated contractile force pushes the DP from underneath, potential DS movement below the DP was investigated. If this hypothesis is true, DS centripetal contraction underneath the DP corresponding to contraction-driven upward movement would be expected. The cross-sectional diameter of the DS at the DP bottom over time was measured and it was found, however, that the diameter of DS remained unchanged during regression (FIGS. 4J-4K) indicating that direct DS contraction on the DP does not account for its relocation. Then, a variation of the contraction hypothesis was explored in which DS contraction pushes the shaft upward, which in turn pulls both the epithelial strand and the DP upward. The observation of an unchanged epithelial strand length (FIGS. 4H-4I) is consistent with this new hypothesis in which the strand acts as a stable tether between the shaft and DP (FIG. 4G). Indeed, centripetal contraction movement of DS cells right at the "bottleneck" that is formed by the border between the shaft-containing club hair and the narrower epithelial strand indicates that DS contraction pushes the shaft upward (FIG. 4L and FIG. 13C). Measuring the cross-sectional diameter of the ring formed by follicle-wrapping DS cells at this bottleneck, a significant decrease in diameter over time coinciding with shaft upward movement was found (FIGS. 4M-4N). These data reveal that the DS moves centripetally at the bottleneck towards the center suggesting that it contracts to generate the constriction force necessary for pushing the hair shaft upward—akin to the squeezing motion of a tooth paste tube—which then pulls the DP by its connection to the hair shaft via the epithelial strand (FIG. 4O).

Figure 4P:
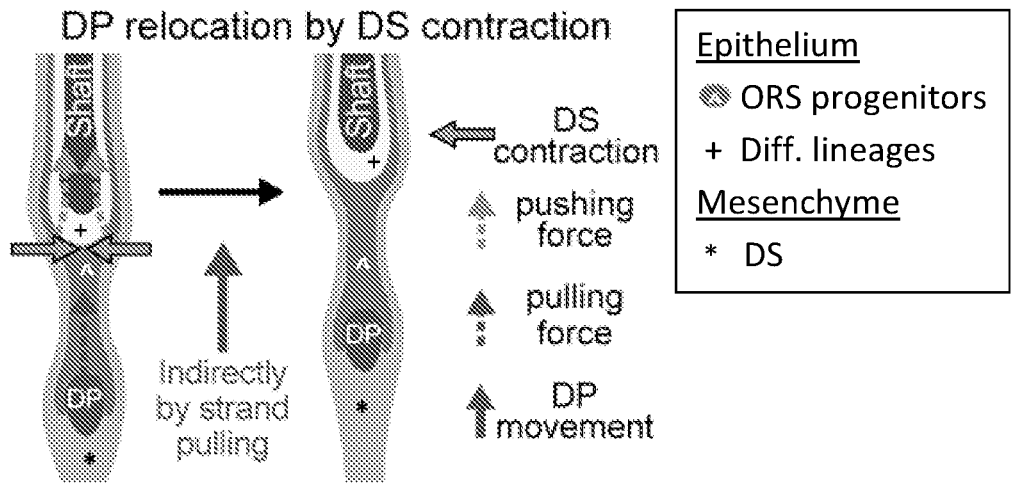

Here, the long-standing question of how the niche is relocated nearly the entire length of the follicle to reach its essential stem cell-adjacent position is answered. Through intravital imaging, contraction assays in isolated cells and intact follicles ex vivo, and in vivo inhibition of catagen skin, it has been demonstrated that DS is a smooth muscle that contracts to power the key catagen regression movements. The decades-old hypotheses that proposed apoptotic or contraction forces to propel catagen progression based on observations possible at the time were tested, and were consolidated into a new model, in which the niche relocates to the stem cells through a series of force relays (FIG. 4P). Having adapted the original "contraction hypothesis," the DS contracts throughout catagen at the club-strand bottleneck where, because of its angle, the centripetal constricting force gets redirected to an upward pushing force on the shaft. This force is then relayed through the tether-like epithelial strand pulling the DP. At the end stage of regression when the hair shaft has reached its final position and the DS trails below the DP as a hollow sleeve, it is possible that an epithelial strand apoptotic force then pulls in the niche next to the stem cell reservoir before launching regeneration in the next cycle.

Methods

Mice $Sox2^{GFP}$ [34] and Lef1-RFP[26] mice to label key skin populations was described previously[6, 27]. $R26^{mT/mG}$ [35], $Acan^{CreER}$ [36], $R26^{LSL-tdTomato}$ (Ai14)[37], and $R26^{LSL-DTA}$ [38] were obtained from the Jackson Laboratory. Generation of $Tbx18^{Cre}$ and $Tbx18^{H2BGFP}$ mice was previously described[39]. Generation of K14-H2BCer mice is described below. All animal studies were conducted in accordance with the guidelines and approval of the Institutional Animal Care and Use Committee (IACUC) at ISMMS, and all mice used in this study were housed in facilities operated by the Center for Comparative Medicine and Surgery (CCMS) at ISMMS.

$Acan^{CreER}$; $R26^{LSL-tdTomato}$ and $Acan^{CreER}$; $R26^{LSL-DTA}$ mice were injected with tamoxifen (20 mg/ml dissolved in corn oil, injections of 0.2 g/kg body weight i.p.) daily from P10-P12 for DS-labeling and -ablation experiments and P9, P10 for intravital imaging experiments. Animals were PCR genotyped to select for control and experimental groups without blinding. All labeling, ablation, and intravital imaging experiments were repeated with at least three different mice; all specific n values for each experiment were listed in figure legends. All experiments were performed on both sexes with verification of all major findings present in both, but only results from females were reported to avoid any variation of measurements owing to sex.

Human Scalp Samples

Samples of human scalp were obtained from the Skin and Laser Center of the Mount Sinai Health System. Samples were collected during Mohs procedures, and regions of healthy tissue were separated from tumor-containing regions before processing. Additionally, selected tissue was verified for the absence of tumors by histology before use in further experimentation. Personal patient information was blinded to researchers except for age and sex. The study was conducted in accordance with guidelines outlined by the institutional review board (IRB) at ISMMS.

Generation of K14-H2BCer Mice

An H2BmCerulean3 (H2BCer) insert was obtained from the mCerluean3-N1 plasmid (M. Davidson via Addgene, #54730) by BamHI/XbaI (NEB) restriction enzyme digestion and subsequently ligated into a pG3Z-K14-H2B vector (E. Fuchs) with T4 Ligase (NEB). The final K14-H2BCer cassette was obtained from the resultant plasmid by digestion with KpnI and SphI (NEB) and injected into blastocysts at the ISMMS Mouse Genetics and Gene Targeting CoRE. Transgenic mice were then screened for Cer fluorescence in tail tips and PCR genotyping using primers targeting the transgene-unique K14 promoter/enhancer. A single founder was then selected from all mice positive for the transgene that had the highest and most uniform expression of H2BCer in the epidermis of F1 generation mice to establish the final transgenic line.

Immunofluorescence and Microscopy

For immunofluorescence on tissue sections, back skins were harvested then embedded and fresh frozen in OCT (Tissue Tek). Sections were cut at a thickness of 8 µm with a Leica cryostat. After drying, sections were post-fixed to slides with 4% paraformaldehyde for 15 minutes at room temperature. After washing in PBS, sections were then permeabilized in 0.3-1.0% Triton X-100/PBS for 15 minutes at room temperature before blocking in 0.5% normal donkey serum (Jackson ImmunoResearch) or MOM blocking reagent for mouse primary antibodies (Vector Labs) for 1 hour at room temperature. Primary antibody labelling against ITGA8 (R&D Systems, goat 1:100), ACAN (Millipore, rabbit 1:100), αSMA (Neomarkers, mouse 1:100), PDGFRA (eBiosciences, rat 1:100), ECAD (Invitrogen, rat 1:1000), LEF1 (Cell Signaling, rabbit 1:100), K14 (Gifts from J. Segre, rabbit or chicken 1:1000), activated CASP3 (R&D Systems, rabbit 1:300), Ki67 (Leica, rabbit 1:200), AE13 (Abcam, mouse 1:100), AE15 (Santa Cruz, mouse 1:50), K6 (Gift from E. Fuchs, rabbit 1:1000), MYH10 (Cell Signaling, rabbit 1:25), MLCK (Abcam, rabbit 1:100), MYL9 (Proteintech, rabbit 1:100), phosphorylated (Ser19) MYL9 (Novus, rabbit 1:100), or SM22 (Proteintech, rabbit, 1:200) was performed at room temperature for 1 hour or 4° C. overnight. Secondary labeling was done with donkey anti-goat, rabbit, rat, or mouse antibodies conjugated with AlexaFluor 488, 555, or 647 (Jackson ImmunoResearch, Invitrogen) for 30 minutes at room temperature. Nuclei were labelled with Hoechst 33342 (Thermo Fisher), and stained sections were mounted in a glycerol-based p-phenylenediamine (Sigma) antifade reagent.

For whole mount immunofluorescence of single hair follicles from mouse back skin or human scalp, tissues were harvested and fixed in 4% PFA for 2 hours at room temperature with gentle shaking. Individual hair follicles were then separated from the skin through microdissection under a Leica S6E stereomicroscope and collected into a 96-well plate with PBS. Tissue was permeabilized in 0.5% Triton X-100/PBS for 15 minutes, washed, then stained in primary antibody against αSMA (Abcam, rabbit 1:300), K14 (Gift from J. Segre, rabbit 1:1000), SM22 (Proteintech, rabbit 1:200), MYH11 (Proteintech, rabbit 1:100), or MYL9 (Proteintech, rabbit 1:100) at 4° C. overnight. Secondary labeling was done with donkey anti-rabbit or chicken antibodies conjugated with AlexaFluor 488, 555, or 647. Nuclei were then labelled with Hoechst 33342, and follicles were then mounted in antifade reagent.

The whole mount immunofluorescence of pieces of intact back skin followed a modification of a previously published procedure[40]. Tissues were harvested, and fixed in 4% PFA for 2 hours at room temperature or overnight at 4° C. before peeling away the panniculus carnosus muscle and cutting into 1 cm×2 cm strips. Subsequent steps were then performed in a 6-well plate. Skins were then treated with 0.3% Triton X-100/PBS for 5-8 hours before primary antibody staining for K14 (rabbit 1:1000) in a 0.3% Triton X-100, 5% donkey serum, 20% DMSO/PBS solution at room temperature for 3-5 days with gentle shaking. After washing in 0.3% Triton X-100/PBS solution for 5-8 hours at room temperature with media changes every 30 minutes, tissues were then stained with a donkey anti-goat AlexaFluor 555 antibody in the Triton X-100/donkey serum/DMSO/PBS solution used similarly with primary antibody labeling for 2-3 days at room temperature with gentle shaking. Finally, tissues were washed again in 0.3% Triton X-100/PBS solution for 5-8 hours at room temperature with media changes every 30 minutes and counter stained with Hoechst 33342. Optical clearing was then performed by dehydrating tissue in 50:50 methanol/water for 5 minutes then a series of three 100% methanol treatments for 30 minutes each at room temperature. Final clearing was performed in a BABB (benzyl alcohol/benzyl benzoate, 1:2 ratio) solution until visibly clear then mounted in residual BABB held in a chambered glass slide.

Immunofluorescence stained sections were imaged with Leica DM5500 widefield microscope, and whole mount stained tissues were imaged with a Leica SP5 DMI confocal microscope equipped with Leica LASAF software. Images were post-processed and adjusted for brightness and contrast using ImageJ/FIJI (NIH). Hair follicle length was measured from whole mount fluorescence stained, cleared back skin in FIJI and defined as length from the proximal tip of K14+ epithelium to the base of the sebaceous gland.

Isolation of DS, DP, and DF

During morphogenetic anagen, DP and DS from 1st and 2nd wave hair follicles could be distinguished based on distinct expression patterns of $Sox2^{GFP}$; Lef1-RFP reporter expression[27]. In order to further purify the DS and DP, both were selected as PDGFRA-Brilliant Violet 421+. Back skins were harvested from P5 mice and digested in dispase (Invitrogen) overnight at 4° C. Epidermis was then removed from dermis by peeling, and the dermis was then digested in a 0.2% collagenase (Sigma-Aldrich) and DNase (20 U/µl, Roche) solution at 37° C. for one hour with gentle shaking. Cell pellets were obtained by centrifugation at 350×g for 5 minutes and further digested in 0.25% trypsin EDTA solution for 5 minutes at 37° C. Cells were then stained against PDGFRA (eBiosciences, biotinylated rat, 1:50) followed by streptavidin-Brilliant Violet 421 (Biolegend, 1:200) secondary staining. DAPI was added for live/dead cell identification and cells were sorted using a BD Influx cell sorter at the ISMMS Flow Core facility using the following criteria: DP=GFP+, RFP+, PDGFRA+; DS=GFP+, RFP−, PDGFRA+; DF=GFP−, $RFP^{mid}$. FACS profiles were analyzed using FlowJo software.

qRT-PCR

Whole cell RNA was purified from sorted cells using the Absolutely RNA Nanoprep Kit (Agilent). cDNA synthesis was done with Superscript III (Invitrogen) using oligo(dT) primers. qRT-PCR was performed using SYBR Green Master Mix I (Roche) on a LightCycler 480 thermocycler (Roche). Relative mRNA levels were calculated using the $2^{-\Delta\Delta Ct}$ method, normalized to Gapdh. All measurements were performed with biological duplicates each with technical duplicates.

RNA Sequencing and Analysis

Total RNA was purified from sorted cells using the Absolutely RNA Nanoprep Kit (Agilent). RNA concentrations were measured with a NanoDrop spectrophotometer (Thermo), and quality was assessed using an Agilent Bioanalyzer. Samples with an RNA integrity number score of 8 or higher were further processed. 6 ng of starting material was reverse transcribed and amplified with the RNA Ovation RNAseq System V2 (NuGEN). cDNA was then sheared by sonication using a Covaris LE220. From 100 ng of sheared amplified cDNA, sequencing libraries were generating with 6 unique barcoded adaptors, one for each sample (2 biological replicates×3 populations) using the Ovation Ultralow DR Library System (NuGEN). Library concentration and quality were quantified by Qubit (Invitrogen) and Agilent Bioanalyzer. Samples were then sequenced on the Illumina HiSeq 2000 platform using a 50-nt single-read setting at the Genome Technology Center at NYU.

To refine the DS gene signature, previously published RNA sequencing data from 3 additional follicle populations consisting of hair follicle outer root sheath, matrix, and melanocytes obtained at a similar age[27] were included in analyses. Raw RNA sequencing reads were mapped to the mm10 mouse genome with TopHat v2.0.3[41] coupled with Bowtie2[42] aligner with default parameters. Transcriptomes were assembled and fragments per kilobase per million reads (FPKM) for each gene were computed with Cufflinks v2.1.1[43]. Differentially expressed genes (DEGs) were identified using Cuffdiff (with default parameters except for the library normalization method was upper quartile normalization, where FPKMs were scaled via the ratio of the 75th quartile fragment counts to the average 75th quartile value across all libraries) and ANOVA with Benjamini-Hochberg correction for multiple hypothesis testing with significance cut off FDR<0.05. Principal component analysis and hierarchical clustering were performed on all DEGs using Origin 2019 (OriginLab) and Morpheus (Broad) respectively. Population signature genes were defined by DEGs with an FPKM≥5, and fold enrichment ≥2 compared to all other populations. Gene set enrichment analysis was performed on GenePattern (Broad) using a user-defined gene set for smooth muscle contraction and regulation components (Table 2).

Intravital Live-Imaging and Analysis $Acan^{tdT}$; $Tbx18^{H2BGFP}$; K14-H2BCer mice were injected with tamoxifen (0.15 g/kg i.p.) at P9 and P10 to label DS cytoplasm with tdT. Mice were then imaged at P15 or P16 to capture mid-regression using an Olympus FV1000 MPE 2-photon microscope equipped with a tunable Coherent Chameleon Ultra Ti:Sapphire laser. During imaging, mice were first anaesthetized with ketamine/xylazine mixture (100 mg/kg, 12.5 mg/kg i.p.) and subsequently maintained on inhaled isoflurane anesthetic (0.75% isoflurane vapor, O2 flow rate=0.75 L/minute, EZ Anesthesia) delivered through nose-cone. Specifications of the imaging stage set up was as previously described[2, 15, 18, and 44]. Optical slices were captured using a single 900 nm excitation wavelength at 10% laser power and resultant fluorescence imaged with a 25×XLPlanLN water immersion objective (NA 1.05, Olympus). Emission filters for each channel were as follows: blue=BA420-456, green=BA495-540H, red=BA575-630. Each optical slice field had a 250×400 μm area captured at a resolution of 640×1024 px with a 12.5 μs/px scan speed. Z-stacks of 30-45 μm in depth were taken with 3 μm step intervals. Time intervals between acquisitions for time-lapse imaging were 7.5 minutes.

Figure 12C:
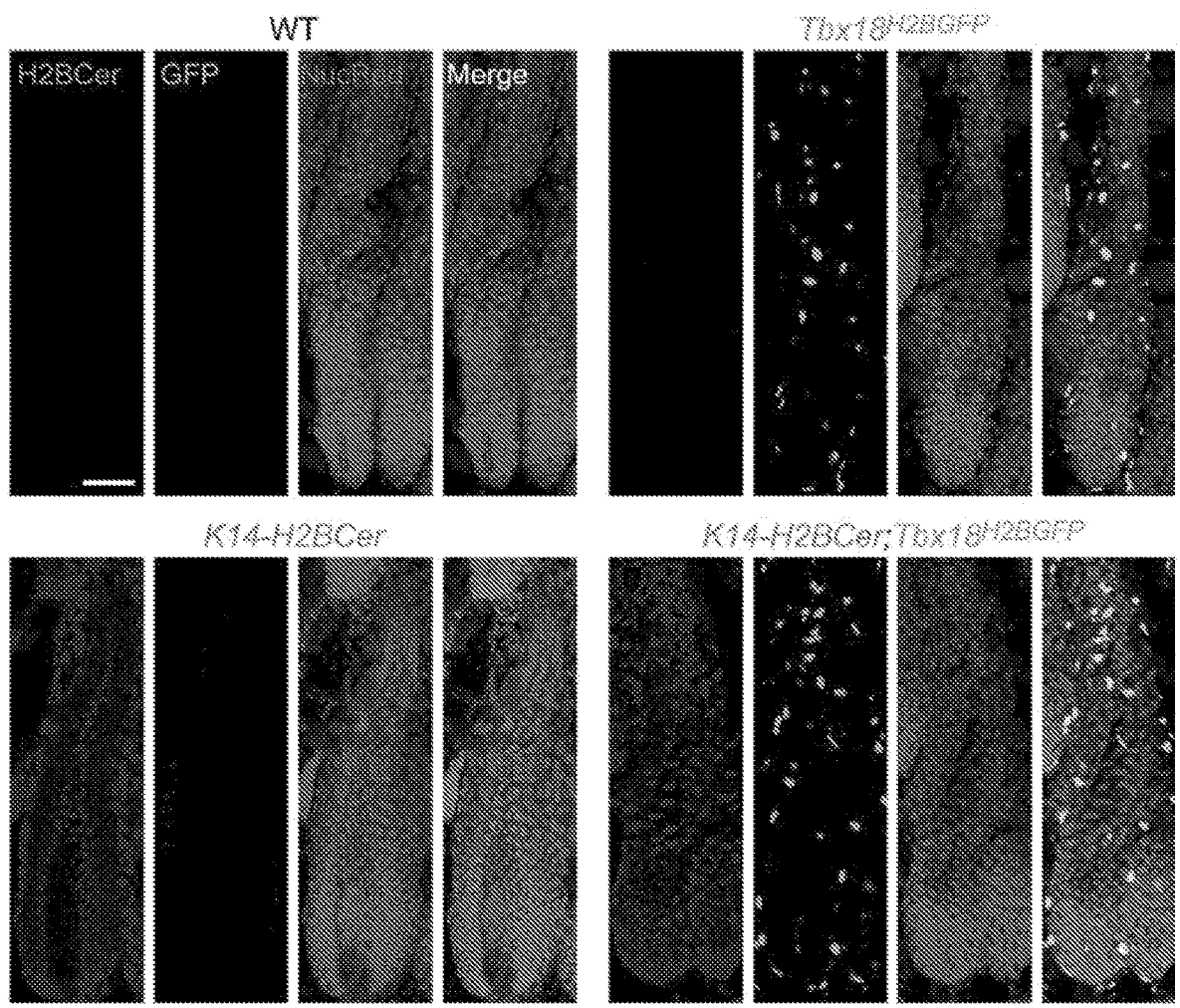

Raw images of time-lapse series were processed in FIJI to separate fluorescence signal from each fluorescent protein type, the process for which is demonstrated in FIGS. 12A-12C. Fluorescence signal captured by each channel were as follows: blue=mCerulean3 and second harmonic generation (SHG), green=GFP and Cer, and red=tdT and mCerulean3. The excitation/emission spectra and fluorescence strength of Cer permitted its fluorescence excited at 900 nm to be strongly visible in the blue and green channels and moderately visible in the red channel. To isolate only the Cer signal in the blue channel, first the pixel values of the green channel were subtracted from the blue channel to obtain SHG signal, which was then subtracted from the blue channel so that only Cer signal remained. The resulting Cer pixel values were then subtracted from the green and red channels to isolate GFP and tdT signal respectively. The Cer stack was then pseudocolored to light blue for better visibility and was color merged with isolated GFP and tdT stacks to obtain the final triple color images.

Cells were manually tracked in FIJI by determining the x,y coordinates of the centers of nuclei. Tracking did not include the z dimension since cells rarely moved between z-sections during imaging sessions. The strong brightness of the H2BCer fluorescence enabled tracking of nuclei of differentiated hair shaft cells which were identified by anatomical location and extreme ovoid nuclear shape. Movement of DPs were measured by determining the boundaries of round DP clusters made by the surrounding epithelial or DS cells and weak H2BGFP fluorescence. Movements of cells and structures were standardized to the relative movement compared to the average movement of tracked ORS cells of each respective follicle. Any cells that underwent apoptosis during imaging were not included in movement quantifications.

In Vitro Intracellular Ca2+ and Contraction Assays $Acan^{tdT}$ mice were injected with tamoxifen (0.15 g/kg i.p.) at P6 and P7 to fluorescently label DS. Single cell suspensions were obtained from P8 back skins using a dispase/collagenase digestion procedure as described for flow isolations and plated to 24-well plates. For contraction assays, cells were plated to pre-coated Matrigel (Corning 1:50) plates. Cells were grown in DMEM (Gibco) containing 10% bovine calf serum (HyClone) and were incubated at 37° C. with 5% CO2 for 24-48 hours to allow for attachment. Cells were then incubated in Krebs buffer+glucose for 1 hour prior to assays. Both assays were conducted on an inverted DM6000 microscope with a live cell chamber set to 37° C. with 5% CO2. DS cells were identified and selected by tdT fluorescence. Ca2+ assays were performed using the Fluo-8 No wash Calcium Assay Kit (AAT Bioquest). Fluorescence was quantified in FIJI by averaging the signal of three 25×25 μm areas per cell in the cell periphery. Cell surface areas during contraction assays were measured in FIJI by quantifying areas of threshold fluorescence signal exclusive of cell-occupied areas.

Ex Vivo Hair Follicle Contraction Assay

Hair follicles were microdissected from P8 back skin under a Leica S6E stereomicroscope in PBS and collected in 24-well plates. Media was then changed to Krebs buffer+glucose with or without 200 μM ML7 HCl (Tocris) and incubated for 1 hour at 37° C. Single follicles were then transferred to a 6 cm petri dishes immersed in Krebs buffer+glucose and immobilized by embedding the hair shaft tips in a 5×5 mm piece of parafilm. Follicles were then imaged under brightfield illumination on a Leica inverted DM6000 microscope in an enclosed live cell chamber at 37° C. with 5% CO2. Images were taken with a 10× air lens with time intervals of 10 seconds. During imaging, media was exchanged for Krebs buffer+glucose with KCl supplanting NaCl and follicles were refocused when necessary, which took a duration of no more than 10 seconds. Measurements of follicle width at each time point were made in FIJI at three separate locations of the follicle isthmus located above the bulb and averaging. Presented data points and statistics were performed on the means of biological replicates each consisting of technical triplicates of width measurements.

In Vivo Contraction Inhibition

Patches of lateral back skin measuring 1×1 cm of P13 mice (2 patches per mouse) were clipped and then shaved with a razor blade until no external hair shafts within patches remained. Vehicle-only control DMSO or ML7 HCl (Tocris) dissolved in an equal volume of DMSO (1 mM in 20 µl) was pipetted onto hairless patches and locally rubbed into the skin using a glass rod until visibly dry. Topical applications were performed twice daily from P13 to P19, once in the morning and once in the evening separated by 12 hours. Pieces of back skins including treated areas were then harvested at P20 for downstream analysis.

Statistics and Reproducibility

Data are represented as percentages, whisker plots, bar plots, or line plots with error bars or boundaries as mean±s.d. Two-tailed, unpaired Student's t-test was used to analyze data sets with two groups. ANOVA with Benjamini-Hochberg correction for multiple hypothesis testing was performed to generate DEGs from RNA sequencing. Generation of data plots and statistical analyses were performed using Microsoft Excel, MATLAB (MathWorks), or Origin 2019 (OriginLab). No statistical method was used to predetermine sample sizes. P-values<0.05 were designated as significant and symbolized in figure plots as *P<0.05, P<0.01, *P<0.001, ****P<0.0001 with precise values supplied in figure legends.

CONCLUSION

As intimate crosstalk between stem cells and their niches is vital for proper stem cell maintenance and cell fate decisions, it is unsurprising that niches are found in anatomically distinct locations for hematopoietic stem cells in the bone marrow and intestinal stem cells at the crypt base. Providing close proximities for paracrine signaling and insulation from outside influences, most stem cell niche systems under homeostasis remain structurally stable, but after injury to the niche, re-establishment is vital for the restoration of long-term function[31, 32]. While hematopoietic stem cells can mobilize, and home to their niche, such as during transplantation[33], the more restricted freedom of movement of epithelial stem cells may limit their homing potential. Here, a smooth muscle function was discovered to relocate a niche to its stem cell reservoir to add to the vast array of diverse roles of smooth muscles throughout the body. This example highlights the evolutionary advantage of repurposing pre-existing functionality rather than inventing new systems in wake of new adaptive challenges. Further study may identify more instances of the function of smooth muscle contraction in regulating stem cell niche signaling range in homeostasis, which could be lost or exploited in disease.

OTHER EMBODIMENTS

Embodiment 1. A method of treating hair loss comprising administering a therapeutically effective amount of a pharmacological agent that inhibits the myosin light chain kinase (MLCK) pathway in a dermal sheath cell of a hair follicle, thereby treating hair loss.

Embodiment 2. The method of embodiment 1, wherein the pharmacological agent is a compound, a peptide, or an antibody which inhibits myosin light chain kinase.

Embodiment 3. The method of embodiment 2, wherein the compound, peptide, or antibody has a binding inhibitory IC50 value of 100 nM or less.

Embodiment 4. The method of embodiment 1, wherein the pharmacological agent is wortmannin, KT5926, K-252a, MS-444, ML-9, or ML-7, or a combination thereof.

Embodiment 5. The method of embodiment 1, wherein the pharmacological agent is:

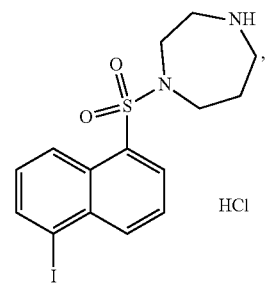 [SMILES: O=S(=O)(c1cccc2c(I)cccc12)N1CCCNCC1 ; Cl]

or a functional derivative thereof.

Embodiment 6. The method of embodiment 1, further comprising administering an agent for facilitating hair growth.

Embodiment 7. The method of embodiment 6, wherein the agent for facilitating hair growth is one or more of finasteride, cyproterone acetate, alfatradiol, minoxidil, bimatoprost, bicalcutamide, spironolactone, flutamide, lantoanoprost, dutasteride, or ketoconazole.

Embodiment 8. The method of embodiment 1, wherein the pharmacological agent is administered topically.

Embodiment 9. The method of embodiment 1, further comprising administering a penetration enhancer prior to or concomitantly with the administration of the pharmacological agent.

Embodiment 10. The method of embodiment 1, wherein inhibiting the myosin light chain kinase (MLCK) results in cessation of dermal sheath cell contractions, thereby halting the hair cycle in the catagen phase.

Embodiment 11. A method of treating hair loss comprising administering a therapeutically effective amount of a pharmacological agent that inhibits the smooth muscle cell-like contractions of the dermal sheath cells of the hair follicles, thereby treating hair loss.

Embodiment 12. The method of embodiment 11, wherein the pharmacological agent is a compound, a peptide, or an antibody which inhibits the smooth muscle cell function of the dermal sheath cells.

Embodiment 13. The method of embodiment 12, wherein the compound, peptide, or antibody has a binding inhibitory IC50 value of 100 nM or less.

Embodiment 14. The method of embodiment 11, wherein the pharmacological agent is wortmannin, KT5926, K-252a, MS-444, ML-9, or ML-7, or a combination thereof.

Embodiment 15. The method of embodiment 11, wherein the pharmacological agent is:

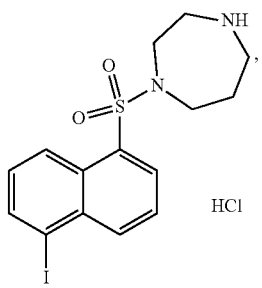 [SMILES: O=S(=O)(c1cccc2c(I)cccc12)N1CCCNCC1 ; Cl]

or a functional derivative thereof.

Embodiment 16. The method of embodiment 11, further comprising administering an agent for facilitating hair growth.

Embodiment 17. The method of embodiment 16, wherein the agent for facilitating hair growth is one or more of finasteride, cyproterone acetate, alfatradiol, minoxidil, bimatoprost, bicalcutamide, spironolactone, flutamide, lantoanoprost, dutasteride, or ketoconazole.

Embodiment 18. The method of embodiment 11, wherein the pharmacological agent is administered topically.

Embodiment 19. The method of embodiment 11, further comprising administering a penetration enhancer prior to or concomitantly with the administration of the pharmacological agent.

Embodiment 20. A method of treating hair loss comprising administering a therapeutically effective amount of a pharmacological agent that arrests the hair cycle in catagen phase.

Embodiment 21. The method of embodiment 20, wherein the pharmacological agent is a compound, a peptide, or an antibody which arrests the hair cycle in catagen phase.

Embodiment 22. The method of embodiment 20, wherein the compound, peptide, or antibody has a binding inhibitory IC50 value of 100 nM or less.

Embodiment 23. The method of embodiment 20, wherein the pharmacological agent is wortmannin, KT5926, K-252a, MS-444, ML-9, or ML-7, or a combination thereof.

Embodiment 24. A method of treating hair loss comprising administering a therapeutically effective amount of a pharmacological agent that inhibits the activation of catagen phase of the hair cycle or which inhibits the progression of the catagen phase of the hair cycle, thereby treating hair loss.

Embodiment 25. The method of embodiment 24, wherein the pharmacological agent is a compound, a peptide, or an antibody which inhibits the smooth muscle cell function of the dermal sheath cells.

Embodiment 26. The method of embodiment 25, wherein the compound, peptide, or antibody has a binding inhibitory IC50 value of 100 nM or less.

Embodiment 27. The method of embodiment 24, wherein the pharmacological agent is wortmannin, KT5926, K-252a, MS-444, ML-9, or ML-7, or a combination thereof.

Embodiment 28. The method of embodiment 24, wherein the pharmacological agent is:

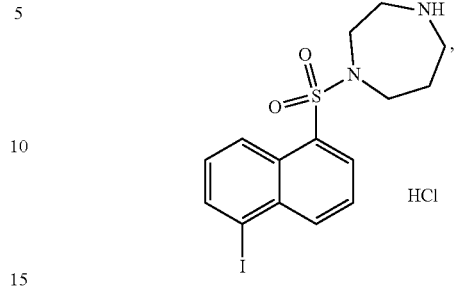

or a functional derivative thereof.

Embodiment 29. The method of embodiment 24, further comprising administering an agent for facilitating hair growth.

Embodiment 30. The method of embodiment 29, wherein the agent for facilitating hair growth is one or more of finasteride, cyproterone acetate, alfatradiol, minoxidil, bimatoprost, bicalcutamide, spironolactone, flutamide, lantoanoprost, dutasteride, or ketoconazole.

Embodiment 31. The method of embodiment 24, wherein the pharmacological agent is administered topically.

Embodiment 32. The method of embodiment 24, further comprising administering a penetration enhancer prior to or concomitantly with the administration of the pharmacological agent.

Embodiment 33. The method of embodiment 24, wherein the pharmacological agent is a compound, peptide, or antibody that has a binding inhibitory IC50 value of 100 nM or less.

Embodiment 34. The method of embodiment 24, wherein the pharmacological agent is wortmannin, KT5926, K-252a, MS-444, ML-9, or ML-7, or a combination thereof.

Embodiment 35. A pharmaceutical composition comprising a pharmaceutical agent in a therapeutically effective amount such that the myosin light chain kinase pathway becomes inhibited in a dermal sheath cell of a hair follicle.

Embodiment 36. A pharmaceutical composition comprising a pharmaceutical agent in a therapeutically effective amount such that the hair growth cycle becomes arrested in the catagen phase.

Embodiment 37. A pharmaceutical composition comprising a pharmaceutical agent in a therapeutically effective amount such that the smooth muscle cell-like contractility of dermal sheath cells is inhibited.

Embodiment 38. The pharmaceutical composition of any of embodiments 35-37, further comprising a penetration enhancer.

Embodiment 39. The pharmaceutical composition of any of embodiments 35-37, wherein the pharmaceutical agent is wortmannin, KT5926, K-252a, MS-444, ML-9, or ML-7, or a combination thereof.

Embodiment 40. The pharmaceutical composition of any of embodiments 35-37, further comprising an agent for facilitating hair growth.

Embodiment 41. The pharmaceutical composition of embodiment 40, wherein the agent is one or more of finasteride, cyproterone acetate, alfatradiol, minoxidil, bimatoprost, bicalcutamide, spironolactone, flutamide, lantoanoprost, dutasteride, or ketoconazole.

Embodiment 42. The pharmaceutical composition of any of embodiments 35-41 for topical application.

Embodiment 43. A method of identifying an agent capable of treating hair loss, comprising: (a) administering a test agent to a cell culture of dermal sheath cells; (b) detecting the production of one or more biomarkers indicative of the inhibition of dermal sheath contraction; (c) validating a test agent in a hair follicle model to confirm that the test agent inhibits dermal sheath contraction; thereby identifying an agent capable of treating hair loss.

Embodiment 44. The method of embodiment 43, wherein an antibody to myosin light chain 9 (pMyl9) is used to detect the biomarkers in step (b).

In addition to the embodiments expressly described herein, it is to be understood that all of the features disclosed in this disclosure may be combined in any combination (e.g., permutation, combination). Each element disclosed in the disclosure may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, and can make various changes and modifications of the invention to adapt it to various usages and conditions. Thus, other embodiments are also within the claims.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The disclosure includes embodiments in which exactly one member of the group is present in, employed in, or otherwise relevant to a given product or process. The disclosure includes embodiments in which more than one, or all of the group members are present in, employed in, or otherwise relevant to a given product or process.

Furthermore, the disclosure encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the disclosure, or embodiments of the disclosure, is/are referred to as comprising particular elements and/or features, certain embodiments of the disclosure or embodiments of the disclosure consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the disclosure, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the present disclosure, the specification shall control. In addition, any particular embodiment of the present disclosure that falls within the prior art may be explicitly excluded from any one or more of the claims. Because such embodiments are deemed to be known to one of ordinary skill in the art, they may be excluded even if the exclusion is not set forth explicitly herein. Any particular embodiment of the disclosure can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present disclosure, as defined in the following claims.

REFERENCES

1. Y. Ge, E. Fuchs, Stretching the limits: from homeostasis to stem cell plasticity in wound healing and cancer. *Nat. Rev. Genet.* 19, 311-325 (2018).
2. P. Rompolas, K. R. Mesa, V. Greco, Spatial organization within a niche as a determinant of stem-cell fate. *Nature.* 502, 513-8 (2013).
3. Y.-C. Hsu, L. Li, E. Fuchs, Transit-amplifying cells orchestrate stem cell activity and tissue regeneration. *Cell.* 157, 935-49 (2014).
4. E. Laurenti, B. Gottgens, From haematopoietic stem cells to complex differentiation landscapes. *Nature.* 553, 418-426 (2018).
5. E. Legué, J.-F. Nicolas, Hair follicle renewal: organization of stem cells in the matrix and the role of stereotyped lineages and behaviors. *Development.* 132, 4143-54 (2005).
6. C. Clavel et al., Sox2 in the dermal papilla niche controls hair growth by fine-tuning BMP signaling in differentiating hair shaft progenitors. *Dev. Cell.* 23, 981-94 (2012).
7. S. Müller-Röver et al., A comprehensive guide for the accurate classification of murine hair follicles in distinct hair cycle stages. *J. Invest. Dermatol.* 117, 3-15 (2001).
8. G. Cotsarelis, T. T. Sun, R. M. Lavker, Label-retaining cells reside in the bulge area of pilosebaceous unit: implications for follicular stem cells, hair cycle, and skin carcinogenesis. *Cell.* 61, 1329-37 (1990).
9. H. Oshima, A. Rochat, C. Kedzia, K. Kobayashi, Y. Barrandon, Morphogenesis and renewal of hair follicles from adult multipotent stem cells. *Cell.* 104, 233-45 (2001).
10. R. J. Morris et al., Capturing and profiling adult hair follicle stem cells. *Nat. Biotechnol.* 22, 411-7 (2004).
11. C. Blanpain, W. E. Lowry, A. Geoghegan, L. Polak, E. Fuchs, Self-renewal, multipotency, and the existence of two cell populations within an epithelial stem cell niche. *Cell.* 118, 635-48 (2004).
12. T. Tumbar et al., Defining the epithelial stem cell niche in skin. *Science* (80-). 303, 359-63 (2004).

13. G. Lindner et al., Analysis of apoptosis during hair follicle regression (catagen). *Am. J. Pathol.* 151, 1601-17 (1997).
14. K. Foitzik et al., Control of murine hair follicle regression (catagen) by TGF-beta1 in vivo. *FASEB.* 14, 752-60 (2000).
15. K. R. Mesa et al., Niche-induced cell death and epithelial phagocytosis regulate hair follicle stem cell pool. *Nature.* 522, 94-7 (2015).
16. M. Ito, K. Kizawa, K. Hamada, G. Cotsarelis, Hair follicle stem cells in the lower bulge form the secondary germ, a biochemically distinct but functionally equivalent progenitor cell population, at the termination of catagen. *Differentiation.* 72, 548-57 (2004).
17. Y.-C. Hsu, H. A. Pasolli, E. Fuchs, Dynamics between stem cells, niche, and progeny in the hair follicle. *Cell.* 144, 92-105 (2011).
18. P. Rompolas et al., Live imaging of stem cell and progeny behaviour in physiological hair-follicle regeneration. *Nature.* 487, 496-9 (2012).
19. V. Greco et al., A two-step mechanism for stem cell activation during hair regeneration. *Cell Stem Cell.* 4, 155-69 (2009).
20. N. Oshimori, E. Fuchs, Paracrine TGF-β signaling counterbalances BMP-mediated repression in hair follicle stem cell activation. *Cell Stem Cell.* 10, 63-75 (2012).
21. S. J. Mann, Hair loss and cyst formation in hairless and rhino mutant mice. *Anat. Rec.* 170, 485-99 (1971).
22. W. Ahmad et al., Alopecia universalis associated with a mutation in the human hairless gene. *Science* (80-). 279, 720-4 (1998).
23. K. S. Stenn, R. Paus, Controls of hair follicle cycling. *Physiol. Rev.* 81, 449-494 (2001).
24. C. a Jahoda, a J. Reynolds, C. Chaponnier, J. C. Forester, G. Gabbiani, Smooth muscle alpha-actin is a marker for hair follicle dermis in vivo and in vitro. *J. Cell Sci.* 99 (Pt 3), 627-36 (1991).
25. S. Malgouries, S. Thibaut, B. A. Bernard, Proteoglycan expression patterns in human hair follicle. *Br. J. Dermatol.* 158, 234-42 (2008).
26. M. Rendl, L. Lewis, E. Fuchs, Molecular dissection of mesenchymal-epithelial interactions in the hair follicle. *PLoS Biol.* 3, e331 (2005).
27. A. Rezza et al., Signaling Networks among Stem Cell Precursors, Transit-Amplifying Progenitors, and their Niche in Developing Hair Follicles. *Cell Rep.* 14, 3001-18 (2016).
28. J. A. Beamish, P. He, K. Kottke-Marchant, R. E. Marchant, Molecular regulation of contractile smooth muscle cell phenotype: implications for vascular tissue engineering. *Tissue Eng. Part B Rev.* 16, 467-91 (2010).
29. M.-L. Bochaton-Piallat, G. Gabbiani, B. Hinz, The myofibroblast in wound healing and fibrosis: answered and unanswered questions. *F1000Research.* 5, 752 (2016).
30. R. A. Murphy, J. S. Walker, J. D. Strauss, Myosin isoforms and functional diversity in vertebrate smooth muscle. *Comp. Biochem. Physiol. Part B Biochem. Mol. Biol.* 117, 51-60 (1997).
31. M. Dominici et al., Restoration and reversible expansion of the osteoblastic hematopoietic stem cell niche after marrow radioablation. *Blood.* 114, 2333-43 (2009).
32. H. Bonig, T. Papayannopoulou, Hematopoietic stem cell mobilization: updated conceptual renditions. *Leukemia.* 27, 24-31 (2013).
33. T. Lapidot, A. Dar, O. Kollet, How do stem cells find their way home? *Blood.* 106, 1901-10 (2005).

What is claimed is:

1. A method of treating hair loss comprising administering to a subject in need thereof, a therapeutically effective amount of a pharmacological agent, wherein the pharmacological agent: inhibits the myosin light chain kinase (MLCK) pathway in a dermal sheath cell of a hair follicle and/or inhibits the smooth muscle cell-like contractions of the dermal sheath cells of the hair follicles, arrests the hair cycle in catagen phase, inhibits the activation of the catagen phase of the hair cycle, and/or inhibits the progression of the catagen phase of the hair cycle;
thereby treating hair loss; and
is ML-9, ML-7, a functional derivative of ML-7, or a combination thereof.

2. The method of claim 1, further comprising administering an agent for facilitating hair growth, wherein the agent for facilitating hair growth is one or more of finasteride, cyproterone acetate, alfatradiol, minoxidil, bimatoprost, bicalcutamide, spironolactone, flutamide, lantoanoprost, dutasteride, or ketoconazole.

3. The method of claim 1, wherein the pharmacological agent is administered topically.

4. The method of claim 1, further comprising administering a penetration enhancer prior to or concomitantly with the administration of the pharmacological agent.

5. The method of claim 1, wherein inhibiting the MLCK results in cessation of dermal sheath cell contractions, thereby halting the hair cycle in the catagen phase.

* * * * *